United States Patent
Ryu

(10) Patent No.: US 9,363,296 B1
(45) Date of Patent: Jun. 7, 2016

(54) METHOD AND APPARATUS FOR ECHO CANCELLATION

(71) Applicant: Seung Moon Ryu, Seongnam-Si (KR)

(72) Inventor: Seung Moon Ryu, Seongnam-Si (KR)

(73) Assignee: Havenet Technologies, Inc., Plano, TX (US)

( * ) Notice: Subject to any disclaimer, the term of this patent is extended or adjusted under 35 U.S.C. 154(b) by 148 days.

(21) Appl. No.: 14/147,388

(22) Filed: Jan. 3, 2014

Related U.S. Application Data

(63) Continuation-in-part of application No. 14/039,977, filed on Sep. 27, 2013, and a continuation-in-part of application No. 14/040,030, filed on Sep. 27, 2013, and a continuation-in-part of application No. 14/040,062, filed on Sep. 27, 2013, now abandoned, and a continuation-in-part of application No. 14/040,096, filed on Sep. 27, 2013, now abandoned, and a continuation-in-part of application No. 14/040,127, filed on Sep. 27, 2013, and a continuation-in-part of application No. 14/045,256, filed on Oct. 3, 2013, now Pat. No. 9,032,268.

(60) Provisional application No. 61/876,054, filed on Sep. 10, 2013.

(51) Int. Cl.
*H04Q 7/00* (2006.01)
*H04L 29/06* (2006.01)

(52) U.S. Cl.
CPC .................................. *H04L 65/1003* (2013.01)

(58) Field of Classification Search
None
See application file for complete search history.

(56) References Cited

U.S. PATENT DOCUMENTS

2006/0203761 A1* 9/2006 Rensburg et al. ............. 370/328
2006/0223468 A1* 10/2006 Toms et al. ................. 455/190.1
2011/0096393 A1* 4/2011 Araki ............................ 359/390

* cited by examiner

*Primary Examiner* — Duc C Ho

(57) ABSTRACT

A digital broadcast communication system includes a transceiver configured to receive a digital packet containing a payload having voice content and to add a user's voice to the received voice content to create a combined voice content signal. The combined voice signal packet is then forwarded upstream to the network master wherein other similar devices may combine additional voice inputs. The system includes a buffer for canceling previously transmitted voice from a packet produced by the network master and adding a current most voice input from playback through a speaker.

16 Claims, 44 Drawing Sheets

1200

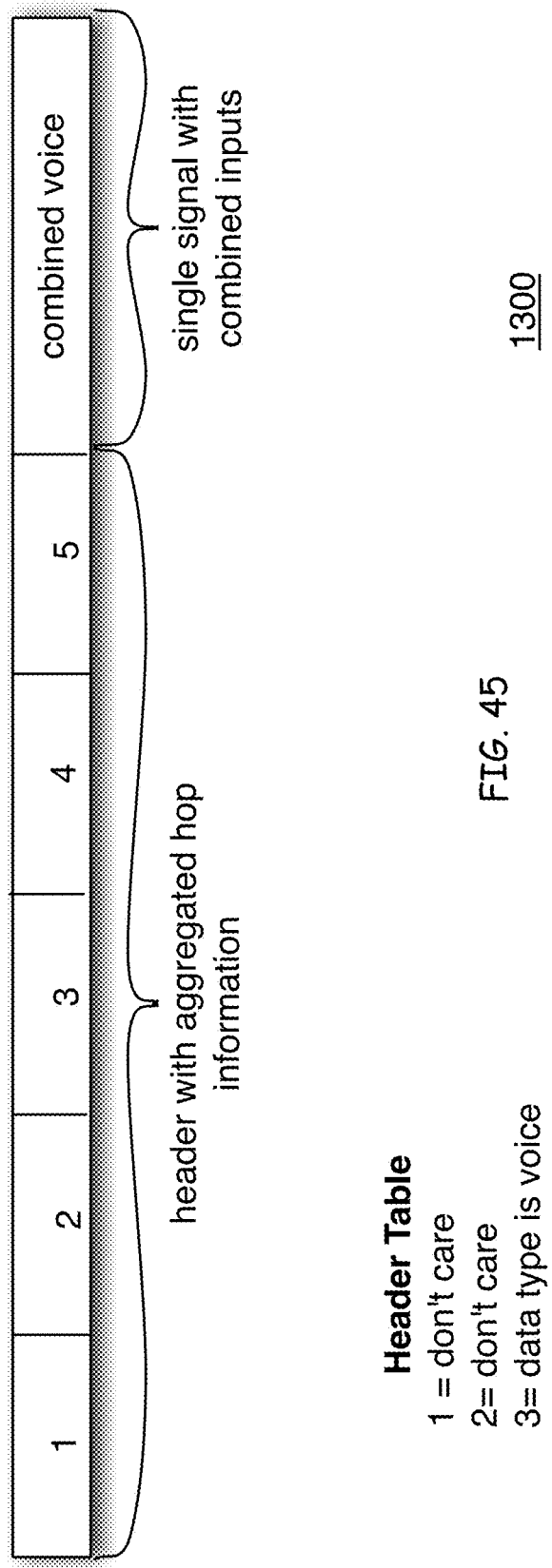

METHOD AND APPARATUS FOR ECHO CANCELLATION

CROSS REFERENCE TO RELATED APPLICATIONS

The present application is related to and claims priority to Provisional Application for patent entitled CONTAINER STRUCTURE AND PROTOCOL FOR WIRELESS COMMUNICATIONS having an application number of 61/876,054 and a filing date of Sep. 10, 2013 and further claims priority as a Continuation-in-Part application to the following applications:
1) an application entitled Large Venue Wireless Communications having an application number of Ser. No. 14/039,977 filed on Sep. 27, 2013;
2) an application entitled Method for Container Structure Communications having an application number of Ser. No. 14/040,030 filed on Sep. 27, 2013;
3) an application entitled System and Apparatus for Container Structured Communications having an application number of Ser. No. 14/040,062 filed on Sep. 27, 2013;
4) an application entitled Method and Apparatus for Wireless Packet Network having an application number of Ser. No. 14/040,096 filed on Sep. 27, 2013;
5) an application entitled Method and Apparatus for Mixed WLAN Communications having an application number of Ser. No. 14/040,127 filed on Sep. 27, 2013;
6) an application entitled Method for Error Correction in a Multicast Network having an application number of Ser. No. 14/045,256 filed on Oct. 3, 2013; and
7) an application entitled System for Error Correction in a Multicast Network having an application number of Ser. No. 14/045,273 filed on Oct. 3, 2013.

BACKGROUND OF THE INVENTION

1. Technical Field of the Invention

This invention relates generally to wireless communication systems and more particularly to radio frequency integrated circuits used in such wireless communication systems.

2. Description of Related Art

Wired and wireless communication systems are known to support communications between wireless and wire lined communication devices. Such communication systems range from national and/or international cellular telephone systems to the Internet to point-to-point in-home wireless networks. Each type of communication system typically is constructed, and hence typically operates, in accordance with one or more communication standards. For instance, wireless communication systems may operate in accordance with one or more standards, including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the wireless communication devices utilize common channels (e.g., one of a plurality of radio frequency (RF) carriers of the wireless communication system) and communicate over those common channel(s). For indirect wireless communications, each wireless device communicates directly with an access point (AP) or associated base station (e.g., for cellular services) via an assigned channel. To complete a communication connection between the wireless devices, the associated base stations and/or associated access points communicate with each other directly, via a system controller, utilizing a public switch telephone network (PSTN), via a wide area network such as the Internet, and/or via another public or private packet data network.

For each wireless communication device to participate in wireless communications, it usually includes a built-in radio transceiver (i.e., receiver and transmitter) that is coupled to an associated radio transceiver (e.g., a station for in-home and/or in-building wireless communication networks, RF modem, etc.). As is known, the transmitter includes a data modulation stage, one or more intermediate frequency (IF) stages, and a power amplifier. The data modulation stage converts raw data into baseband signals in accordance with a particular wireless communication standard. The one or more IF stages up convert the baseband signals with one or more local oscillations to produce RF signals. The power amplifier amplifies the RF signals prior to transmission via an antenna.

As is also known, the receiver is coupled to the antenna and includes a low noise amplifier, one or more IF stages, a filtering stage, and a data recovery stage. The low noise amplifier receives inbound RF signals via the antenna and amplifies them. The one or more IF stages mix the amplified RF signals with one or more local oscillations to convert the amplified RF signal into baseband signals or IF signals. The filtering stage filters the baseband signals or the IF signals to attenuate unwanted out-of-band signals to produce filtered signals. The data recovery stage recovers raw data from the filtered signals in accordance with the particular wireless communication standard.

The need for wireless networking has, heretofore, been addressed by various standards bodies that promulgate interworking standards. The IEEE 802.11 standard that defines a wireless LAN. In a typical 802.11 wireless LAN, a wired backbone couples to one or more wireless access points (WAPs) that wirelessly connect to many computers or other electronic devices that contain wireless interfaces. IEEE 802.11 networks have achieved significant success in servicing wireless communication needs for portable computers, portable data terminals, and other wireless devices that transmit and receive data.

Wireless personal area networks (WPANs) enable short-range "ad-hoc" connectivity among portable consumer electronics and communication devices but do not require the infrastructure needed for an 802.11 network. The WPAN™ Study Group (SG) was formed on Mar. 12, 1998 by the IEEE 802.11 Working Group to investigate the need for a supplemental wireless network standard worked to create protocols for low power, low complexity, wireless connectivity among devices within or entering a device proximity. This includes devices that are carried, worn, or located near the body. These activities have led to the development of 802.15, which is a WPAN standard. These devices, however, typically support only paired communications between two devices.

Another known WPAN is Bluetooth. For both Bluetooth and 802.15 WPANs, the coverage area for a WPAN is generally within a 10-meter radius. In other words, a personal operating space (POS) is the space about a person that typically extends up to 10 meters in all directions and envelops the person whether stationary or in motion. It is within the POS that the portable device communicates with an access point.

The Bluetooth radio system has emerged as the first technology addressing WPAN applications with its salient features of low power consumption, small package size, and low cost. Raw data rates for Bluetooth devices are limited to 1 Mbps, although the actual throughput is about half of the raw data rate.

A Bluetooth communication link supports up to three voice channels with very limited additional bandwidth for bursty data traffic. However, Bluetooth communication links cannot support the data transfer requirements of portable consumer electronics devices that transmit and receive multimedia data, e.g., high quality video applications, audio applications, and multi-megabyte file transfers for music and image files. In a typical Bluetooth communication channel, one of two paired devices establishes itself as a master to control communications with the other device, which, for that pairing, is the slave device.

Among other reasons, the above referenced systems are limited to paired communications between devices. For WLAN and cellular, all communications go through a network controller. For PAN systems that support peer-to-peer communications, those communications are also limited to a small number of devices (typically two). Even if the standard protocols supported peer-to-peer communications between multiple devices, interference and other problems make it difficult for such systems to proliferate in a reliable manner.

Therefore, a need exists for protocol and/or technology that support peer-to-peer communications between multiple devices in a manner that can reliably solve interference and related problems and that can support broadcast transmissions.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

FIG. 45 is a functional illustration of a signal for supporting group communications according to one embodiment of the invention.

DETAILED DESCRIPTION OF THE INVENTION

Figure 1:
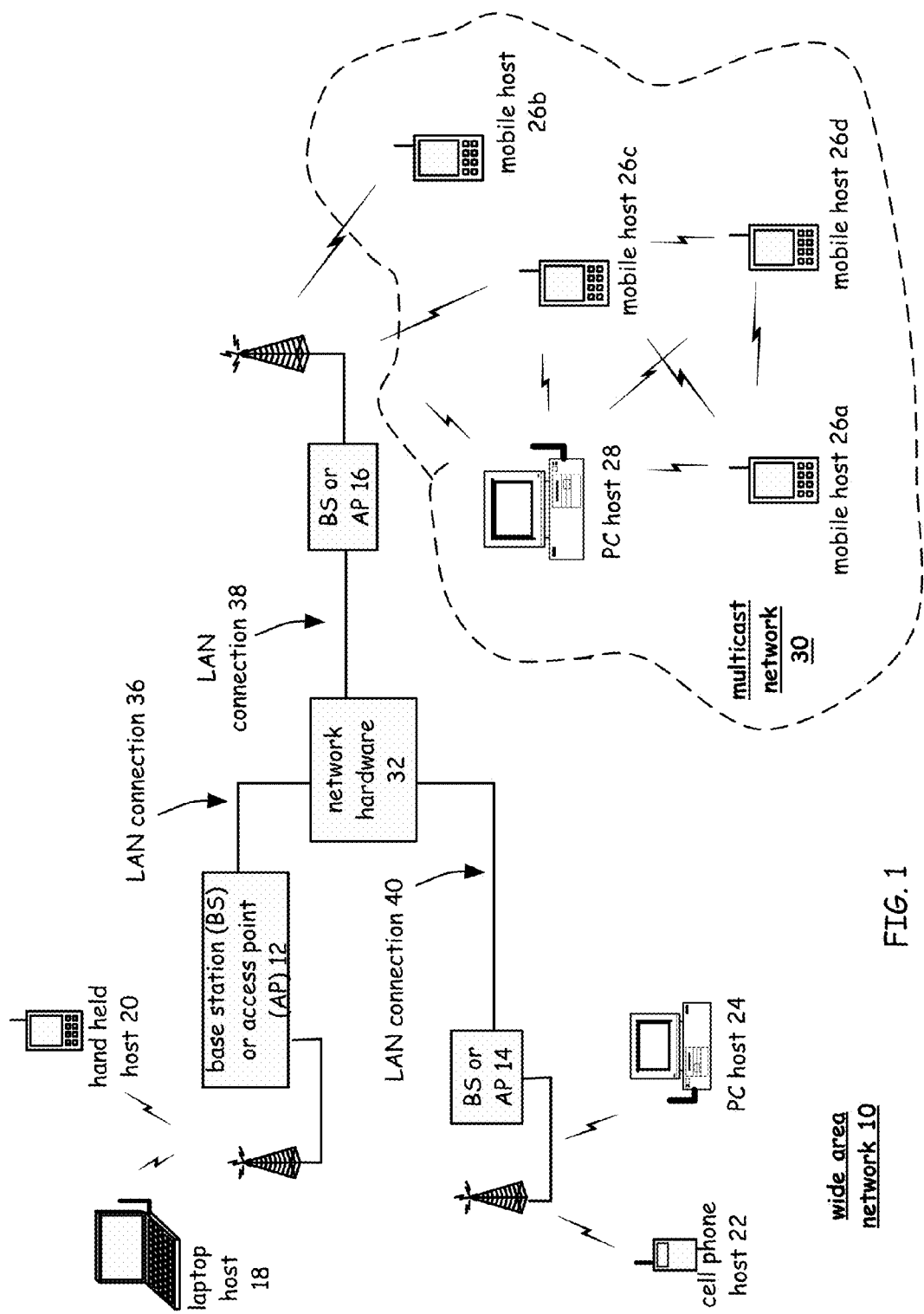
FIG. 1 is a functional diagram of a wide area network according to one embodiment that includes a multicast network.

FIG. 1 is a functional diagram of a wide area network according to one embodiment that includes a multicast network. A communication system 10 is a wide area communication network that includes a plurality of base stations or access points 12-16, a plurality of wireless communication devices 18-28, some of which are part of a multicast network 30, and a network hardware component 32. The wireless communication devices 18-28 may be laptop host computers 18, personal digital assistant hosts 20, personal computer hosts 24 and 28 and/or cellular telephone hosts 22. The details of the wireless communication devices will be described in greater detail with reference to FIGS. 4-5.

The base stations or access points 12-16 are operably coupled to the network hardware 34 via local area network connections 36, 38 and 40. The network hardware 34, which may be a router, switch, bridge, modem, system controller, etc., provides a wide area network connection for the communication system 10. Each of the base stations or access points 12-16 has an associated antenna or antenna array to communicate with the wireless communication devices in its area. Typically, the wireless communication devices register with a particular base station or access point 12-16 to receive services from the communication system of wide area network 10. For direct connections (i.e., point-to-point communications), wireless communication devices in multicast network 30 communicate directly via a multicast communication protocol according to one embodiment of the invention.

Typically, base stations are used for cellular telephone systems and like-type systems, while access points are used for in-home or in-building wireless networks. Regardless of the particular type of communication system, each wireless communication device includes a built-in radio transceiver and/or is coupled to a radio transceiver. The radio transceiver includes a linear amplifier and/or programmable multi-stage amplifier, as disclosed herein, to enhance performance, reduce costs, reduce size, and/or enhance broadband applications. In one embodiment, access point 16 supports communications using a multicast communication protocol according to at least one embodiment of the present invention. In an alternative embodiment, access point 16 is configured to communicate using both an IEEE 802.11 WLAN communication protocol and a multicast communication protocol. Here, at least one 802.11 channel is reserved for the multicast protocol communications and to carry a plurality of relatively smaller bandwidth communication channels.

Figure 2:
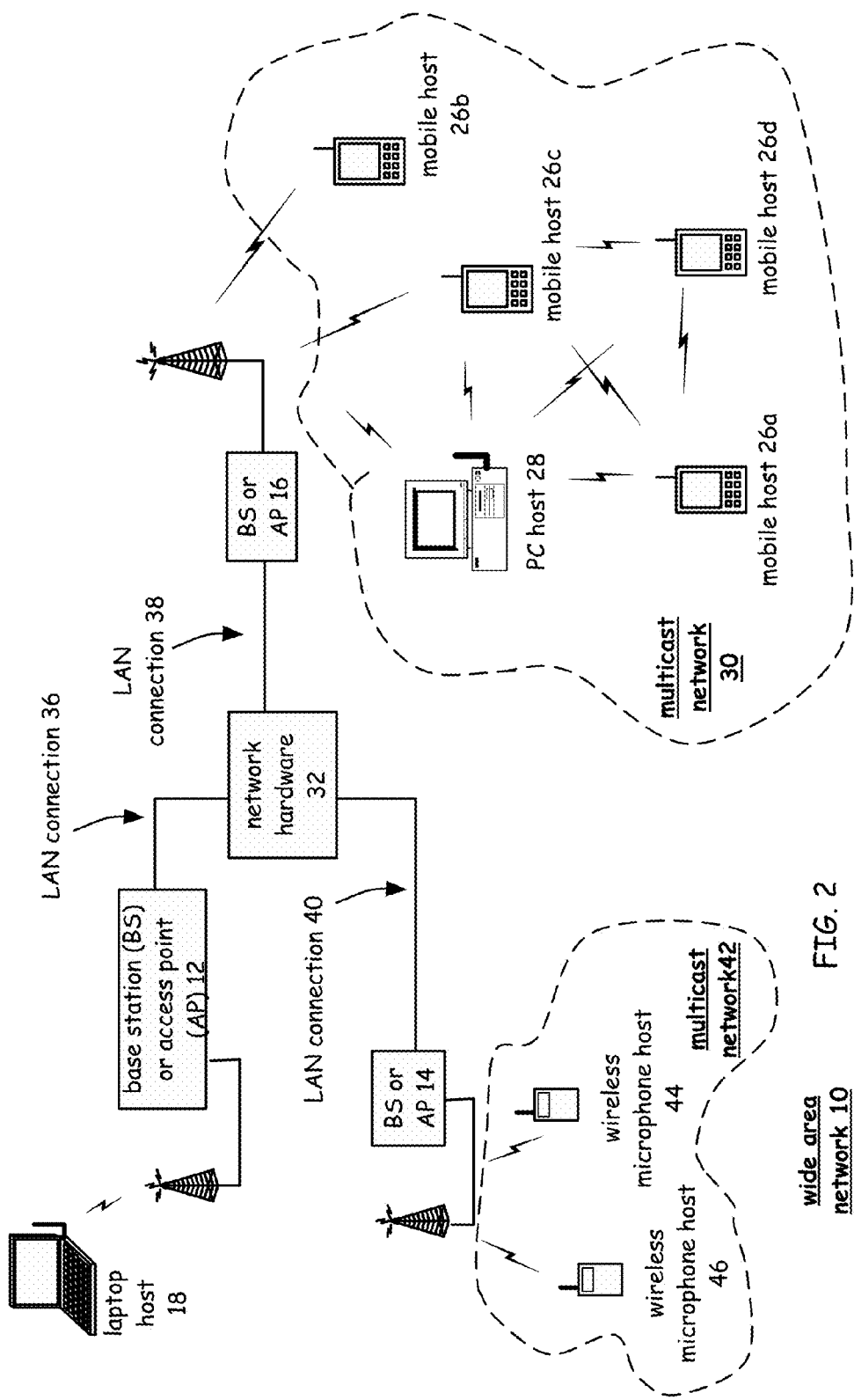
FIG. 2 is a functional diagram of wide area network that includes a wireless packet data broadcast network according to one embodiment that further includes a multicast network.

FIG. 2 is a functional diagram of wide area network that includes a wireless packet data broadcast network according to one embodiment that further includes a multicast network. FIG. 2 is similar to FIG. 1 in many ways but also includes multicast network 42. Multicast network 42 includes a plurality of wireless microphone hosts, represented here as wireless microphone hosts 44 and 46, that upload voice sources using a multicast communication protocol to a network for subsequent distribution to end users. Multicast network 42 may include mobile hosts 26*a-d* as well though they are not shown here. Wireless hosts 44-46 may be any one of many types of wireless communication device including cell phones, dedicated transmit devices such as wireless microphones, etc.

Multicast networks 30 and 42 may readily communicate with external devices of a wide area network to exchange data and/or control information. For example, a user of laptop host 18 may control what voice sources produced by the wireless microphone hosts 44 and 46 are produced to the various hosts of multicast network 30. It should be understood that many sources of voice and data may be selected for broadcast transmission in multicast networks 30.

Figure 3:
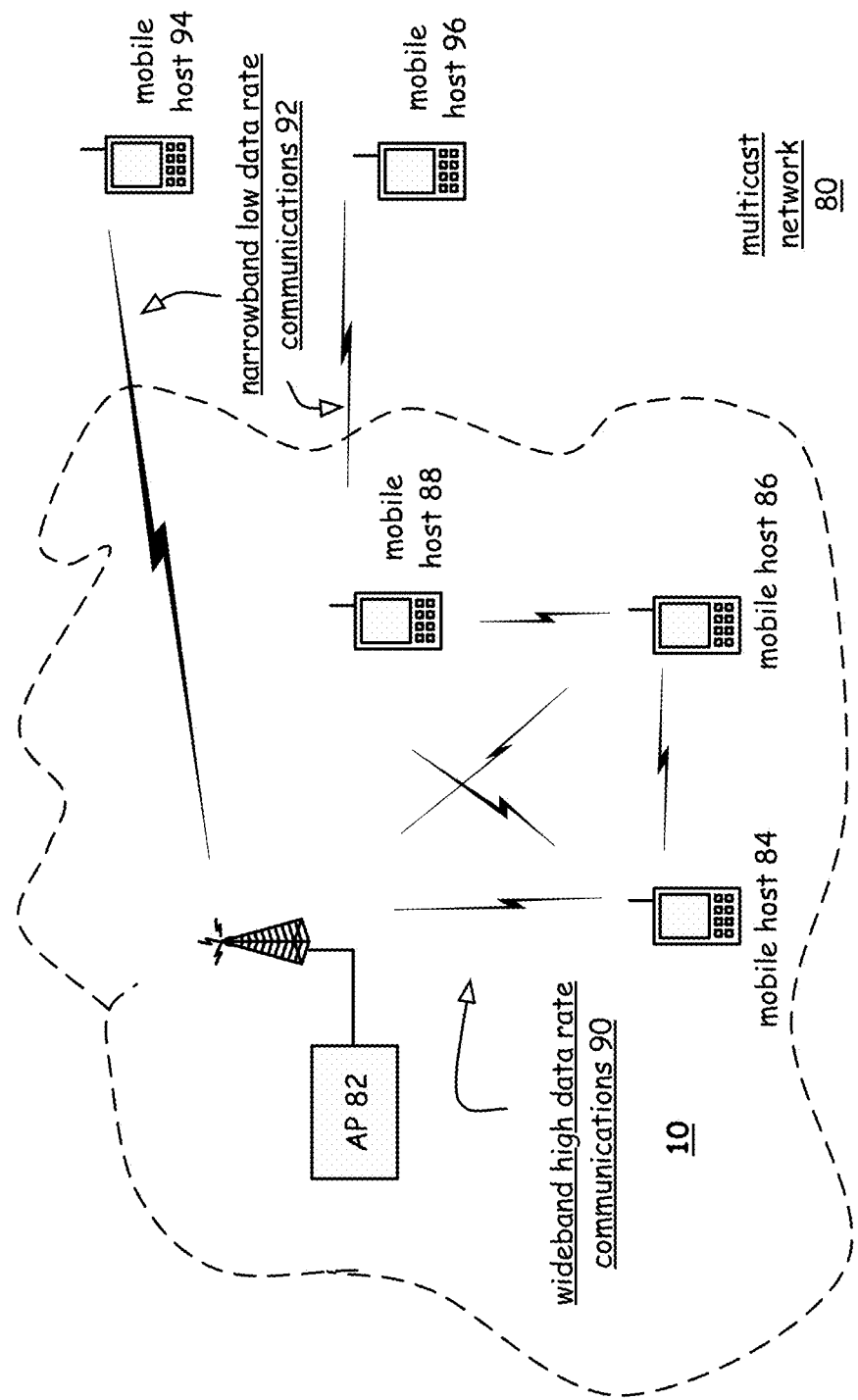
FIG. 3 is a functional diagram of a multicast network according to one embodiment that includes both short distance wideband high data rate communications and narrowband low data rate communications.

FIG. 3 is a functional diagram of a multicast network according to one embodiment that includes both short distance wideband high data rate communications and narrowband low data rate communications. FIG. 3 includes a multicast network 80 that further includes an access point 82 that communicates with a plurality of mobile hosts 84-88 in wideband high data rate communications 90 and in narrowband low data rate communications 92 with mobile hosts 94-96. As may further be seen, host 88, as with the other hosts 84-86, is operably configured to also engage in narrowband low data rate communications 92 with mobile hosts 94-96.

One aspect of the embodiment of the invention illustrated in FIG. 3 is that the narrowband and wideband communications are according to a multicast communication protocol. Thus, as will be explained in greater detail below, the narrowband and wideband high data rate communications are time synchronized to reduce interference. Alternatively, they are time and frequency synchronized in a network that utilizes frequency hopping. Furthermore, the mobile hosts are operably configured to not only communicate with access point 82, but also directly with each other whether it's via high data rate wideband communications (e.g., 2.4 GHz frequency communications) or via low data rate narrowband communications (e.g., 700 MHz or 900 MHz frequency band communications).

Figure 4:
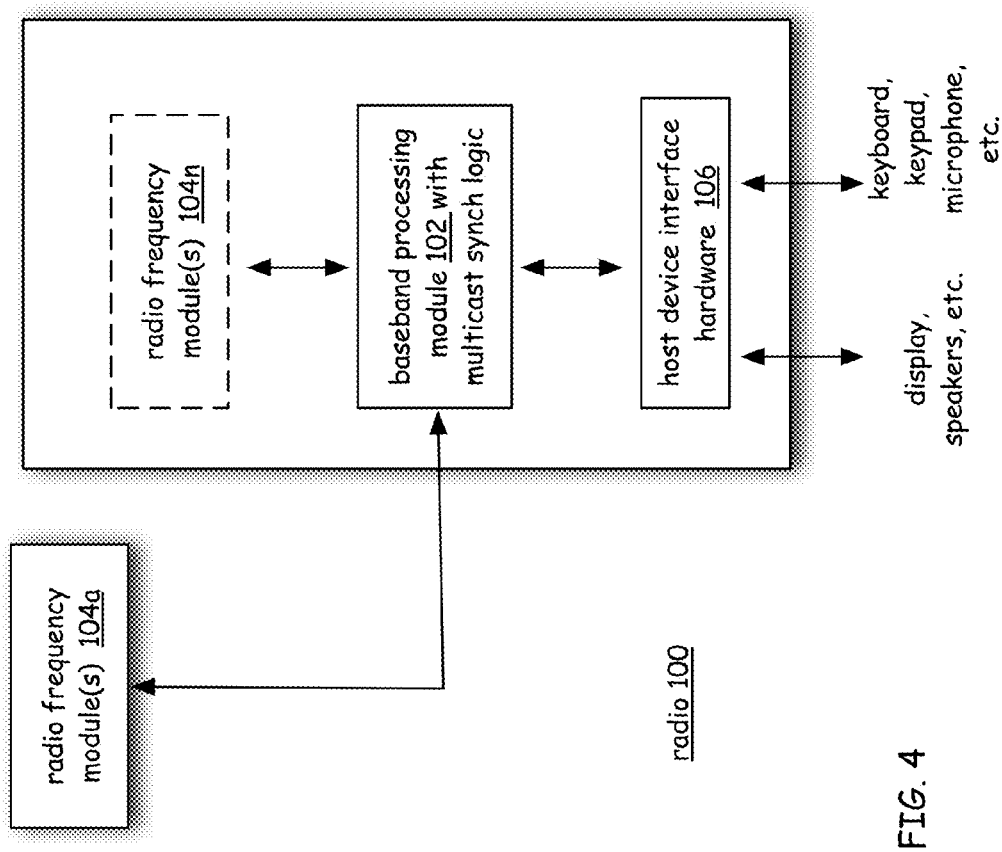
FIG. 4 is a functional block diagram of a transceiver according to one embodiment of the invention.

FIG. 4 is a functional block diagram of a wireless transceiver according to one embodiment of the invention. As may be seen a radio 100 (or wireless transceiver 100) includes baseband-processing module 102. Baseband processing module 102 includes multicast communication logic. Radio 100 further includes one or more radio frequency modules 104*a-n*. As is shown, radio frequency module 104*a* is operably disposed as a separate circuit or device in relation to baseband processing module 102. Optionally, and in one embodiment of the invention, at least one radio frequency module 104*n* is formed within the same integrated circuitry or application specific integrated circuitry (ASIC) or field programmable gate array (FPGA) circuitry as baseband processing module 102. Finally, operably disposed in the same circuitry as baseband-processing module 102 is host device interface hardware and circuitry 106 that interfaces with displays, speakers, keyboards, keypads, microphones, etc.

Figure 5:
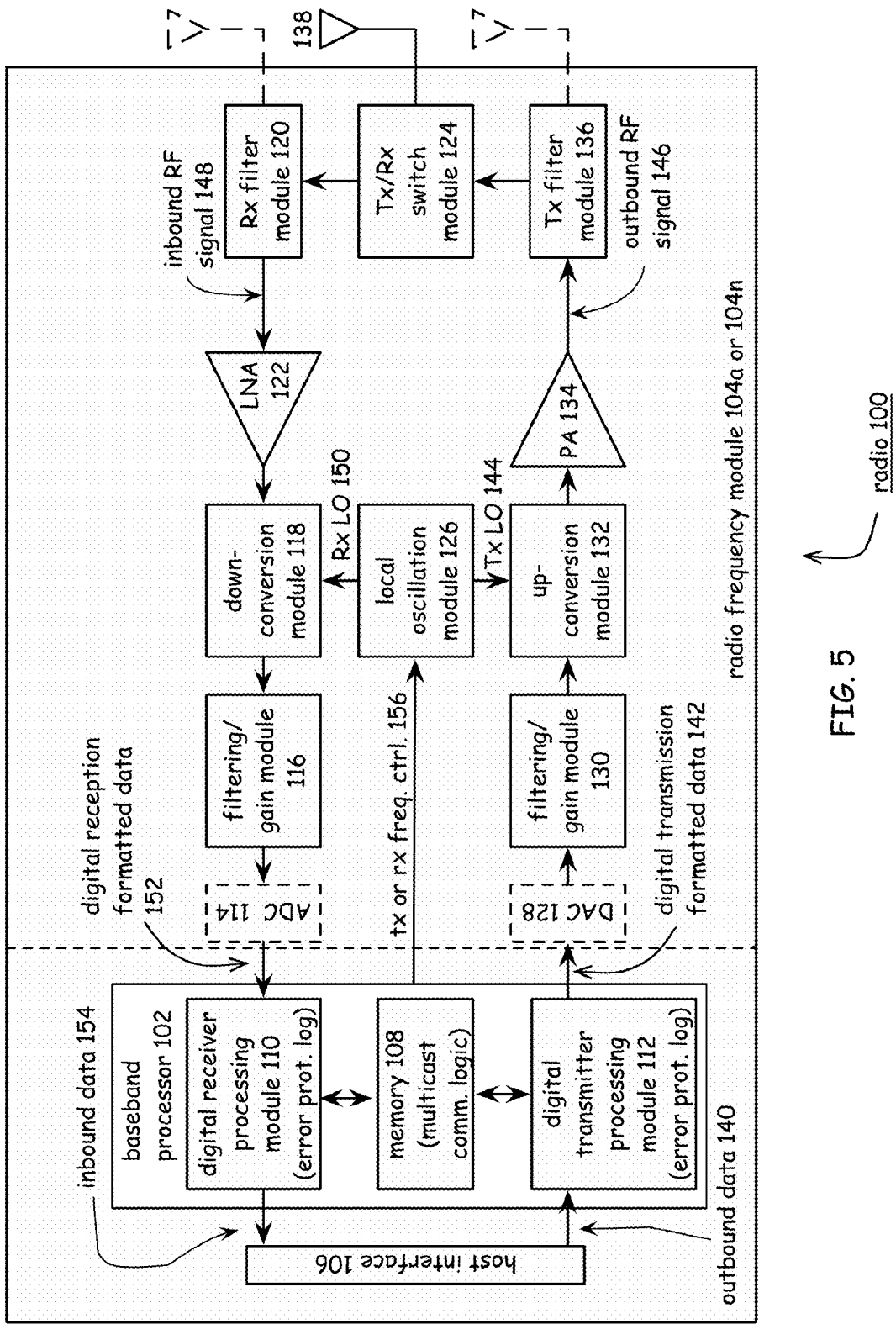
FIG. 5 is a functional block diagram of a radio according to one embodiment of the invention.

FIG. 5 is a functional block diagram of a radio according to one embodiment of the invention. FIG. 5 illustrates a wireless communication device or radio 100 that includes baseband processor 102, host interface 106 that interfaces host device hardware and a memory 108. Memory 108 includes computer instructions that define operation of the radio 100 including logic for multicast communication logic according to the various embodiments of the invention. For cellular telephone hosts, the radio frequency module is a built-in component such as 104n of FIG. 4. For personal digital assistants hosts, laptop hosts, and/or personal computer hosts, the radio frequency module may be built-in such as 104n or an externally coupled component such as 104a as shown in FIG. 4. Alternatively, a host device may include any plurality of radio frequency modules wherein one or more may be internal and one or more may be external.

As illustrated here in FIG. 5, the host device includes processor module 102 that further includes a digital receiver processing module 110 and a digital transmitter processing module 112. The processor module 102 and memory 108 execute the corresponding instructions that are typically done by the host device. For example, for a cellular telephone host device, the processor module 102 performs the corresponding communication functions in accordance with a particular cellular telephone standard or in the case of a multicast protocol access device, the functions of such an access device or both. As may further be seen, both the receiver processing module 110 and the digital transmitter processing module 112 both include error protection logic according to one embodiment of the invention. The error protection logic is, in the described embodiment, defined in the logic of the circuitry (hardware) that may be implemented in any aforementioned type of logic including FPGA, ASIC, etc. The logic may also be defined within memory of the modules 110 and 112. Generally, the transmitter-processing module 112 includes the logic to perform the error correction coding according to the embodiments of the invention while the receiver-processing module 110 includes corresponding logic to decode a received signal that was coded with logic similar to that in transmitter processing module 112.

The radio interface 106 allows data to be received from and sent to the radio 100. For data received from the radio 100 (e.g., inbound data 154), the radio interface 106 provides the data to the processor module 102 for further processing and/or routing to the interface 106. The interface 106 provides connectivity to an output display device, such as a display, monitor, speakers, etc., such that the received data may be displayed. The processor module 102 may receive the outbound data from an input device such as a keyboard, keypad, microphone, etc., via the input interface 108 or generate the data itself. For data received via the interface 106, the processor module 102 may perform a corresponding host function on the data and/or route it to the radio 100 via the radio interface 106.

Radio 100 includes an optional analog-to-digital converter (ADC) 114, a filtering/gain module 116, an IF mixing down-conversion module 118, a receiver filter module 120, a low noise amplifier 122, a transmitter/receiver switch module 124, a local oscillation module 126, an optional digital-to-analog converter (DAC) 128, a filtering/gain module 130, an IF mixing up-conversion module 132, a power amplifier 134, a transmitter filter module 136, and an antenna 138. Here, ADC 114 and DAC 128 are shown in dashed lines to represent their presence is optional. In an embodiment in which digital signals are modulated and transmitted or demodulated and received, the ADC and DAC are not needed and thus are shown here as optional.

The antenna 138 may be a single antenna that is shared by the transmit and receive paths as regulated by the TX/Rx switch module 124, or may include separate antennas for the transmit path and receive path. The antenna implementation will depend on the particular standard to which the wireless communication device is compliant.

The digital receiver processing module 110 and the digital transmitter-processing module 112, in combination with operational instructions stored in memory 106, execute digital receiver functions and digital transmitter functions, respectively. The digital receiver functions include, but are not limited to, digital IF to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 102 and 112, respectively, may be implemented using a shared processing device, individual processing devices, or a plurality of processing devices.

Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 106 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 110 and/or 112 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 100 receives outbound data 140 from the host device via the host interface 106. The host interface 106 routes the outbound data 140 to the digital transmitter processing module 112, which processes the outbound data 140 in accordance with a particular wireless communication standard (e.g., IEEE 802.11a, IEEE 802.11b, Bluetooth, etc.) or the multicast communication protocol described herein this disclosure to produce digital transmission formatted data 142. In the described embodiment, a synchronized multicast communication protocol is utilized to produce digital transmission formatted data 142. The digital transmission formatted data 142 will be a digital baseband signal or a digital low IF signal, where the low IF typically will be in the frequency range of one hundred kilohertz to a few megahertz.

The digital-to-analog converter 128 converts the digital transmission formatted data 96 from the digital domain to the analog domain in embodiments in which a digital output signal is not to be modulated and transmitted. The filtering/gain module 130 filters and/or adjusts the gain of the analog signal prior to providing it to the mixing stage 132. The mixing up-conversion module 132 directly up converts the analog baseband or low IF signal into an RF signal based on a transmitter local oscillation 144 provided by local oscillation module 126, which may be implemented in accordance with the teachings of the present invention. The power amplifier 134 amplifies the RF signal to produce outbound RF signal 146, which is filtered by the transmitter filter module 136. The antenna 138 transmits the outbound RF signal 146 to a targeted device such as a base station, an access point and/or another wireless communication device.

The radio 100 also receives an inbound RF signal 148 via the antenna 138, which was transmitted by a base station, an access point, or another wireless communication device. The antenna 138 provides the inbound RF signal 148 to the receiver filter module 120 via the TX/Rx switch module 124, where the Rx filter module 120 band pass filters the inbound RF signal 148. The Rx filter module 120 provides the filtered RF signal to low noise amplifier 122, which amplifies the inbound RF signal 148 to produce an amplified inbound RF signal.

The low noise amplifier 122 provides the amplified inbound RF signal to the IF mixing down-conversion module 118, which directly converts the amplified inbound RF signal into an inbound low IF signal or baseband signal based on a receiver local oscillation 150 provided by local oscillation module 126, which may be implemented in accordance with the teachings of the present invention. The mixing down-conversion module 118 provides the inbound low IF signal or baseband signal to the filtering/gain module 116. The filtering/gain module 116 filters and/or gains the inbound low IF signal or the inbound baseband signal to produce a filtered inbound signal. As may also be seen, baseband processor 102 is operably configured to produce a TX/Rx frequency control signal to support frequency hopping according to one aspect of the embodiments of the present invention.

The optional analog-to-digital converter 114 converts the filtered inbound signal from the analog domain to the digital domain to produce digital reception formatted data 152 in embodiments in which digitally modulated data signals are not being received. The digital receiver processing module 110 decodes, descrambles, demaps, and/or demodulates the digital reception formatted data 152 to recapture inbound data 154 in accordance with the particular wireless communication standard being implemented by radio 100. The host interface 108 provides the recaptured inbound data to the host device. As one of average skill in the art will appreciate, the wireless communication device of FIG. 9 may be implemented using one or more integrated circuits.

Figure 6:
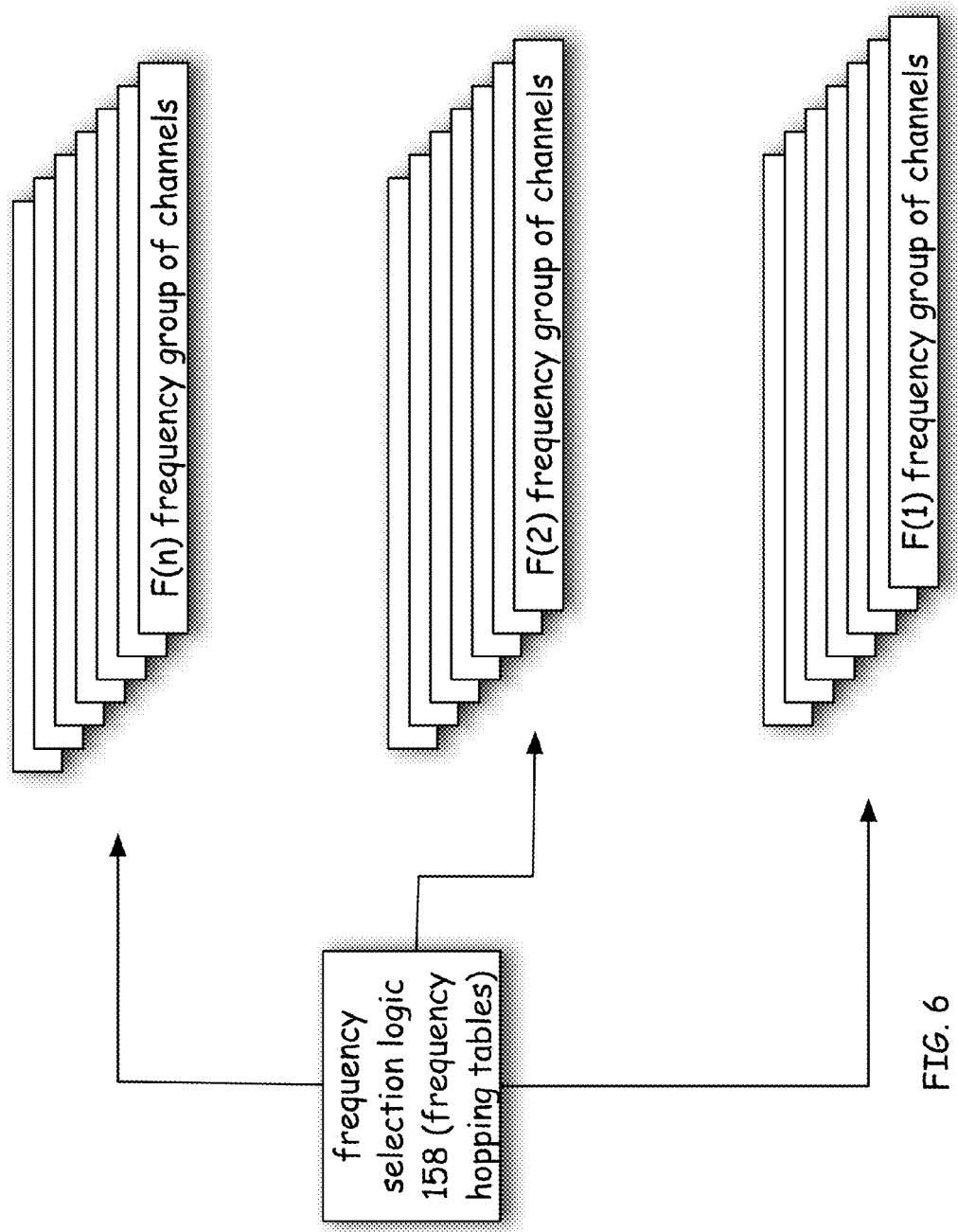
FIG. 6 is a functional diagram illustrating one aspect of the embodiments of the present invention relating to frequency selection logic.

FIG. 6 is a functional diagram illustrating one aspect of the embodiments of the present invention relating to frequency selection logic. As may be seen in relation to FIG. 6, a radio transceiver according to one embodiment of the present invention may include frequency selection logic 158 in the form of frequency hopping tables that specify what frequency channel (specific carrier frequency) is to be used out of a plurality of frequency channels for at least a portion of a transmission. As illustrated in FIG. 6, in one embodiment, the frequency hopping tables and logic include frequencies from three frequency bands. In one embodiment, those three frequency bands include 3 of 5.8 GHz, 2.4 GHz, 900 MHz and approximately 700 MHz (television white space).

Figure 7:
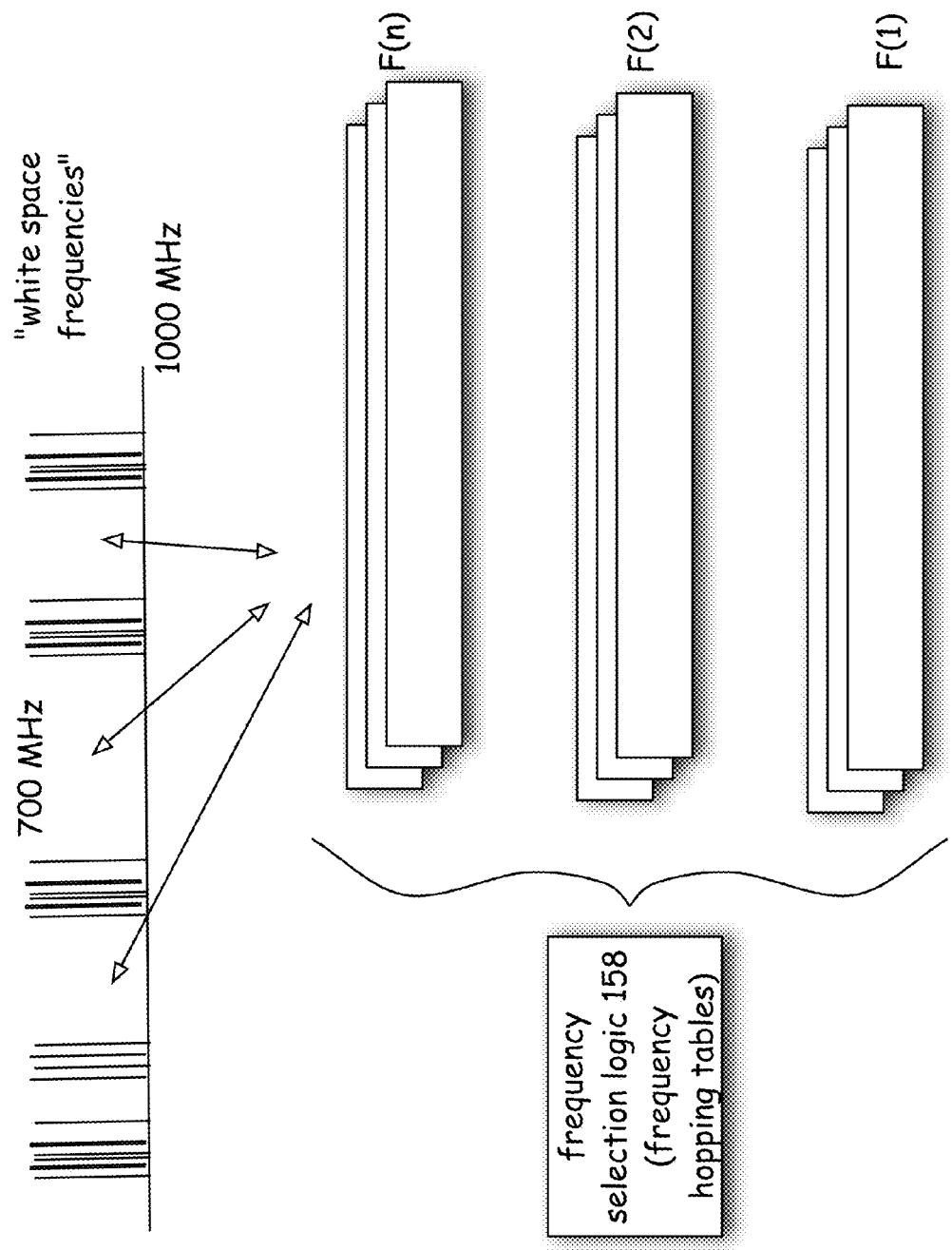
FIG. 7 is a functional diagram illustrating an additional aspect of the embodiments of the present invention relating to frequency selection logic.

FIG. 7 is a functional diagram illustrating an additional aspect of the embodiments of the present invention relating to frequency selection logic. In the embodiment of FIG. 7, one of the three frequency bands is the 700 MHz white space frequencies. The "white space" frequencies are those unused frequencies that have historically been allocated for television broadcast transmissions.

Figure 8:
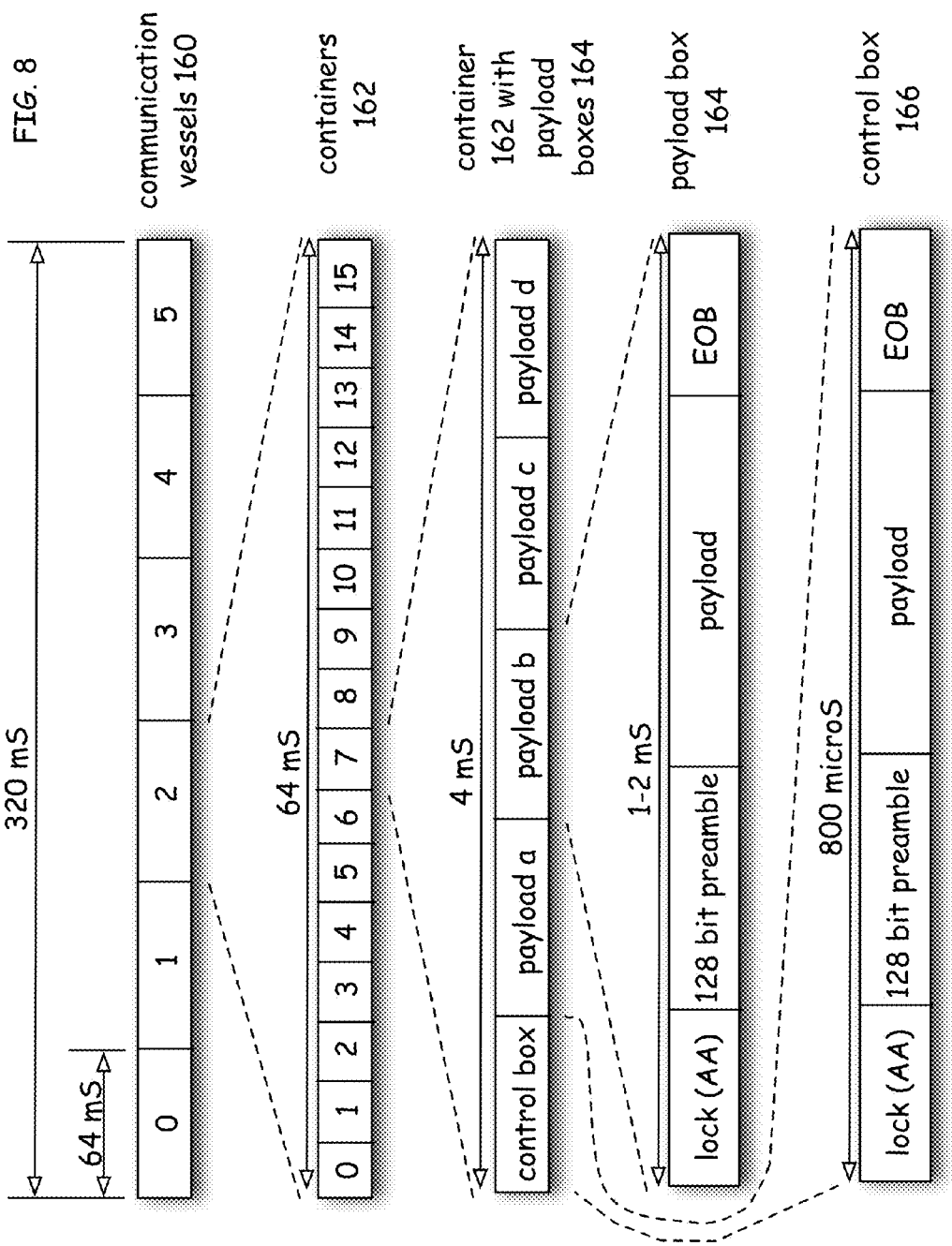
FIG. 8 is a functional diagram illustrating one aspect of the multicast communication protocol and the use of communication structures according to one embodiment of the invention.

FIG. 8 is a functional diagram illustrating one aspect of the multicast communication protocol and the use of communication structures according to one embodiment of the invention. In one embodiment of the invention, the multicast protocol defines a plurality of communication vessels 160 that includes a plurality of containers 162. In the described embodiment, one frame includes six vessels 160. Each vessel 160 includes a plurality of containers 162.

In the described embodiment, one vessel 160 includes sixteen containers 162. For wideband communications, each container 162 includes a control box 166 and a plurality of payload boxes 164. In the described embodiment, a container 162 includes four payload boxes 164 designated as a-d. Each payload box a-d includes a lock period, a 128-bit preamble, a payload, and an end of box (EOB) indication. Each control box 166 has a similar structure. Each control box includes a lock period, a 128-bit preamble, a payload and an EOB indication. For narrowband communications, an entire payload is used as a control box.

Figure 9:
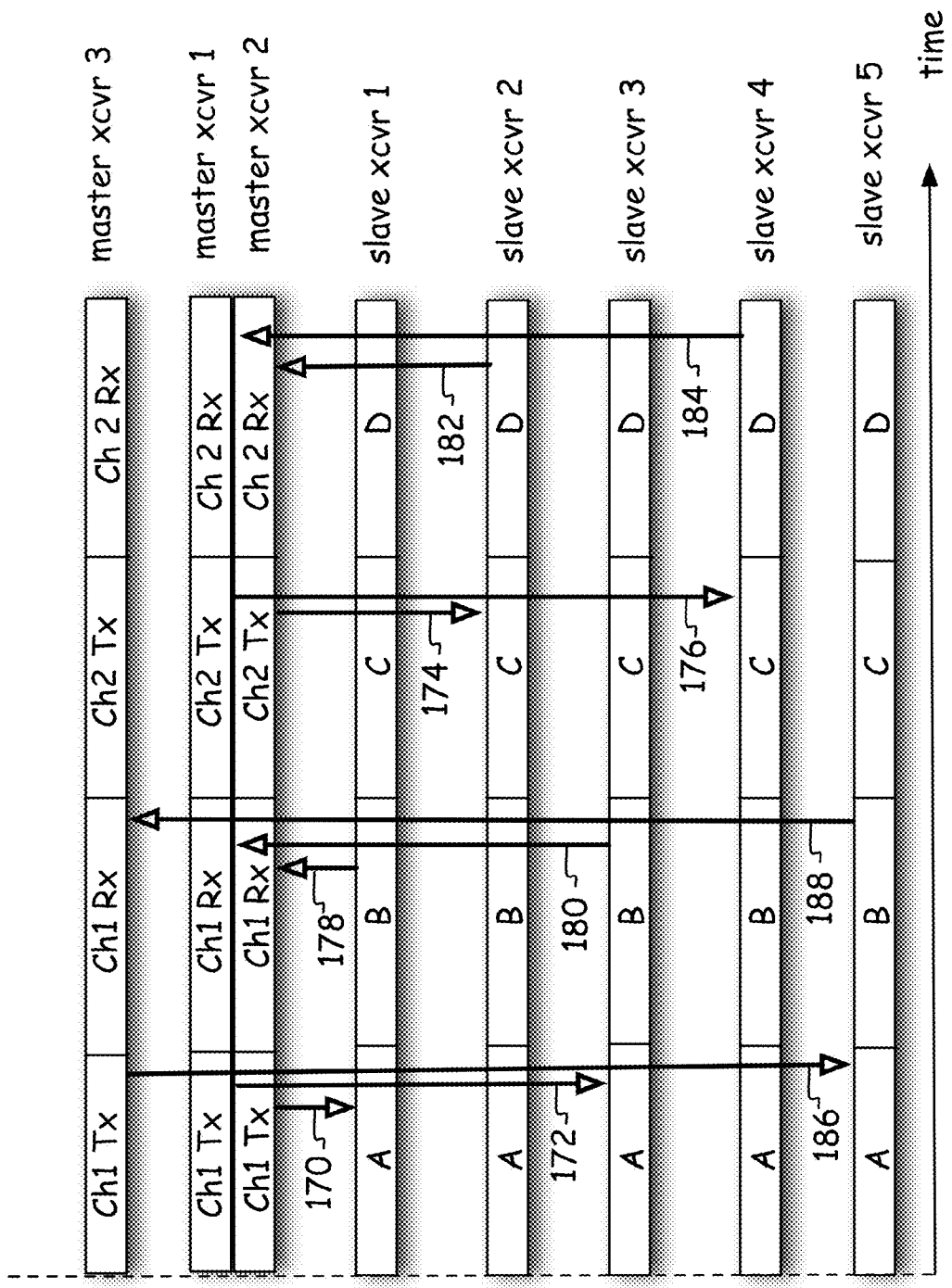
FIG. 9 is a functional diagram that illustrates synchronized communications based upon the use of the multicast communication protocols according to one embodiment of the invention.

FIG. 9 is a functional diagram that illustrates synchronized communications based upon the use of the multicast communication protocols according to one embodiment of the invention. One aspect of the present embodiments of the invention is that transmissions are highly synchronized using the vessel/container structures described in relation to FIG. 8. For example, for two stacked master transceivers 1 and 2, transmissions to four slave transceivers 1-4 are as follows.

Within the same container, master transceivers 1-2 transmit communication signals 170 and 172 during container A to slave transceivers 1 and 3, respectively. Master transceivers 1-2 transmit communication signals 174 and 176 to slave transceivers 2 and 4 during container C. Slave transceivers 1 and 3 respond with communication signals 178 and 180 during container B and slave transceivers 2 and 4 respond with communication signals 182 and 184 during container D.

Similarly, if there is a third master transceiver 3 that is proximate to master transceivers 1-2, that wishes to communicate with a slave transceiver 5, transceiver 3 will transmit communication signal 186 to slave transceiver 5 during container A (or container C) and will receive communication signal 188 as a reply from slave transceiver 5 during container B (or container D). One aspect of what is shown in FIG. 9 is that outgoing transmissions occur during common periods and ingoing transmissions are received during common periods. The vessel/container structure illustrated is utilized to synchronize outgoing and ingoing communications between various transmitters and receivers to reduce noise/interference. Another aspect that should be noted is that containers can carry outgoing as well as ingoing signals.

Figure 10:
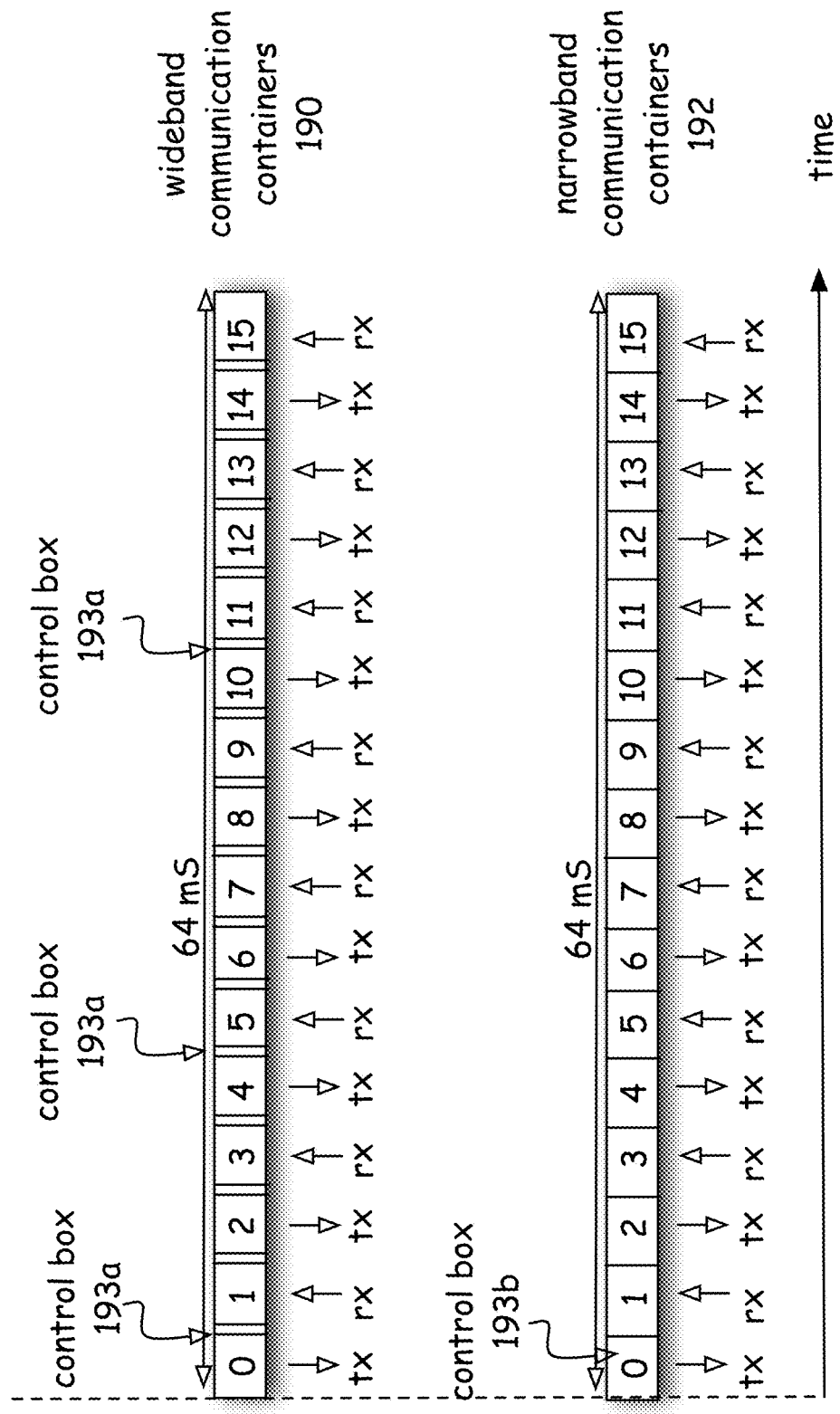
FIG. 10 is a functional diagram that illustrates synchronized communications for narrowband and wideband communications according to one embodiment of the invention.

FIG. 10 is a functional diagram that illustrates synchronized communications for narrowband and wideband communications according to one embodiment of the invention. One key aspect to note about FIG. 10 is that the containers for wideband and narrowband communications are sized the same and are synchronized in time and direction (as with the wideband containers of FIG. 8). Thus, narrowband and wideband communications are timed to not interfere with each other with the so-called Near-Far problem that is well known in the art.

As may be seen, wideband communication containers 190 are sized similarly to narrowband communication containers 192 and are synchronized in time and transmission direction (outgoing and ingoing). Furthermore, each wideband container 190 includes a control box 193a. Control box 193a is for carrying control signals such as destination addresses, transmission data rate, transmission frequency, an indication of transmit or receive, etc. Because data rates and frequencies can change from container to container, a control box is disposed between each container to provide a settle time in addition to the described control signaling.

Because of the nature of the narrowband communication, namely, relatively low data rates, an entire container is used as a control box. Thus, as shown, a control box 193b is shown occupying time slot 0 of narrowband communications 192. In the described embodiment, the sixteen containers 0-15 are 64 mS long in one embodiment of the invention. In one embodiment, the control boxes are generated using code division multiple access (CDMA) communications to avoid collisions because they could be transmitted by multiple devices as the same time seeking access.

Figure 11:
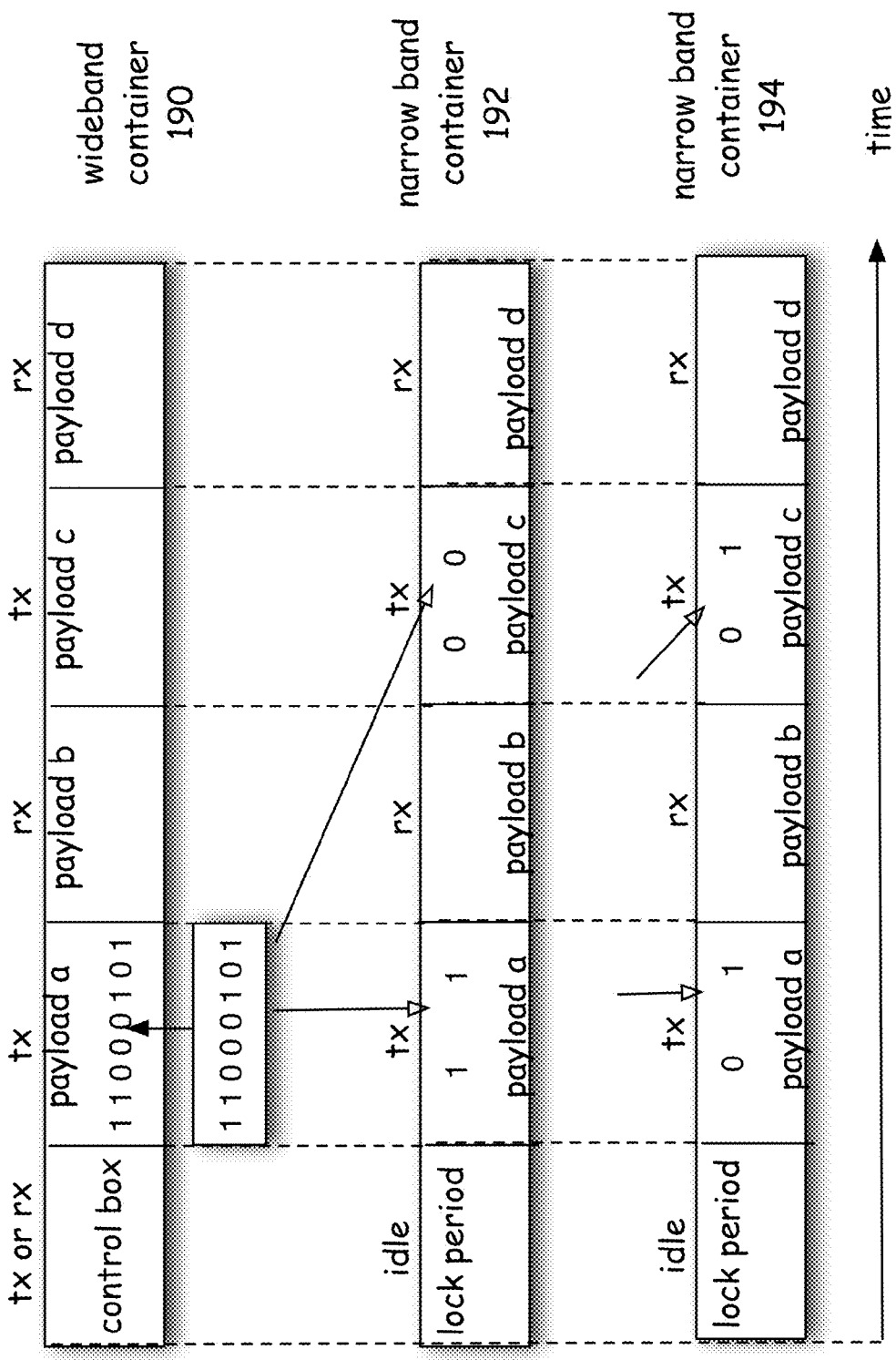
FIG. 11 is a functional diagram that illustrates data carrying in wideband and narrowband communications using multicast communication protocols according to one embodiment of the invention.

FIG. 11 is a functional diagram that illustrates data carrying in wideband and narrowband communications using multicast communication protocols according to one embodiment of the invention. As shown in FIG. 8, an exemplary container size is 4 mS in duration. As such, a wideband container can carry, for example, 3200 bits within the payload section. A 3200-bit block of data that can be transmitted via wideband communications, however, must be spread out over a plurality of narrowband containers. In one application, each narrowband container can carry approximately 64 bits of data thereby requiring 50 narrowband containers to carry the same amount of data in one wideband container. This assumes a 20 kilobits per second (kpbs) narrowband transmission rate. In some narrowband embodiments, the narrowband transmission rate is 10 kpbs meaning that a container can only carry 32 bits of payload.

As may also be seen, the narrowband container 192 and 194 include a lock period that is aligned in time with the control box of wideband container 190. Because the containers are commonly sized and synchronized, however, both wideband and narrowband transmissions and receptions occur synchronously thereby eliminating interference between the ingoing and outgoing transmissions regardless of whether they are narrowband or wideband. FIG. 11 illustrates this aspect of the inventive embodiments.

Additionally, because payload sections alternate between "TX" and "RX", and because the data shown cannot all be transmitted during one narrowband container payload, it may be necessary, as shown, to distribute all of the data that fits in one wideband container payload box into a plurality of narrow band containers and associated payload boxes. As may be seen, the outgoing data is only inserted in to "TX" payload boxes. The example shows eight bits for simplicity being distributed among the multiple narrowband containers. It should be understood that each narrowband container carries substantially more data that a few bits as shown.

Figure 12:
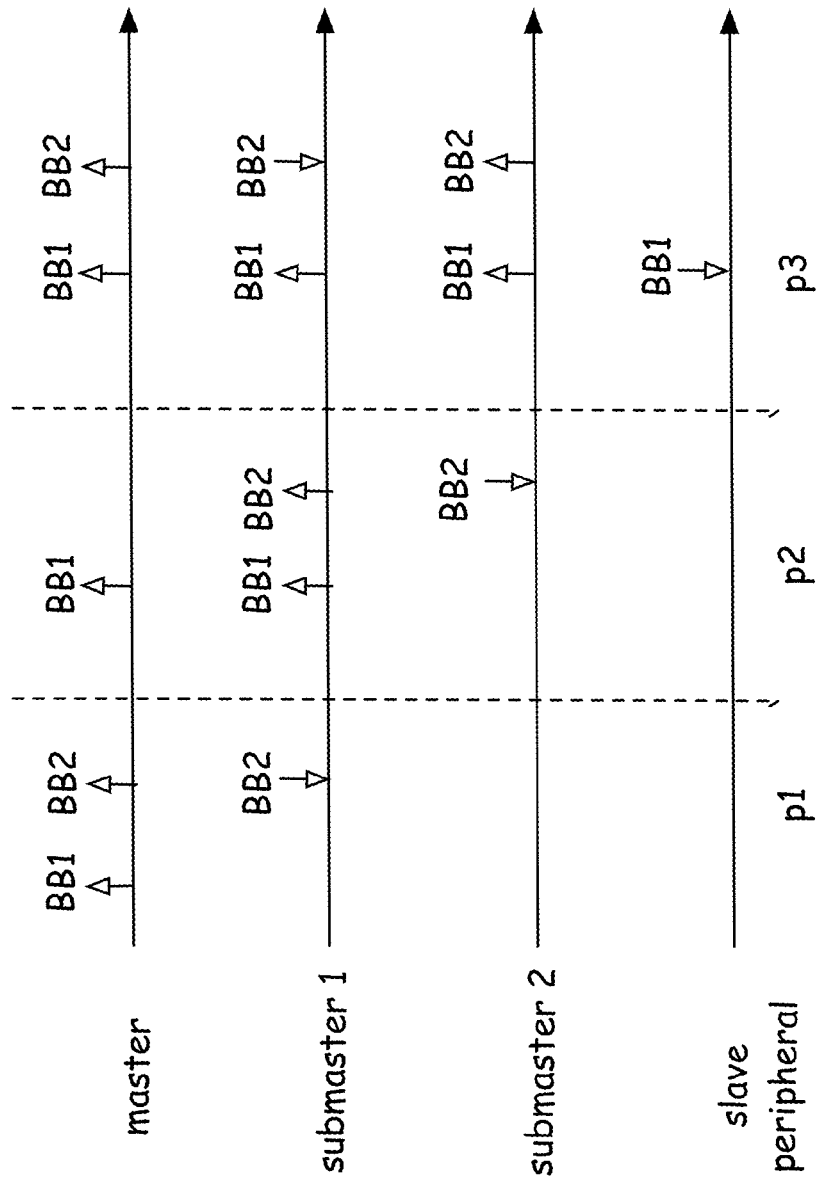
FIG. 12 illustrates a method for synchronizing a plurality of devices according to one embodiment of the invention.

FIG. 12 illustrates a method for synchronizing a plurality of devices according to one embodiment of the invention. In a first time period p1, a network master generates a synchronization signal BB1 and a relay signal BB2. BB1 is a timing signal for all slave devices that are served by the network master (including sub masters). All transmissions and receptions by the slave devices are in relation to the BB1 signal timing. BB2 is a relay signal that is received by sub masters and passed on to other sub masters. According to the protocol of the embodiments of the invention, a device that is a slave to a master, e.g., sub master 1 is a slave device to the master but is a master to sub master 2, may act as a master to other slave devices and sub masters.

When sub master 1 receives relay signal BB2 from the master, sub master 1 is configured to set its internal clock(s) and to subsequently generate its own BB1 signal to its slaves at the same time that the master generates its BB1 signal. Moreover, sub master 1 is able to generate a BB2 signal in a synchronized manner with the Master device. This is demonstrated in time period p3. In time period p3, the master, sub master 1 and sub master 2 all generate BB1 beacon signals at the same time. Slave peripheral receives BB1 transmitted by sub master 2 at the same time. Accordingly, all four devices work on a synchronized clock. Generally, the above process continues between each master and sub master until a BB1 signal is being received by all slave devices that are not masters (i.e., are not sub masters) to any other slave devices. As such, all devices are synchronized and only communicate during designated transmission periods and receive during receive periods. This allows devices to reduce and/or eliminate the near-far interference problem.

Figure 13:
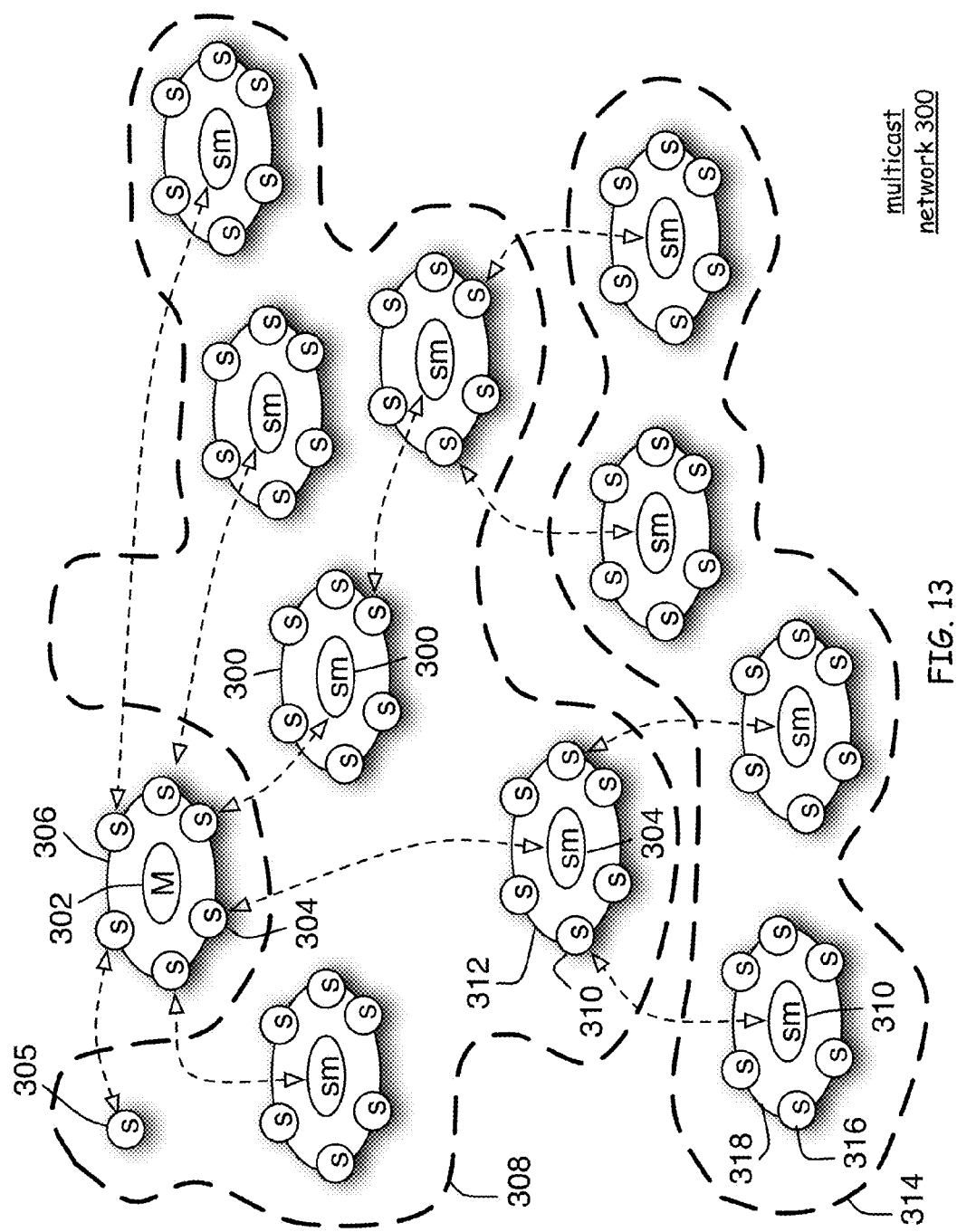
FIG. 13 is a functional block diagram of a wireless packet data network according to one embodiment of the invention.

FIG. 13 is a functional block diagram of a wireless packet data network according to one embodiment of the invention. Referring now to FIG. 13, a wireless communication device 302 is configured to operate as a super cell master. A first plurality of wireless communication devices 304 are configured to operate as slave devices in relation to communications with the super cell master 302 within cell 306. Second plurality 308 of wireless communication devices 310 that are operably disposed within second pluralities of cells 312 and configured to operate as slaves in relation to associated wireless communication devices of the first plurality of wireless communication devices. The first plurality of wireless communication devices are further configured to operate as masters for each of the associated second pluralities of wireless communication devices and cells. Each cell master (or sub master) of the cells 312 is a slave device to super cell master 302 in cell 306. A third plurality 314 of wireless communication devices 316 are operably disposed within third pluralities of cells 318 and configured to operate as slaves in relation to associated second pluralities of wireless communication devices 310. The second plurality of wireless communication devices 310 are further configured to operate as masters for each of the associated third pluralities of wireless communication devices 316 and cells 318.

To explain more simply, super cell master 302 is a master to each of the slave device is 304 within the cells 306. Each of the slave devices 304 is a master to each of the slave devices 310 within cells 312. Each of the slaves 310 either is configured to operate exclusively as a slave, or as a master to slaves 316 within cells 318. The slaves 316 of cells 318 then may operate either exclusively as cells or as masters to other cells.

In one embodiment, each of the slaves 316 comprises a sensor configured to communicate wirelessly with the associated masters 310. One aspect of the embodiment illustrated in FIG. 13, is that except for the super cell master, every device that operates as a master also operates as a slave in relation to a higher-level master. Thus, these masters may be referenced herein as sub-masters. One reason for this topology, is that it supports high levels of synchronization between the various devices to support synchronized transmissions and reception of transmissions by remote devices.

Previously, in relation to FIG. 12, a method for synchronizing communication devices with the use of synchronization beacons and relay beacons was discussed. Referring again to FIG. 13, the transmission of the synchronization and relay beacons occurs between the pluralities of communication devices arranged as shown in FIG. 13.

Each sub master of FIG. 13 receives the relay beacons from its master to determine the timing of the synchronization beacons that it produces to its slave devices. As sets, all slave, sub master and super cell master devices shown in FIG. 13 operate on a synchronized clock and synchronized transmission and reception windows. More specifically, these transmission and reception windows were shown before and described as vessels, containers, etc. Each of the sub master slave devices, therefore, receives relay beacon signals from its cell master and generates relay beacon signals to its associated slave devices that also are sub masters for their associated cells. Because all of the relay beacon signals are generated at the same time to the slave devices that are also sub Masters, each of these sub master slave devices is configured and operable to generate synchronization beacon signals that are synchronized with the synchronization beacon signals generated by the super cell master.

To reduce the possibility of signal collisions, each of these sub master slave devices generates the synchronization beacon signals at different frequencies in relation to each other and based on the prior received relay beacon signals. The synchronization relay signals, however, are transmitted at the same frequency between masters and slaves in a cell. One additional aspect that this circuit topology supports is that each slave device is only required to know who its master is. Accordingly, communication signals that are intended for devices that are external to its associated cell are merely transmitted to the master for additional forwarding.

Each master, or more accurately, sub master, will forward a received communication either to a slave device within its cell or to its own master. When a communication signal reaches the super cell master, then the super cell master will determine where to forward the communication. In the described embodiment, only the super cell master has an address table to track the locations of the slaves and sub masters within its super cell.

In one embodiment of the invention, the synchronization signals are transmitted every 16 milliseconds. In an alternative embodiment, since synchronization signals transmitted every four milliseconds. Another aspect of the embodiment of FIG. 13, is the each of the first, the second and the third pluralities of wireless communication devices each has a common group code within the associated pluralities and wherein all wireless can mutation devices associated with the super cell master have a common master code.

Figure 14:
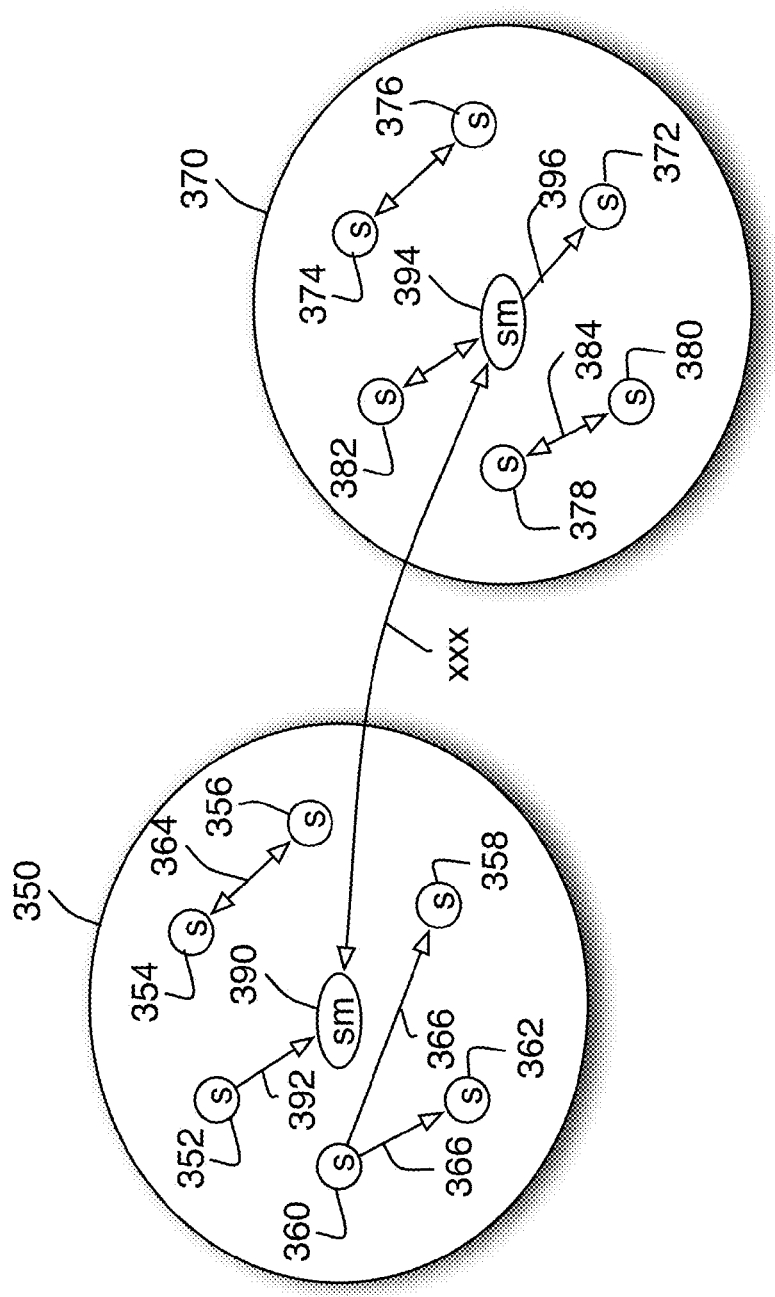
FIG. 14 is a functional network diagram illustrating one aspect of communications in a multicast protocol communication network according to one embodiment of the invention.

FIG. 14 is a functional network diagram illustrating one aspect of communications in a multicast protocol communication network according to one embodiment of the invention. Referring now to FIG. 14, a cell 350 has a plurality of slave devices 352-362. One aspect of the present invention, is that wireless communication devices may communicate with each other directly and do not need to utilize network resources to complete a communication link. Thus, as may be seen, wireless communication device 354 may communicate directly with wireless can mutation device 356 via communication link 364. Another aspect of the embodiments of the present invention, is that the wireless communication devices can also perform broadcast transmissions to a plurality of wireless communication devices. This is shown in FIG. 14. Wireless communication device 360 is generating a broadcast transmission 366 to wireless communication devices 358 and 362.

A cell 370 includes a plurality of slave devices 372-382. Cell 370 includes slaves that operate similarly to those of cell 350. As maybe seen, slave 374 is communicating directly with slave 376. Slave 378 is communicating directly with slave 380 via communication link 384.

As discussed previously, if a wireless communication device wishes to transmit a committee cases signal to a wireless communication device that is not within the same cell, the wireless communication device produces the communications signal with a destination address to its cell master. Thus, if slave 352 wishes to transmit a communication signal to slave 372 of cell 370, slave 352 forwards that communication signal to its sub master 390 via a wireless communication link 392. In one embodiment, such a communication is forwarded all the way up to the super cell master. The super cell master then uses an address table to determine where to forward the communications. Alternatively, a sub master 390 is configured to communicate with the cell super master to obtain an address and then to forward directly the sub master 394 for deliver to slave 372. Sub master 390, which is the master of cell 350, then forwards the communication to sub master 394, which is the master of cell 370. Sub master 394 then forwards the communication to slave 372 via communication link 396.

Figure 15:
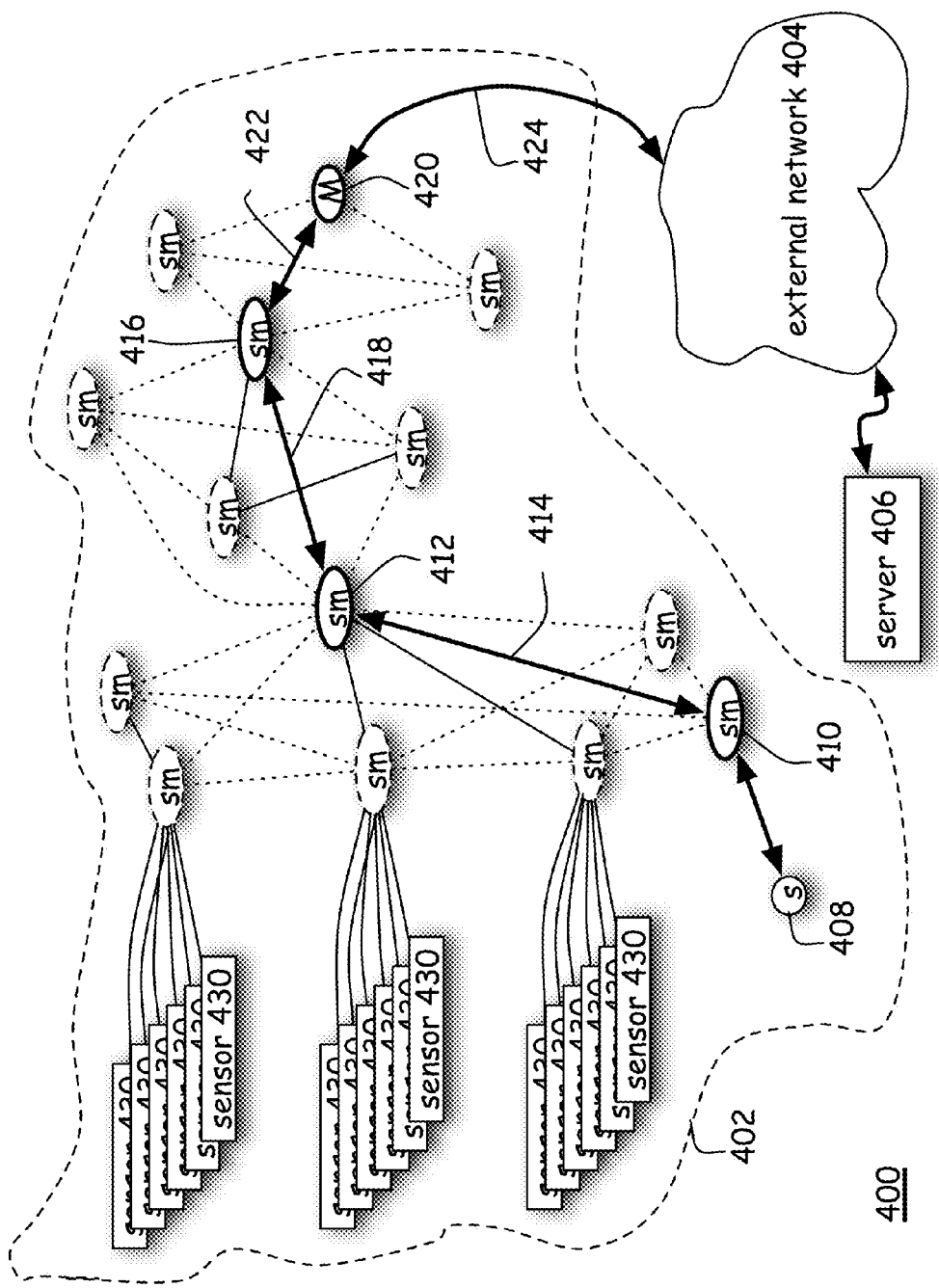
FIG. 15 is a functional block diagram that illustrates one aspect of the present invention.

FIG. 15 is a functional block diagram that illustrates one aspect of the present invention. Referring now to FIG. 15, a wide area network 400 includes a multicast network 402 that is communicatively coupled to an external network 404 that, in turn, is coupled to a server 406. Within multicast network 402, a slave 408 that wishes to transmit a communication signal to an external server 406 is not required to know how to route the mutations signal through multicast network 402 to access external network 404 to reach server 406. Slave 408 merely forwards the communications signal to its master, which is shown as sub master 310 with the destination address of server 406. Sub master 310, upon realizing that the communication signal is not for any of its own slave devices, forwards the communications signal to its master that is shown as sub master 412 via communication link 414. Sub master 412, upon realizing that the communications signal is not for any of its own slave devices/communication signal to sub master 416 via communication link 418. Similarly, sub master 416, upon realizing that the communication signal is not for it or any of its slave devices, forwards the communication signal to master 420 via communication link 422. Master 420, upon receiving the communication signal, is able to determine using an address table to route the communication signal via communication link 424 to an external network 404 and to server 406 that is operably coupled to external network 404. The address table is updated to keep location of the devices within super cell served by master 420.

To illustrate the operation in FIG. 15, the slave devices 430 comprise, in one embodiment of the present invention, a plurality of sensors 430. Each of the sensors 430 is associated with a sub master. Thus, in one example of the invention, the sensors 430 will periodically produce to communication signals that includes sensor data that is to be delivered to server 406 via the multicast network 402.

Figure 16:
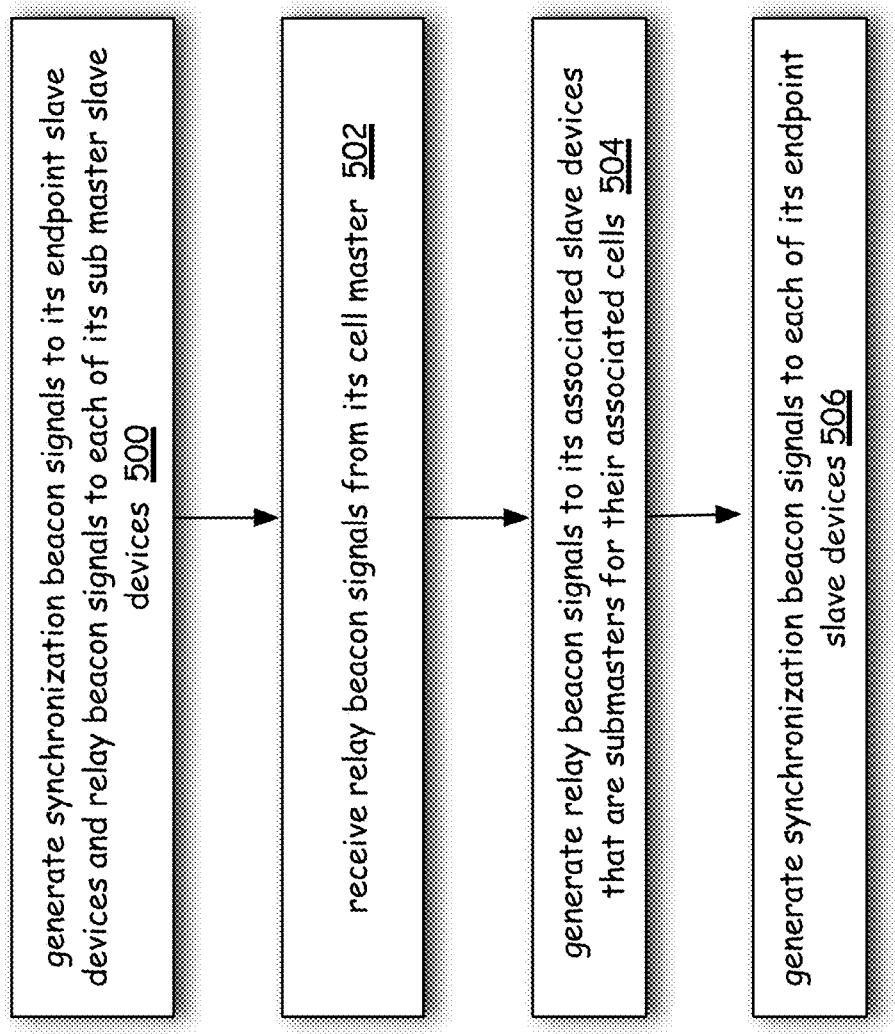
FIGS. 16-18 are flow charts that illustrate various method steps for various embodiments of the invention.
Figure 17:
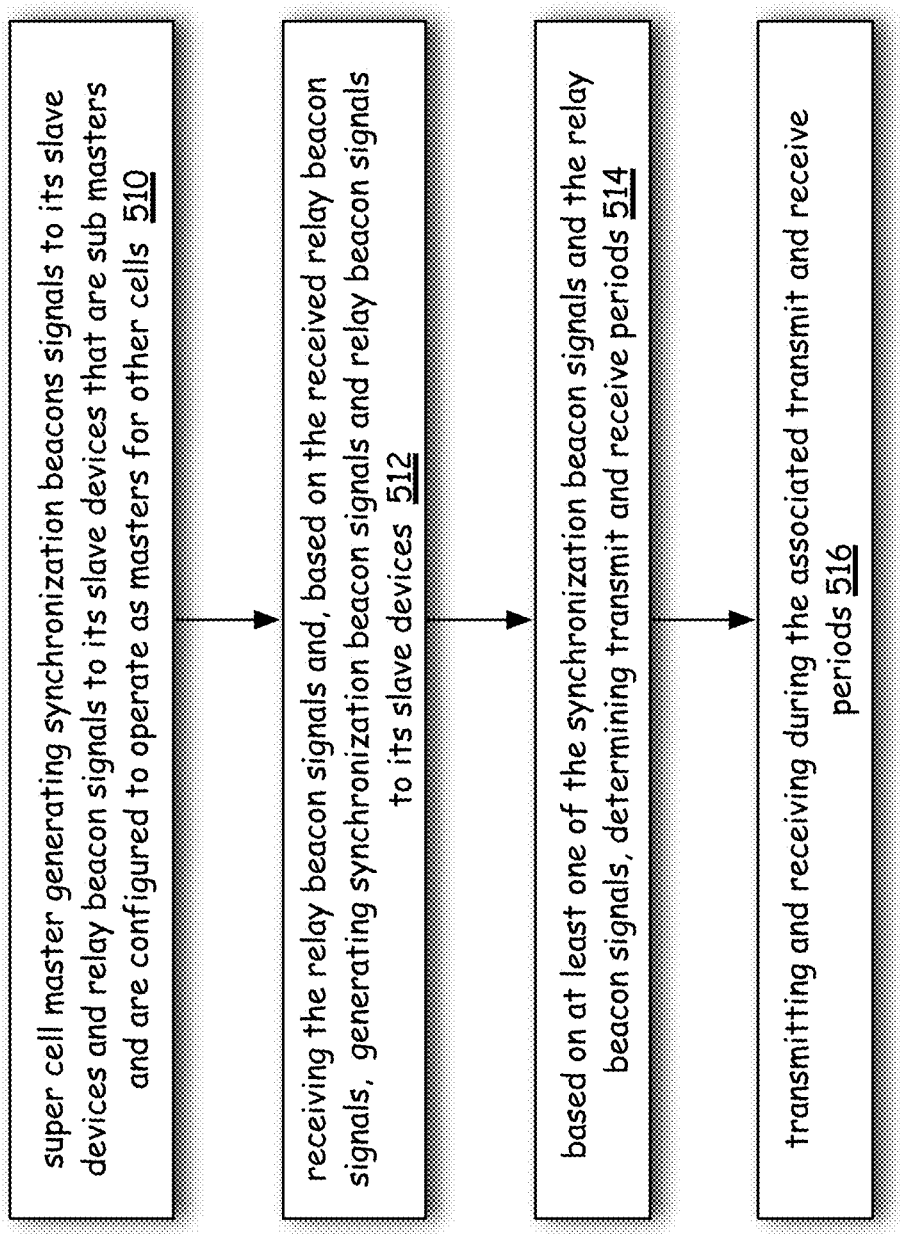
Figure 18:
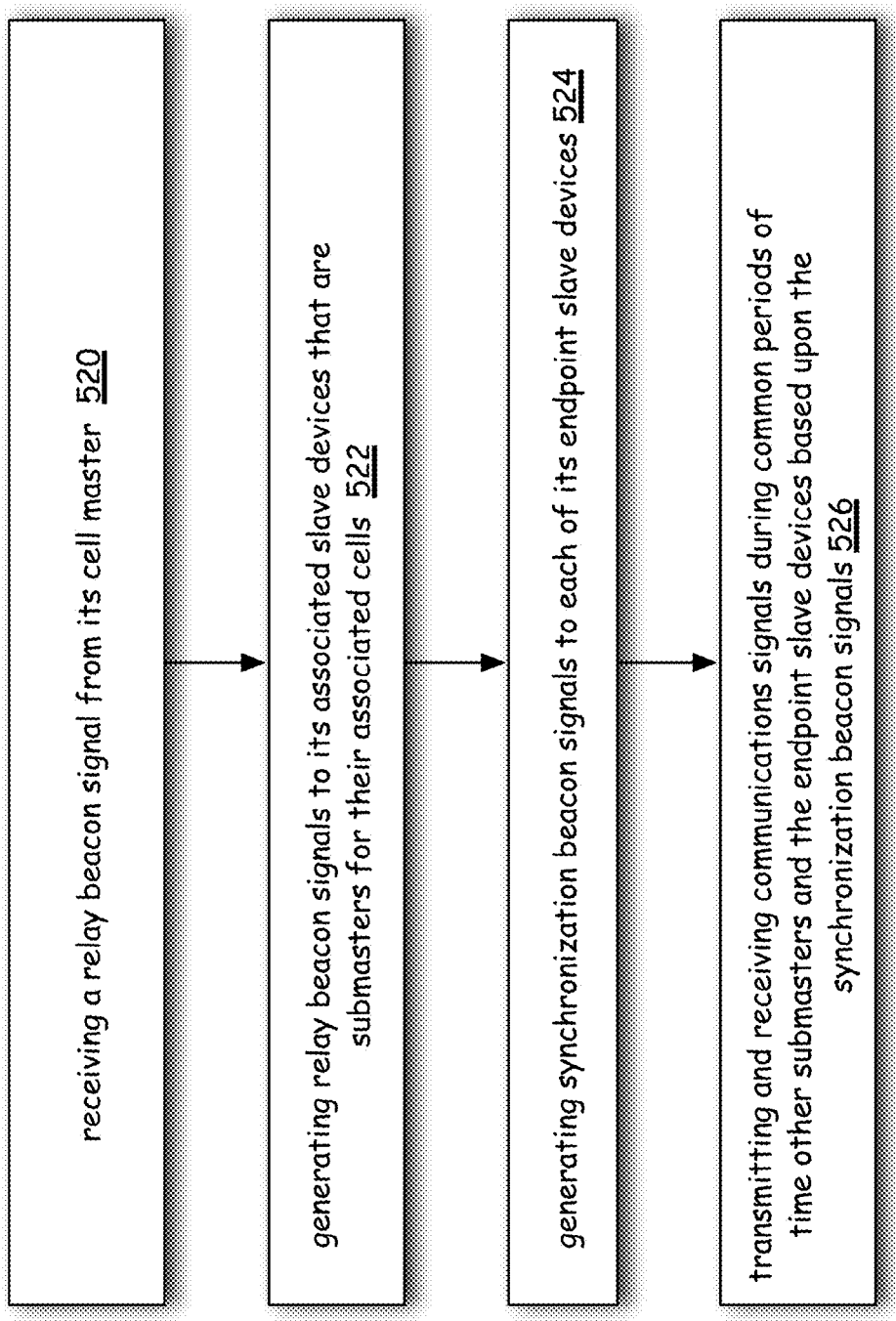

FIGS. 16-18 are flow charts that illustrate various method steps for various embodiments of the invention. In FIG. 16, the method includes generating synchronization beacon signals to its endpoint slave devices and relay beacon signals to each of its sub master slave devices (step 500). Thereafter, the method includes receiving relay beacon signals from its cell master (step 502). In response, the method includes generating relay beacon signals to its associated slave devices that are sub masters for their associated cells (step 504). Finally, the method includes generating synchronization beacon signals to each of its endpoint slave devices (step 506).

An alternative embodiment of an inventive method is shown in FIG. 17. In FIG. 17, the method commences with the super cell master generating synchronization beacons signals to its slave devices and relay beacon signals to its slave devices that are sub masters and are configured to operate as masters for other cells (step 510). Thereafter, the method includes receiving the relay beacon signals and, based on the received relay signals, generating synchronization beacon signals and relay beacon signals to its slave devices (step 512). Based on at least one of the synchronization beacon signals and the relay beacon signals, the method includes determining transmit and receive periods (step 514). Based on the determined transmit and receive periods, the method includes transmitting and receiving during the associated and determined transmit and receive periods (step 516).

FIG. 18 illustrates a method in a sub master according to one embodiment of the present invention. The sub master is operably disposed within a wireless data packet network that has one super cell master, a plurality of sub masters, and a plurality of end point slave devices. The method commences with the sub master receiving a relay beacon signal from its cell master (step 520). Thereafter, the method includes the sub master generating relay beacon signals to its associated slave devices that are also sub masters for their associated cells and slave devices (step 522). Thereafter, the method includes generating synchronization beacon signals each of the in point slave devices of the sub master (step 524). Finally the method includes the sub master transmitting and receiving communication signals during time and periods of time as other sub masters and in point slave devices, all based upon the synchronization beacon signals (step 526).

One aspect of the embodiment of the invention shown in FIG. 18 is that the method includes the synchronization beacon signals being synchronized and transmitted with the synchronization beacon signals generated by the super cell master. Additionally, another aspect of the embodiment of the invention is that the synchronization beacon signals are generated at different frequencies in relation to other sub masters but wherein the relay beacon signals are transmitted at the same frequency between masters and slaves within a cell.

Figure 19:
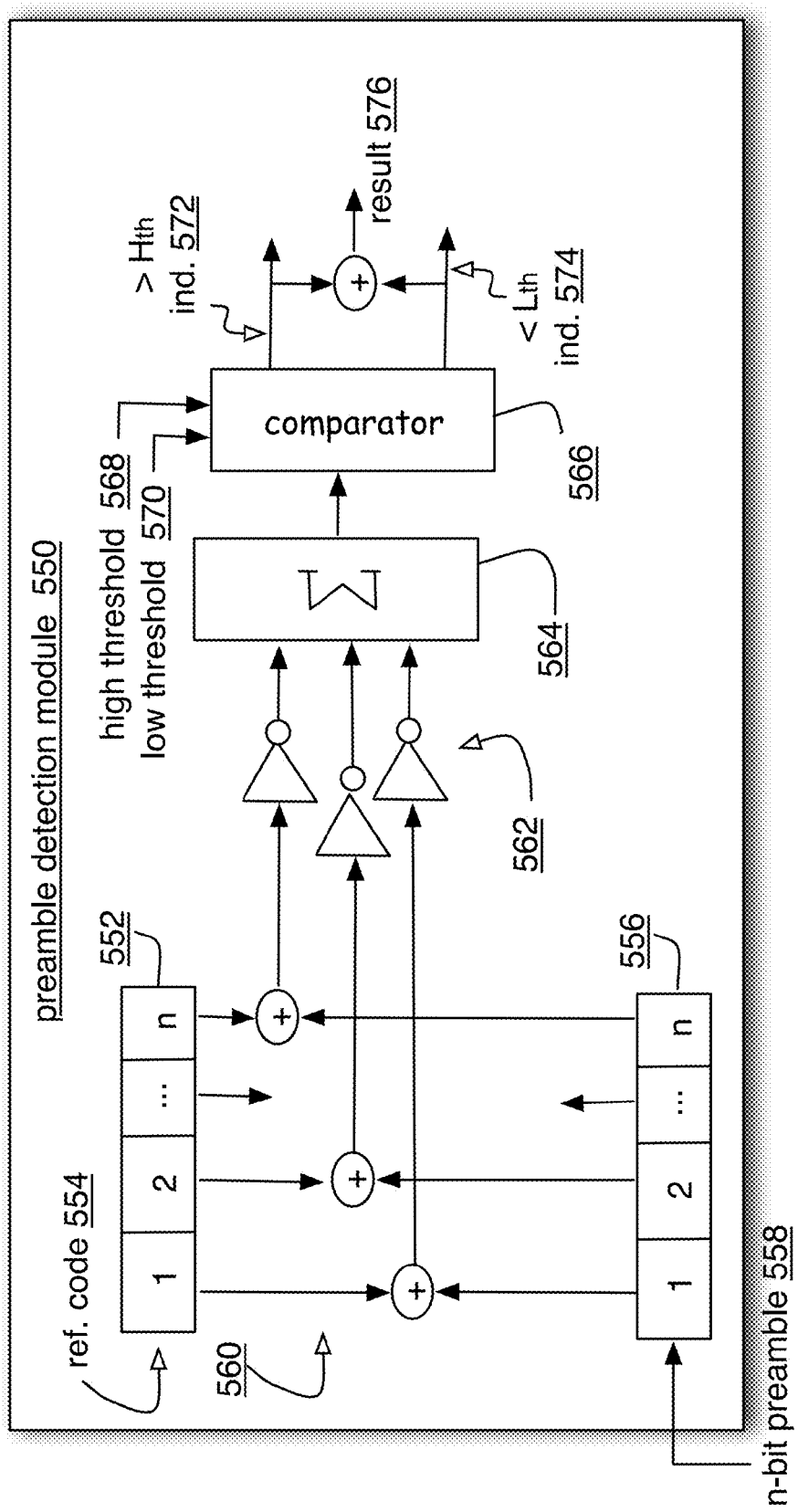
FIG. 19 is a functional block diagram of a preamble detection module according to one embodiment of the invention.

FIG. 19 is a functional block diagram of a preamble detection module according to one embodiment of the invention. A preamble detection module 550 includes a register 552 for holding a preamble reference code 554. Preamble detection module 550 also includes a register 556 for holding a received preamble 558. In the described embodiment, registers 552 and 550 are 128-bit long registers and can therefore hold preamble reference codes and preambles that are up to 128-bits long. As may further be seen, XOR circuitry shown generally at 560 is operably disposed to perform an XOR function between all of the contents, on a bit by bit basis, of registers 552 and 556. It should be understood, that while only three XOR logic circuits are shown, the embodiment of the invention of FIG. 9 includes a total of "n" XOR logic circuits. In one particular embodiment, the preamble detection module 550 is configured to receive 128-bit long preambles into compared those preambles to 128-bit long reference codes. In this embodiment, n=128. Accordingly, the embodiment includes 128 XOR logic circuits. Only three XOR logic circuits and inverters are shown in this figure for simplicity.

The output of each XOR logic circuit is produced to a corresponding inverter shown generally at 562. There are a equal number of inverters 562 and XOR logic circuits 560 in the described embodiment. The inverted outputs from each of the inverters are then produced to a summing circuit 564. Summing circuit 564 is operably coupled to a comparator 566. Summing circuit 564 produces a sum of the inverted inputs to comparator 566. Comparator 566 is operably coupled to receive a high threshold value 568 and a low threshold value 570 from an external device or logic block. In the described embodiment, comparator 566 produces at least two outputs. A first output indicates that the sum received from summing circuit 564 is greater than the high threshold. A second output indicates that the sum is less than a low threshold. The first and second outputs are also produced to an XOR circuit that produces an indication of whether a favorable comparison was found between the reference code 554 of register 552 and the received preamble stored in register 556. In operation, if the sum is either above the threshold value 568 or below the threshold value 570, result 576 will be a logic "1". If the value is lower than the high threshold 568 and higher than the low threshold 570, then the two outputs will both be a logic zero. Accordingly, result 576 will be a logic zero. In this embodiment, a logic zero output as result 576 is an indication of a favorable comparison. A logic one output as a result 576 is an indication of an unfavorable comparison.

Figure 20:
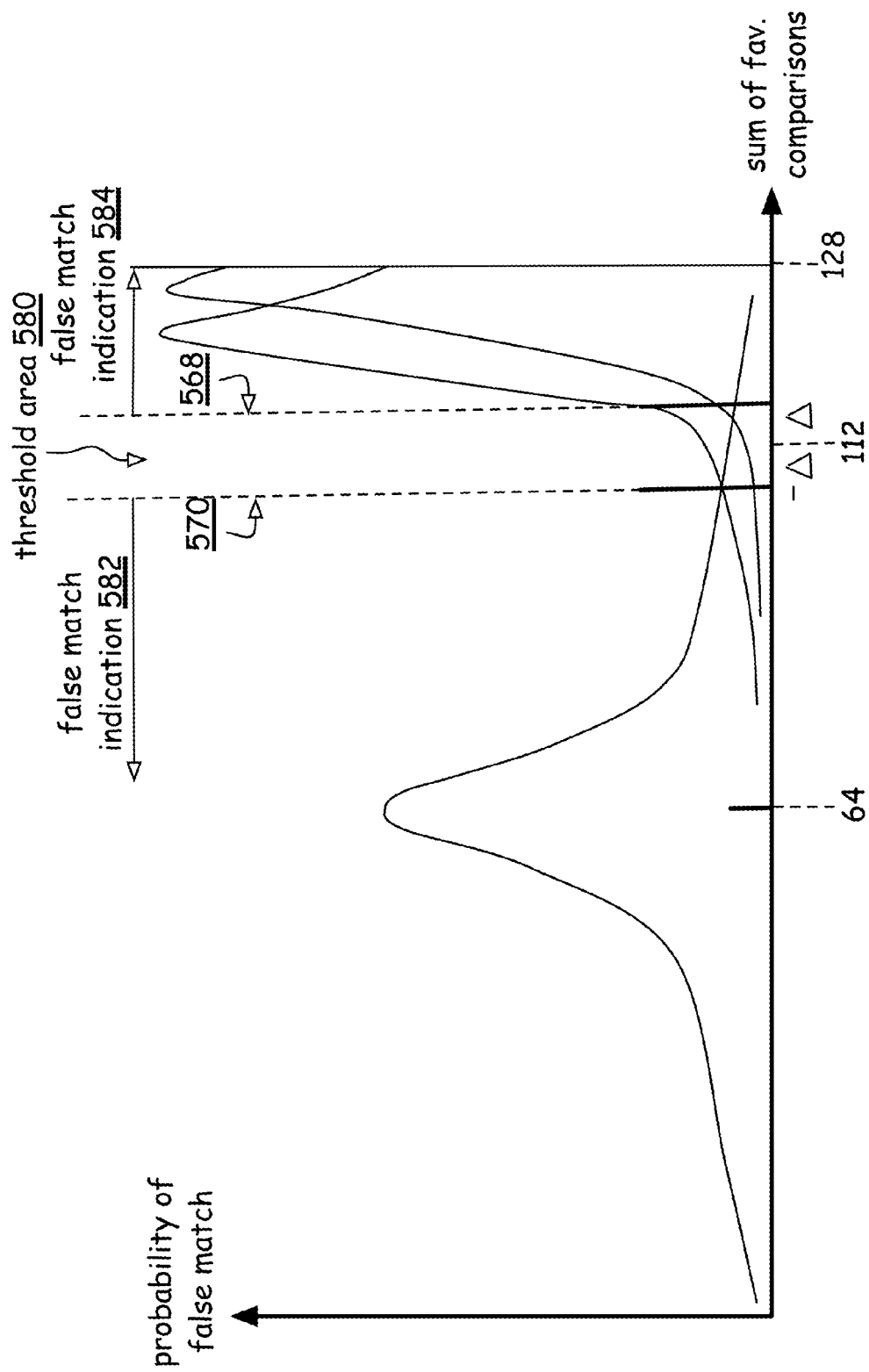
FIG. 20 is a diagram that illustrates operation according to one embodiment of the invention.

FIG. 20 is a diagram that illustrates operation according to one embodiment of the invention. As may be seen, a vertical axis a probability of a false match while a horizontal axis represents a sum of favorable comparisons. In general, for a preamble that is 128-bits long, the probability of a false match peaks for a sum of 64 as well as for sums that are nearly maximal (approximately 128). The present inventor has determined that an optimal some value that reflects a match is 112. Accordingly, the low threshold value 570 and the high threshold value 568 define a threshold area 580 that is centered at 112. Any sum that is below low threshold 570 reflects a false match indication 582 while any sum above high threshold 568 also reflects a false match indication 584. In FIG. 20, the threshold area may be defined by the optimal some value of 112+/−Δ. The value of Δ may be, for example, equal to 8. Accordingly, the low threshold value 570 would be equal to 104 while the high threshold value 568 would be equal to 120 for a Δ value of eight.

Figure 21:
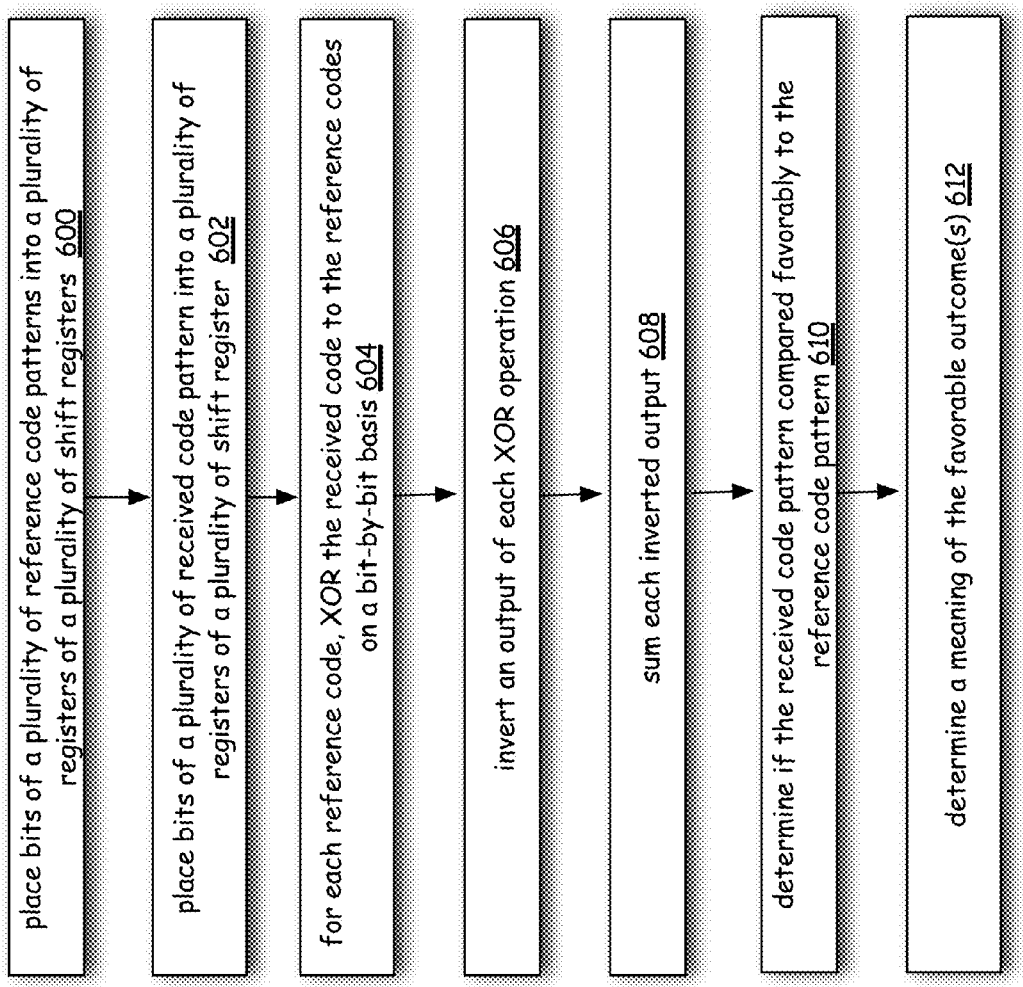
FIG. 21 is a flowchart that illustrates one embodiment of the invention for determining if a received preamble compares favorably to one of a plurality of reference codes.

FIG. 21 is a flowchart that illustrates one embodiment of the invention for determining if a received preamble compares favorably to one of a plurality of reference codes. The method includes placing bits of a plurality of reference code patterns into a plurality of registers of a plurality of shift registers (600). The method also includes placing bits of a plurality of a received code pattern (preamble) into a plurality of registers of a plurality of shift registers (602). In essence, one reference code pattern and the received preamble are each placed into two registers of each correlator circuit. The reference code patterns placed within each of the correlator circuits are different.

For each reference code, the method includes XORing the received preamble code to the corresponding reference codes on a bit-by-bit basis (604). The output of each XOR operation is then inverted (606). The inverted outputs are then produced to a summing module that generates some of all of the inverted XOR operation values (608). Subsequently, the method includes determining if the received preamble code pattern compared favorably to the reference code pattern (610). As described in relation to FIG. 20, this determination is made by evaluating the sum to see if the sun is within a range of values defined by a low threshold value and a high threshold value.

Finally, if a favorable outcome is determined, the method includes determining a meaning of the favorable outcome(s) (612). Generally, each preamble reference code pattern represents one of a data content, a control signal, a status, or a request. Accordingly, by ascertaining which preamble reference code pattern or patterns had a favorable comparison, the method includes determining a corresponding meaning or response. For example, if a preamble reference code pattern is one that represents a data content, been the method includes determining that the data content was transmitted in the form of a preamble. Alternatively, if a plurality of preamble reference code patterns are received within a specified period of time, the method includes determining an appropriate response which is based upon the fact that multiple preamble reference codes had a favorable comparison within a short and defined period of time.

Figure 22:
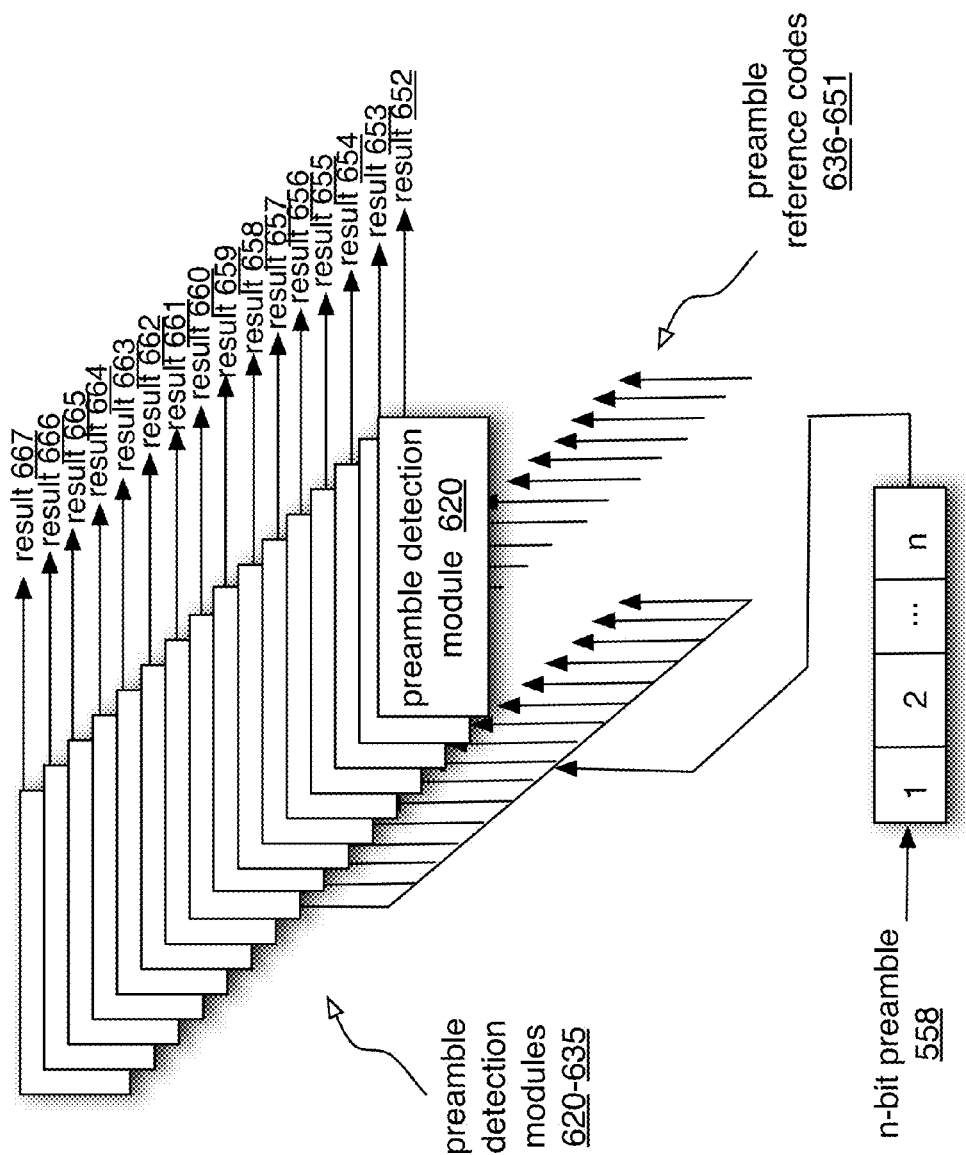
FIG. 22 is a functional block diagram of a multiple correlator system according to one embodiment of the present invention.

FIG. 22 is a functional block diagram of a multiple correlator system according to one embodiment of the present invention. In the described embodiment of the invention of FIG. 22, the multiple correlator system comprises 16 correlators, each of which is within a preamble detection module. Here in FIG. 22, 16 preamble detection modules 620-635 are each configured to receive and n-bit long preamble 558 as well as 16 preamble reference codes 636-651. The operation within each preamble detection module 620-635 is as described in relation to FIG. 19. Each preamble detection module 620-635 produces a corresponding result 652-667.

Figure 23:
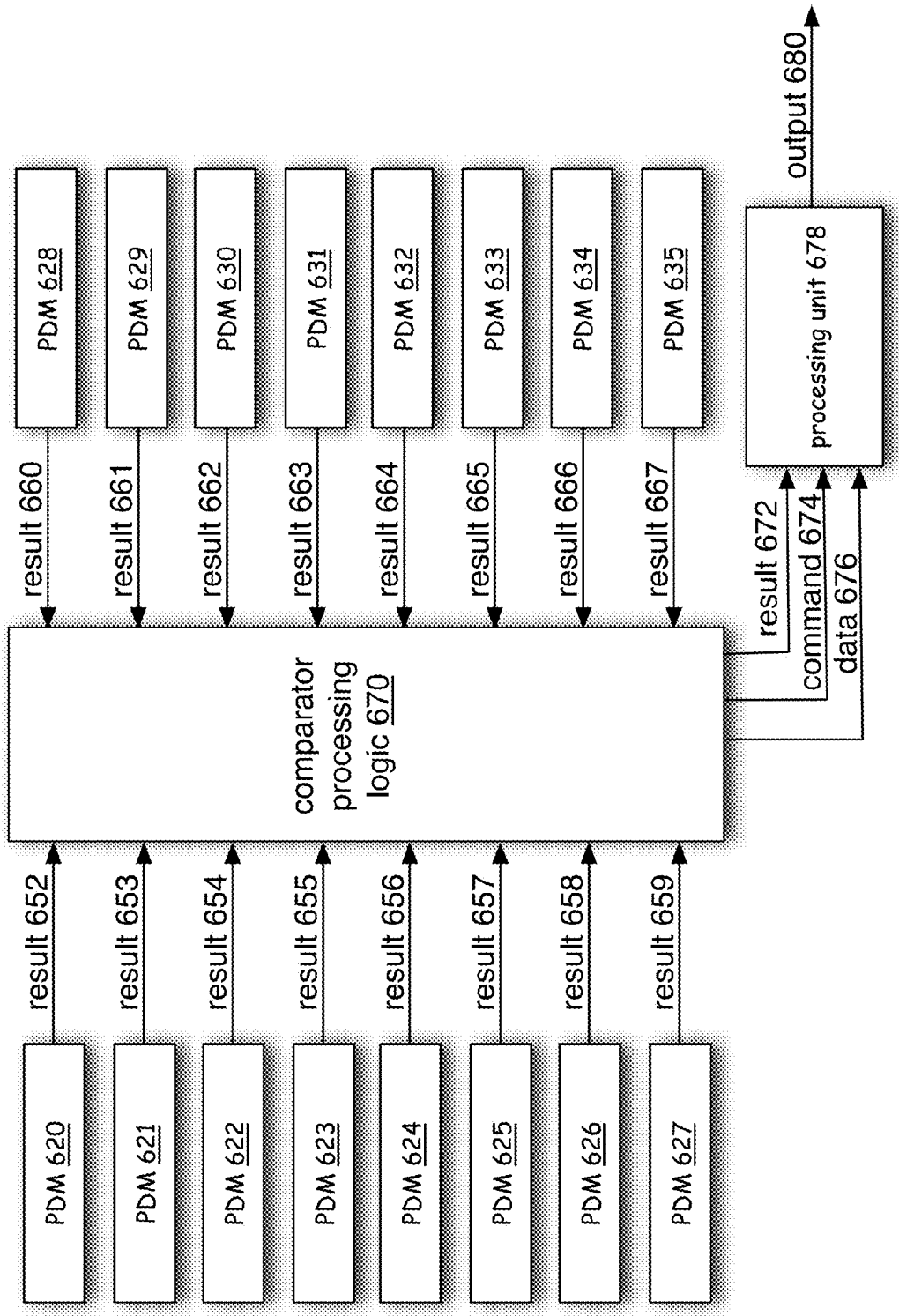
FIG. 23 is a functional block diagram that illustrates one aspect of the embodiments of the present invention.

FIG. 23 is a functional block diagram that illustrates one aspect of the embodiments of the present invention. Each of the preamble detection modules 620-635 shown in relation to FIG. 22 is also shown here. As with FIG. 22, each preamble detection module 620-635 produces an associated result 652-667. The results 652-667 are produced to a comparator processing logic 670. Comparator processing logic 670 is configured to interpret one or more results received from one or more preamble detection modules 620-635 to determine a result 672, command 674, or data 676. The result 672, command 674, and data 676 are produced by comparator processing logic 670 to a processing unit 678. Processing unit 678 then produces output 680 based on one or more of result 672, command 674, and data 676.

One aspect illustrated by the embodiment of FIG. 23, is that different combinations of results may yield different outcomes and/or outputs 680. To illustrate, if only result 652 is favorable, then a first result command or data is produced from comparator processing logic 670. If, on the other hand, both result 652 and 653 are favorable, then the output of comparator processing logic 670 will be based on the combination of the two favorable results as received via result 652 and result 653. To illustrate, if a plurality of beacon synchronization type preambles are received, comparator processing logic 670 may include operational logic that selects a closest beacon source to be its network master. Based on such a conclusion, comparator processing logic 670 produces at least one of result 672, command 674, and data 676 to processing unit 678.

Figure 24A:
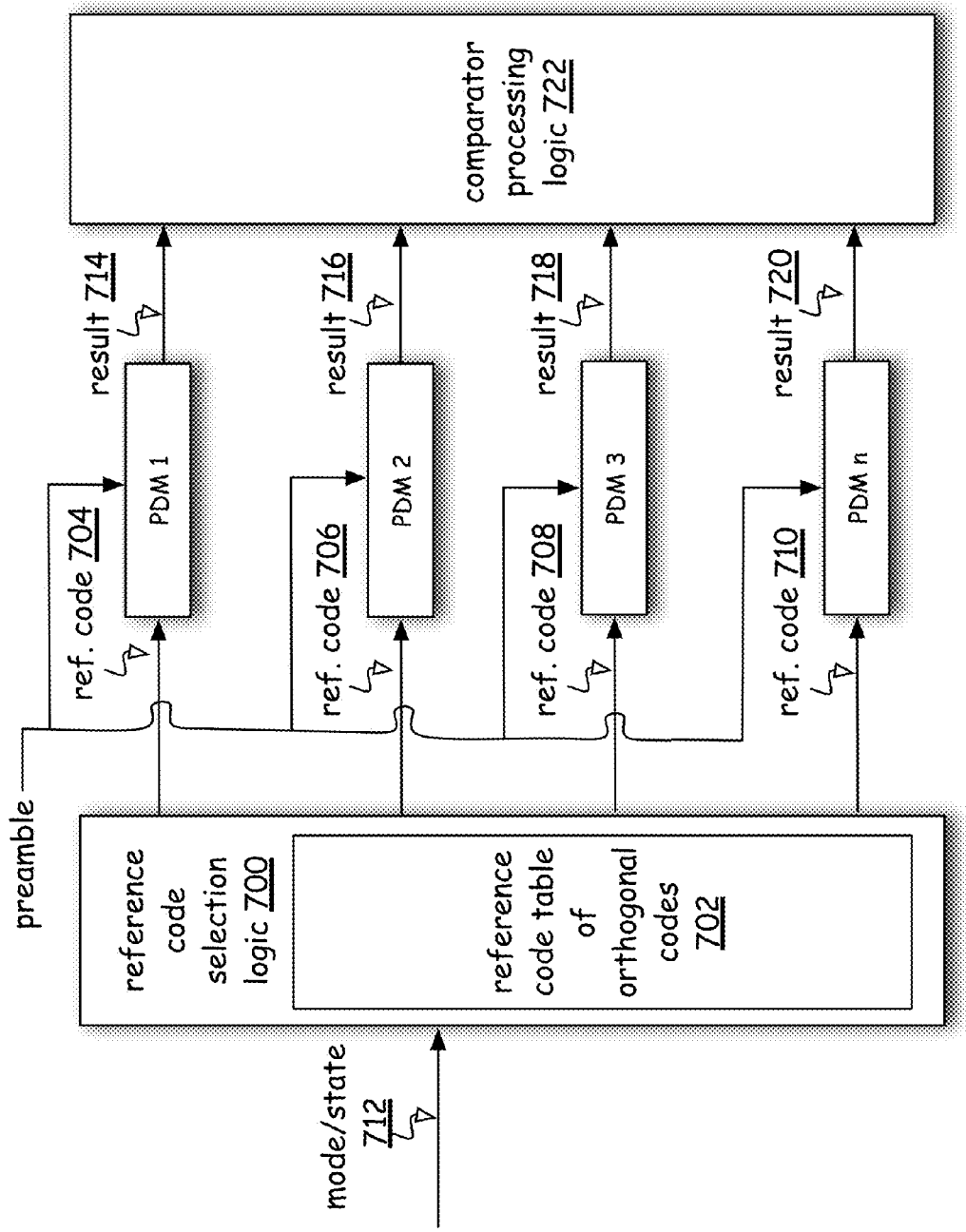
FIGS. 24A and 24B are alternative embodiments of the invention of a multi-correlator system.
Figure 24B:
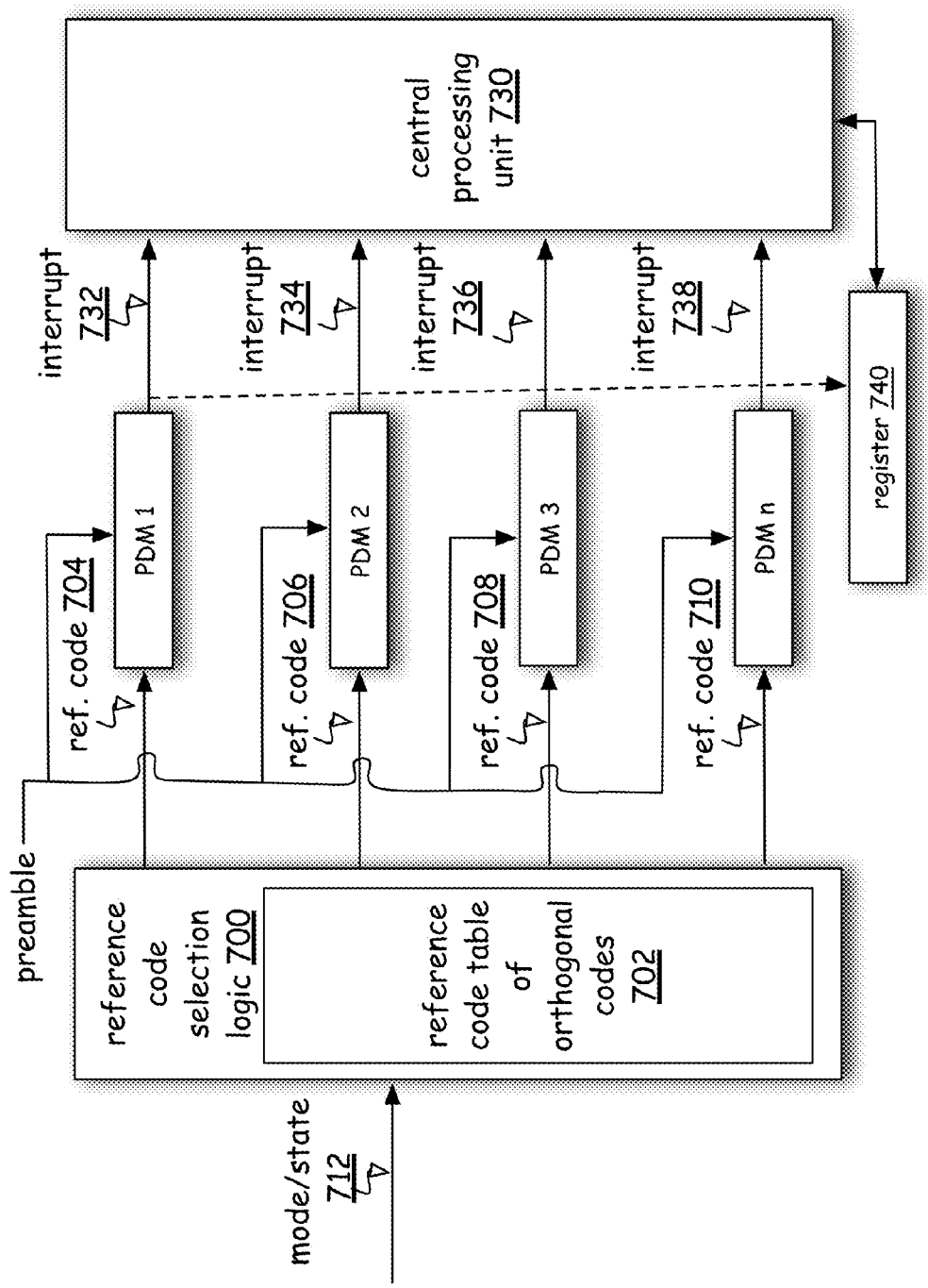

FIGS. 24A and 24B are alternative embodiments of the invention of a multi-correlator system. FIG. 24A is a functional block diagram of a multi-correlator system that loads reference codes into preamble detection modules based on a mode or state according to one embodiment of the invention. In the embodiment of FIG. 24, the multi-correlator system includes at least four correlator circuits or preamble detection modules. They are shown here as preamble detection modules 1, 2, 3 and n. It should be understood that the system can include more than for preamble detection modules. In one embodiment, system includes eight preamble detection modules. In another embodiment, the system includes 16 preamble detection modules.

Each of the preamble detection modules 1-n is configured to receive and temporarily store a received preamble in a register. The register, in the described embodiment, is a 128-bit long register. Each of the preamble detection modules 1-n also is configured to receive reference codes 704, 706, 708 and 710 from reference code selection logic 700. Reference code selection logic 700 includes a reference code table of orthogonal codes 702. The reference codes 704-710 that are produced by logic 700 are based in part upon a current mode or state 712 that is determined or specified in a received signal. Each of the preamble detection modules 1-n is operable to compare the received preamble to the loaded reference codes to produce results 714-720 to comparator processing logic 722.

In one embodiment of the invention, reference code table of orthogonal codes 702 includes 128 preamble reference codes while the system includes only 16 preamble detection modules 1-n. Accordingly, one aspect of the embodiment of the present invention is that preamble reference codes are loaded into the preamble detection modules based upon an operational mode or state. For example, in a startup mode, a plurality of preamble reference codes may be loaded to support pairing procedures with one of a plurality of optional network masters.

Alternatively, in a data mode, a plurality of preamble reference codes may be loaded into the preamble detection modules wherein each preamble reference code corresponds to a unique data value. This particular data mode has the advantage of creating a very robust transmission scheme for conveying data. More specifically, a unique 128-bit long preamble is assigned to each of a plurality of four-bit long data words in one embodiment of the invention. Alternatively, the unique 128-bit long preambles may be assigned to each of a plurality of eight bit long data words in an alternative embodiment of the invention. Generally, where 128-bit long word is used to represent a much smaller data word, a high level of robustness has been achieved.

FIG. 24B is a functional block diagram of a multi-correlator system that loads reference codes into preamble detection modules based on a mode or state according to one embodiment of the invention and that produces the results to a central processing unit. As with the embodiment of FIG. 24A, the circuitry includes the reference code selection logic 700 with table 702 and PDMs 1, 2, 3 and n. Here in FIG. 24B, however, each of the PDMs 1, 2, 3 and n produces an interrupt to a central processing unit (CPU) 730 whenever a PDM has a favorable comparison of the reference code with a received preamble. An identifier of the PDM that generated the interrupt is stored in a register 740. Central processing unit 730 is coupled to read the ID from register 740 whenever an interrupt is received from a PDM as a part of determining what preamble reference code had a favorable comparison so as to determine the meaning of the received preamble. CPU 730 may optionally communicate with logic 700 to determine what reference code was loaded into the PDM that generated the favorable result. In an alternative embodiment, the PDM generates a reference code identifier that is produced to register 740 to enable CPU 730 to immediately determine what preamble reference code had a favorable comparison. In this embodiment, CPU 730 has access to the 128 reference code identifiers and associated meanings/values for determining a meaning associated with a received interrupt.

Figure 25:
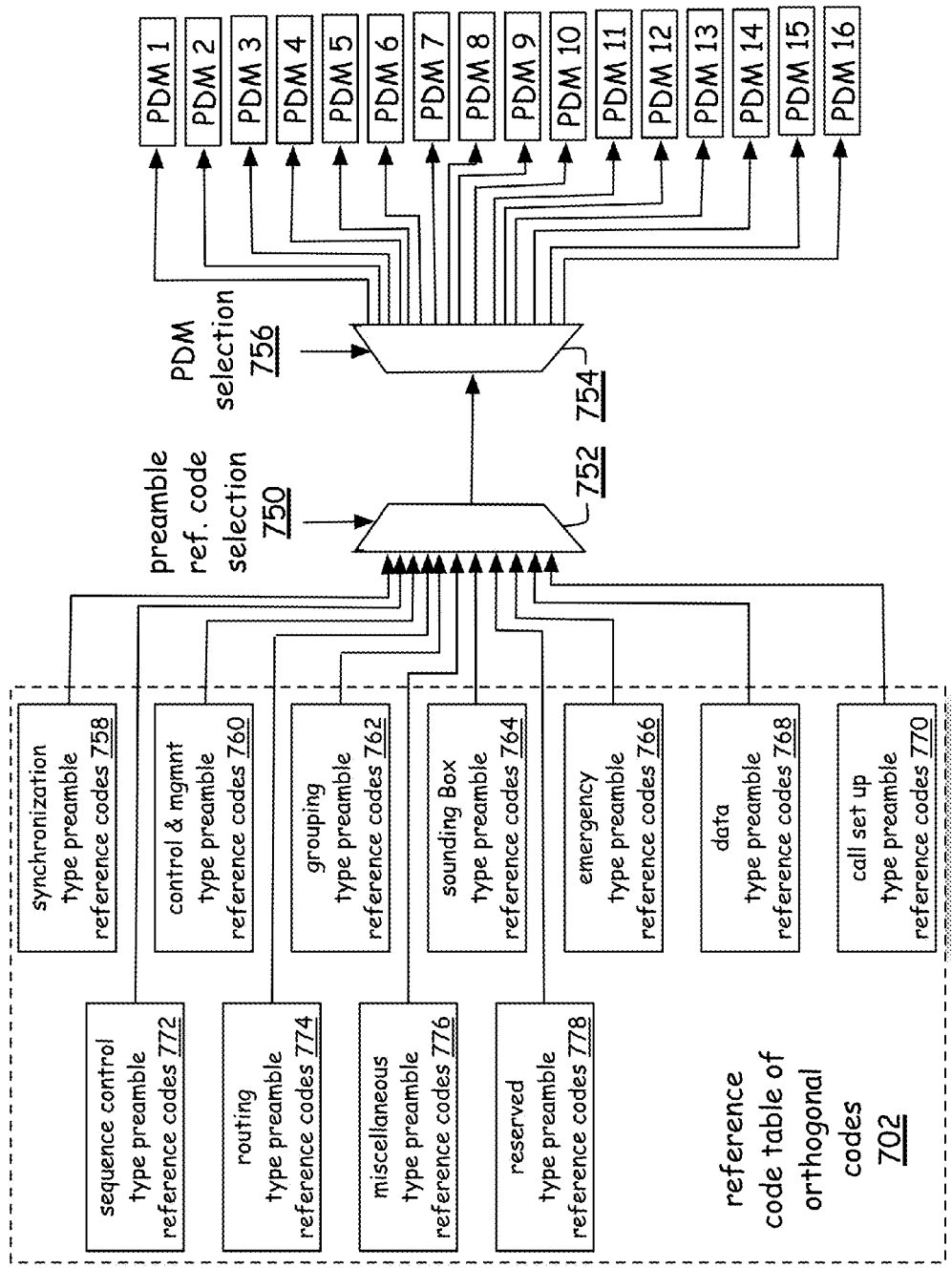
FIG. 25 is a functional block diagram of a system for selecting preamble reference codes for loading into a plurality of preamble detection modules according to one embodiment of the invention.

FIG. 25 is a functional block diagram of a system for selecting preamble reference codes for loading into a plurality of preamble detection modules according to one embodiment of the invention. A reference code table of orthogonal codes 702 as described previously in FIGS. 24A-B includes, in the described embodiment, 128 orthogonal preamble reference codes. The preamble reference codes are grouped by related characteristics or functions. A preamble reference code selection signal 750 is produced to switching logic 752 for selecting at least one preamble reference code from a plurality of groups of reference codes. The selected preamble reference code is the produced to switching logic 754. Switching logic 754 produces the selected preamble reference code to a preamble detection module of preamble detection modules 1-16 based upon a preamble detection module selection signal 756.

The preamble reference codes are, in the described embodiment, grouped as follows:
    synchronization type preamble reference codes 758;
    control & management type preamble reference codes 760;
    grouping type preamble reference codes 762;
    sounding Box type preamble reference codes 764;
    emergency type preamble reference codes 766;
    data type preamble reference codes 768;
    call set up type preamble reference codes 770;

sequence control type preamble reference codes 772;
routing type preamble reference codes 774;
miscellaneous type preamble reference codes 776; and
reserved type preamble reference codes 778.

Each of the above preamble reference code groupings includes at least one preamble reference code. The groupings are functional and for the purpose of explaining the operational logic. Generally, because there are 16 correlators, one within each preamble detection module (PDM), up to 16 preambles may be loaded. Thus, more than one group of preamble reference codes may be loaded into the PDMs at one time.

It should be understood that there are many embodiments and associated logic steps for selecting what preamble reference codes are loaded and transmitted based on mode of operation. For example, in one embodiment, when a device powers on or is not registered to with a base station or access point or other device acting as a network master, a device initially loads the synchronization type preamble reference codes 758.

After evaluating what synchronization type preambles have been received and after registering with a network master, other types of preamble reference codes may be loaded in to the PDMs. For example, referring back to prior figures that discuss the container structure of communications, the control & management type preamble reference codes 760 are loaded during a control box period of the container communication protocol. Accordingly, the device is operable to receive control or management type preambles during this period and to properly interpret and respond to such received preambles according to internal logic. When an operational mode is to perform sounding operations, associated sounding Box type preamble reference codes 764 are loaded into the PDMs.

If during a control box period, a control preamble indicates that a preamble data mode of operation is commanded, then the data type preamble reference codes 768 are loaded to securely receive a preamble code that corresponds to a data pattern (and/or code). In a similar manner, call set-up preamble reference codes 770, sequence control type preamble reference codes 772, routing type preamble reference codes 774, miscellaneous type preamble reference codes 776, and reserved type preamble reference codes 778 may be loaded according to logic defined by reference code selection logic 700 and associated communications with the network master. It should be noted that in one embodiment of the invention, that at least one of the emergency type preamble reference codes 766 are always loaded in at least one of the 16 PDMs (or correlators) for detecting transmissions of such emergency preambles which could occur randomly. It should also be clear that different types of preamble codes may be loaded in the PDMs/correlators at the same time. FIG. 25 thus illustrates one embodiment of a structure for selecting one or more preamble reference codes for loading into one or more correlators of the preamble detection modules 1-16. While FIG. 25 shows 16 PDMs/correlators, it should be understood that the embodiments of the invention generally contemplate at least 4 PDMs/correlators and up to 16 PDMs/correlators. The embodiments of the invention do not necessarily need to be limited to these numbers. Similarly, the types and numbers of types of preamble reference codes may be varied. Generally, at least four preamble types are contemplated for implementation in the various embodiments of the invention though a lower number of preamble types (e.g., three) may be utilized in one alternative embodiment.

Figure 26:
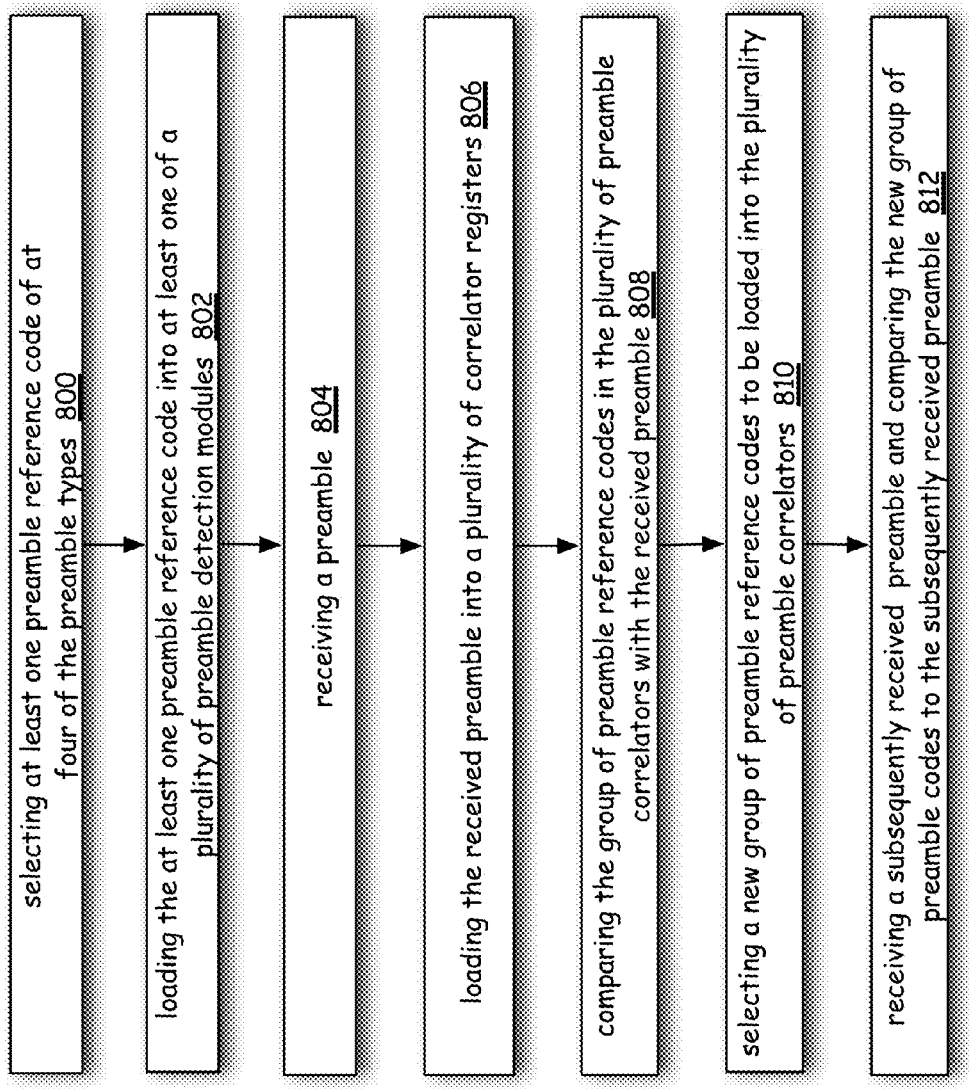
FIG. 26 is a flow chart that illustrates a method in a receiver for processing one of a plurality of preamble types.

FIG. 26 is a flow chart that illustrates a method in a receiver for processing one of a plurality of preamble types. The method of FIG. 26 includes, in one embodiment, a method utilizing a structure similar to that disclosed in relation to FIG. 25. Initially, the method includes selecting at least one preamble reference code of at least four preamble types (800) and loading the at least one preamble reference code into at least one of a plurality of preamble detection modules (802). Thereafter, the method includes receiving a preamble (804) and producing received preamble to the plurality of preamble detection modules (806). In one embodiment, the at least four preamble types include hierarchy beacon type, control and management; emergency and payload box.

The hierarchy beacon type comprises one of a reference beacon, a fixed master beacon, a mobile master beacon, and an accessory device beacon box. The control and management preamble type comprises one of a master control box, a master acknowledge box, a slave request box, a slave acknowledge box, and an existence report box. The emergency preamble type comprises either a 128-bit or a 64-bit preamble. The payload box preamble type comprises one of a voice, audio, video, data, sensor, or control preamble type.

The at least four preamble types may further include a grouping control preamble type, a sounding box preamble type. If the preamble type is a sounding box preamble type, it may comprise either a master sounding box or a sounding request acknowledge. The at least four preamble types further includes a data transmit type. For a data transmit type, a 64-bit or 128-bit preamble type is used to represent a data word having a much shorter length. For example, a first number of bits transmitted as a preamble substantially exceeds a second number of bits used to represent a data value associated with the second number of bits to ensure secure and robust communications for important data. In one embodiment, a 128-bit data type preamble is used to represent a 4-bit data word. The data word could, of course, be larger (e.g., 8 bits or 16 bits long, etc.). In the exemplary embodiment, there are 16 preamble bit patterns used for transmitting an associated one of 16 permutations of the 4-bit data word.

Referring again to FIG. 26, the method further includes comparing the group of preamble reference codes in the plurality of preamble detection modules with the received preamble (808). After comparing the received preamble to the preamble reference codes, the method includes selecting a new group of preamble reference codes to be loaded into the first plurality of preamble detection modules or into a second plurality of preamble detection modules (810) and loading a subsequently received preamble into the first and the second plurality of preamble detection modules and comparing the new group of preamble reference codes with the subsequently received preamble (812).

Figure 27:
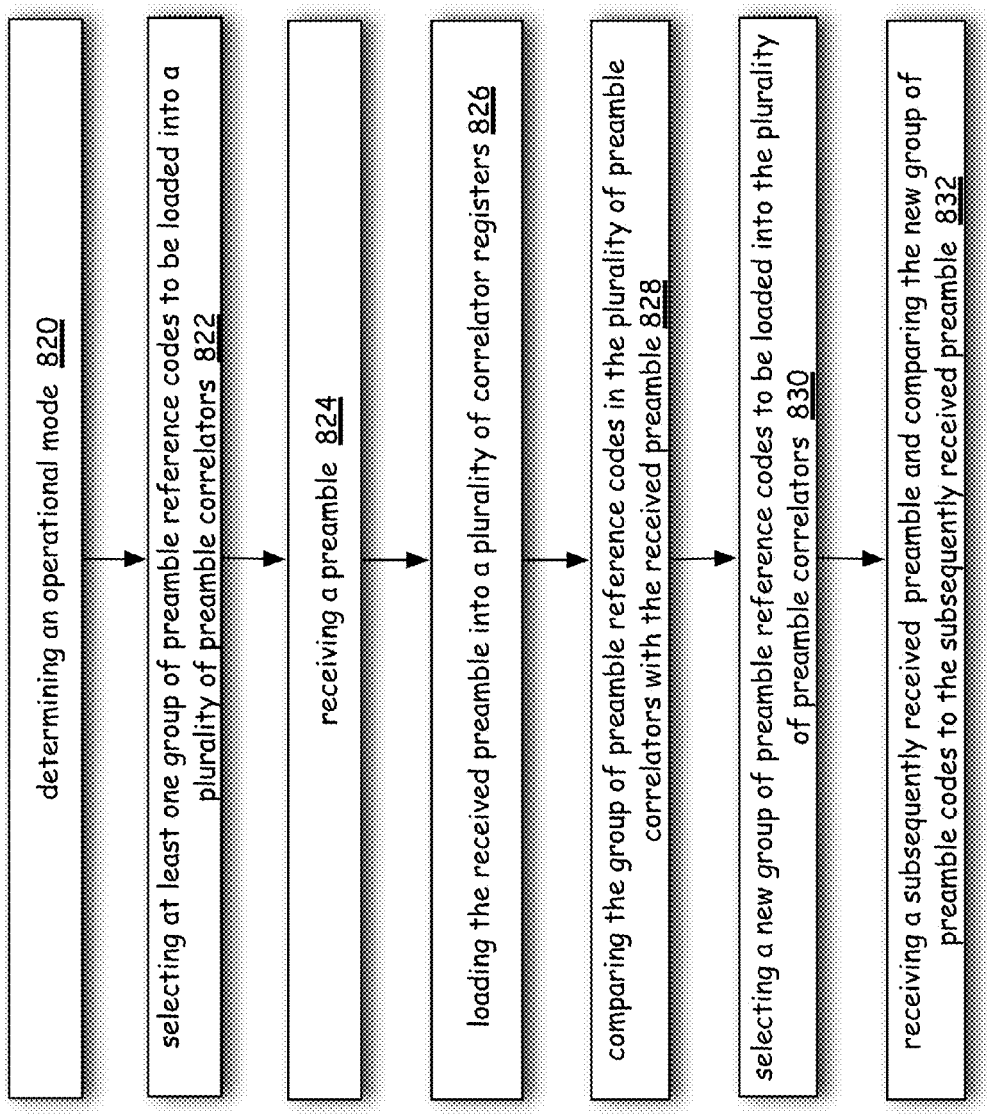
FIG. 27 is a flow chart illustrating a method for processing communication preambles.

FIG. 27 is a flow chart illustrating a method for processing communication preambles comprising determining an operational mode (820) and, based on the determined operational mode, selecting at least one group of preamble reference codes to be loaded into a first plurality of preamble detection modules (822). Thereafter the method includes receiving a preamble (824) and loading the received preamble into the plurality of preamble detection modules (826). The method further includes comparing the group of preamble reference codes in the plurality of preamble detection modules with the received preamble (828). After comparing the received preamble to the preamble reference codes, the method includes selecting a new group of preamble reference codes to be loaded into the first plurality of preamble detection modules or into a second plurality of preamble detection modules (830) and loading a subsequently received preamble into the first and the second plurality of preamble detection modules and comparing the new group of preamble reference codes with the subsequently received preamble (832).

The method described in FIG. 27 may further include determining to transition to a new mode of operation based upon the favorable comparison between the received preamble and the reference code wherein the new group of preamble reference codes is based upon the new mode of operation. In one embodiment, the new mode of operation is a data mode wherein an n-bit long preamble is used to represent an m-bit long data word wherein n is greater or equal to than a multiple of m.

Generally, the methods described above can be implemented in a variety of ways. For example, the method may further include reserving at least one correlator for comparing to and detecting an emergency preamble. The emergency preamble may be a 32-bit, a 64-bit, or a 128-bit long preamble. For this embodiment, the reserved preamble or reserved preambles may be reserved exclusively for emergency preambles while the remaining correlators may be used for other purposes. The preamble reference codes that are used to compare to received preambles may be grouped by, for example:

hierarchy beacons for synchronization or registration;
control and management functionality;
communication grouping functionality;
sounding;
emergency communications;
data payload communications; and
call set up communications.

Figure 28:
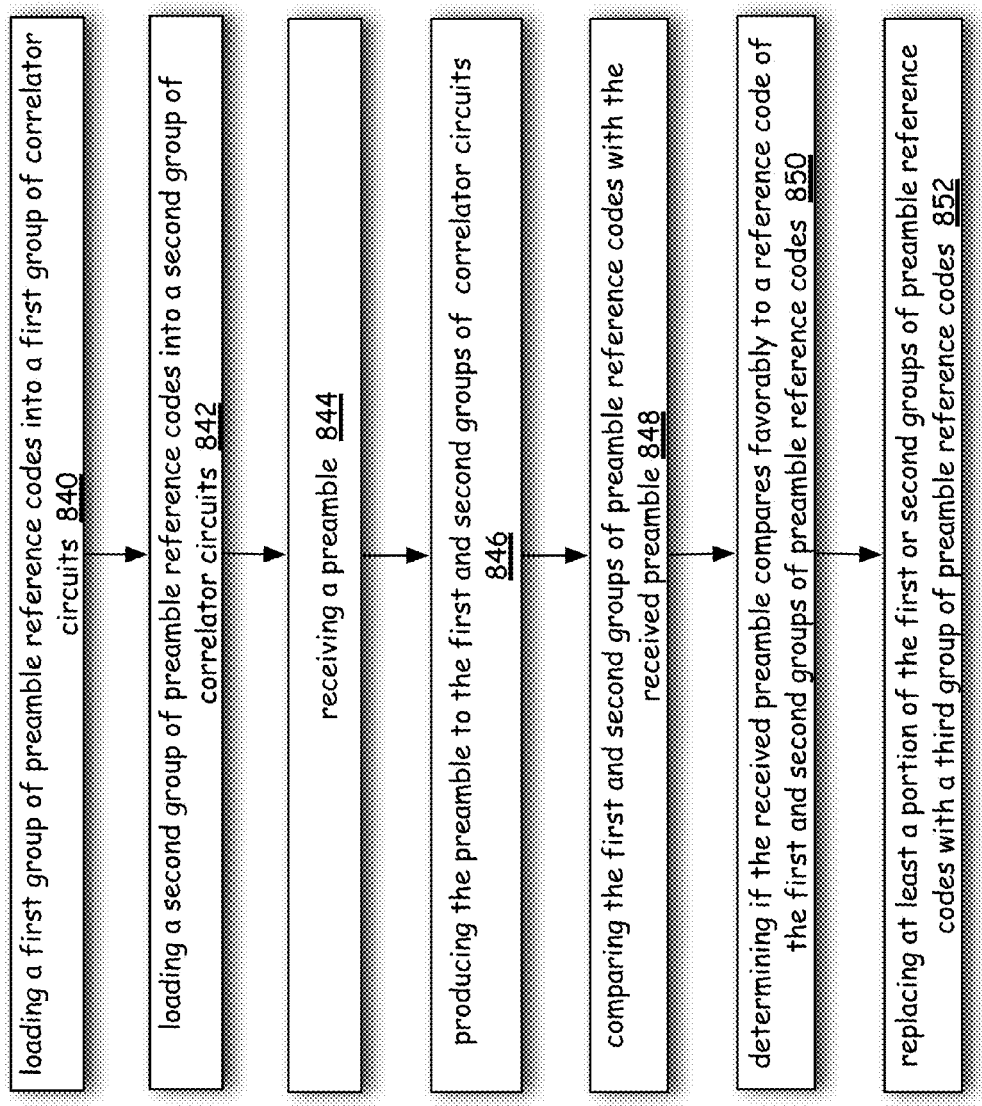
FIG. 28 is a flow chart illustrating method for processing communication preambles for groups of preambles according to one embodiment of the invention.

FIG. 28 is a flow chart illustrating method for processing communication preambles for groups of preambles according to one embodiment of the invention. The method commences with loading a first group of preamble reference codes into a first group of correlator circuits (840) and loading a second group of preamble reference codes into a second group of correlator circuits (842). These groups of preambles that are loaded may be selected, in one embodiment either by a current mode of operation or by a preceding selection or group of preambles. Thereafter, the method includes receiving a preamble (844) and producing the preamble to the first and second groups of correlator circuits (846).

Once the preamble and the reference codes are loaded into the correlator circuits, the method includes comparing the received preamble to the to the first and second groups of preamble reference codes (848) and determining if the received preamble compares favorably to a reference code of the first and second groups of preamble reference codes (850). The method further includes replacing at least a portion of the second group of the first and second groups of preamble reference codes with a third group of preamble reference codes (852). This method includes after making a determination about whether the comparison was favorable, making a determination of subsequent preamble reference code or group of preamble reference codes that should be used for a subsequent comparison whether its for the current preamble or a subsequently loaded preamble.

Figure 29:
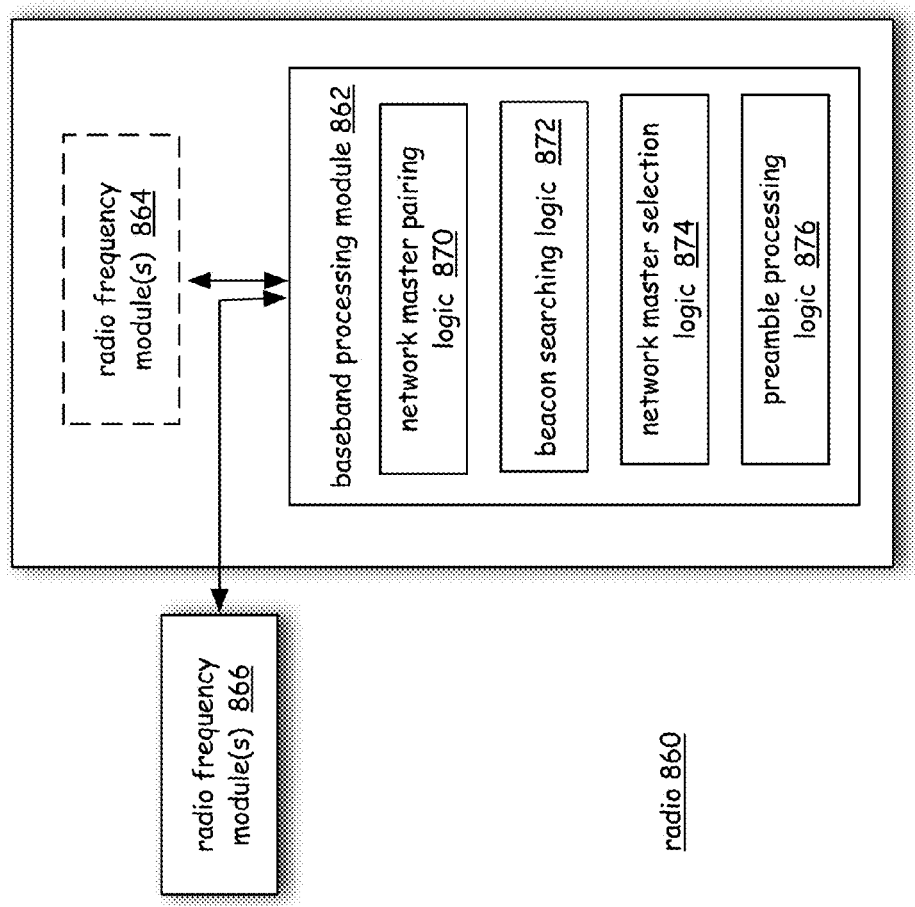
FIG. 29 is a functional block diagram of a radio transceiver according to one embodiment of the invention.

FIG. 29 is a functional block diagram of a radio transceiver according to one embodiment of the invention. A radio transceiver 860 comprises a baseband processing module 862 that generates outgoing signals for transmission from one of one or more radio frequency modules 864 that are disposed within a common silicon chip as baseband processing module 862 or from one of one or more radio frequency modules 866 that are disposed in different silicon though they may be disposed within a common printed circuit board or other supporting structure.

Baseband processing module further comprises a network master pairing logic 870, a beacon searching logic 872, a network master selection logic 874 and a preamble processing logic 876 among other circuits and logics not described here in this figure. Network pairing logic 870 includes logic for pairing with one or more network masters when very proximate to the one or more network masters using near field communications logic. One purposes of requiring such proximity for establishing a paired relationship is for control of what devices are part of a common network. The actual NFC radio circuitry may be one or more of the radio frequency modules 864 and 866.

Beacon searching logic 872 is configured to search for and detect beacon signals transmitted by network masters or sub masters. In one embodiment, the network masters transmit a beacon in the form of a preamble. Accordingly, the preamble processing logic 876 is configured to receive one or more beacon preambles and to compare those beacon preambles with preamble reference codes as previously described here in this specification. Network master selection logic 874 is configured to communicate with preamble processing logic to determine what beacons were received in a preamble format and to select a network master based on which network masters generated a preamble beacon that was received and that compared favorably to a beacon reference code. In one particular embodiment, one part of the network master pairing logic is to store a beacon preamble received during the pairing process as a beacon preamble reference code for use by the preamble processing logic 876. It should be noted that beacon searching logic is further configured to search for beacon signals that are not transmitted as preambles but rather are transmitted in another format for beacon signals. For all beacon signals, regardless of whether transmitted in a preamble format, at least one of the radio frequency modules 864 and 866 was used to receive the beacon signal for processing.

Generally, a transceiver such as transceiver 860 is, according to the present embodiment of the invention, configured to register with one of a plurality of network masters comprising logic configured for:

establishing a paired relationship with a plurality of network masters;
subsequently, searching for a network master registration beacon;
receiving a plurality of network master registration beacons from the plurality of paired network masters;
determining which of the received network master registration beacons is closest; and
communicating with the network master that was determined to be closest to register the transceiver as a cell member serviced by the network master.

Radio transceiver 860 is configured to receive the plurality of master registration beacons within a defined window of time for one embodiment of selecting between a plurality of received beacons. In another embodiment, radio transceiver 860 simply includes a hierarchy of preferred network masters and when a beacon, e.g., a preamble beacon, is received for a preferred network master, radio transceiver 860 is configured to transition from being registered with a lower priority network master (the current network master to which it is registered) to the higher priority network master whose beacon was received.

One aspect of establishing the paired relationship includes communicating via a very short-range communication protocol, such as near field communications (NFC), within a first distance supported by or defined by the NFC protocol and/or settings as a maximum distance for registration purposes. After establishing the paired relationship, the transceiver is configured to communicate with the network master with which the transceiver is paired at a second distance that is (much) greater than the first or maximum distance for registration purposes. Thus, a transceiver configured to register with one of a plurality of network masters comprises logic for:

communicating via a very short-range communication protocol within a first distance with a network master;

establishing a paired relationship with the first network master; and after establishing the paired relationship, communicating with the network master to which the transceiver is paired at a second distance that is greater than the first distance.

It should be noted that the transceiver is configured to register with one of a plurality of network masters and therefore includes logic for establishing a paired relationship with a plurality of network masters. This logic this is operable to enable the transceiver to search for a network master registration beacon and receive a plurality of network master registration beacons from the plurality of paired network masters and to determine which of the received network master registration beacons is closest and to communicate with the network master that was determined to be closest to register the transceiver as a cell member serviced by the network master.

Figure 30:
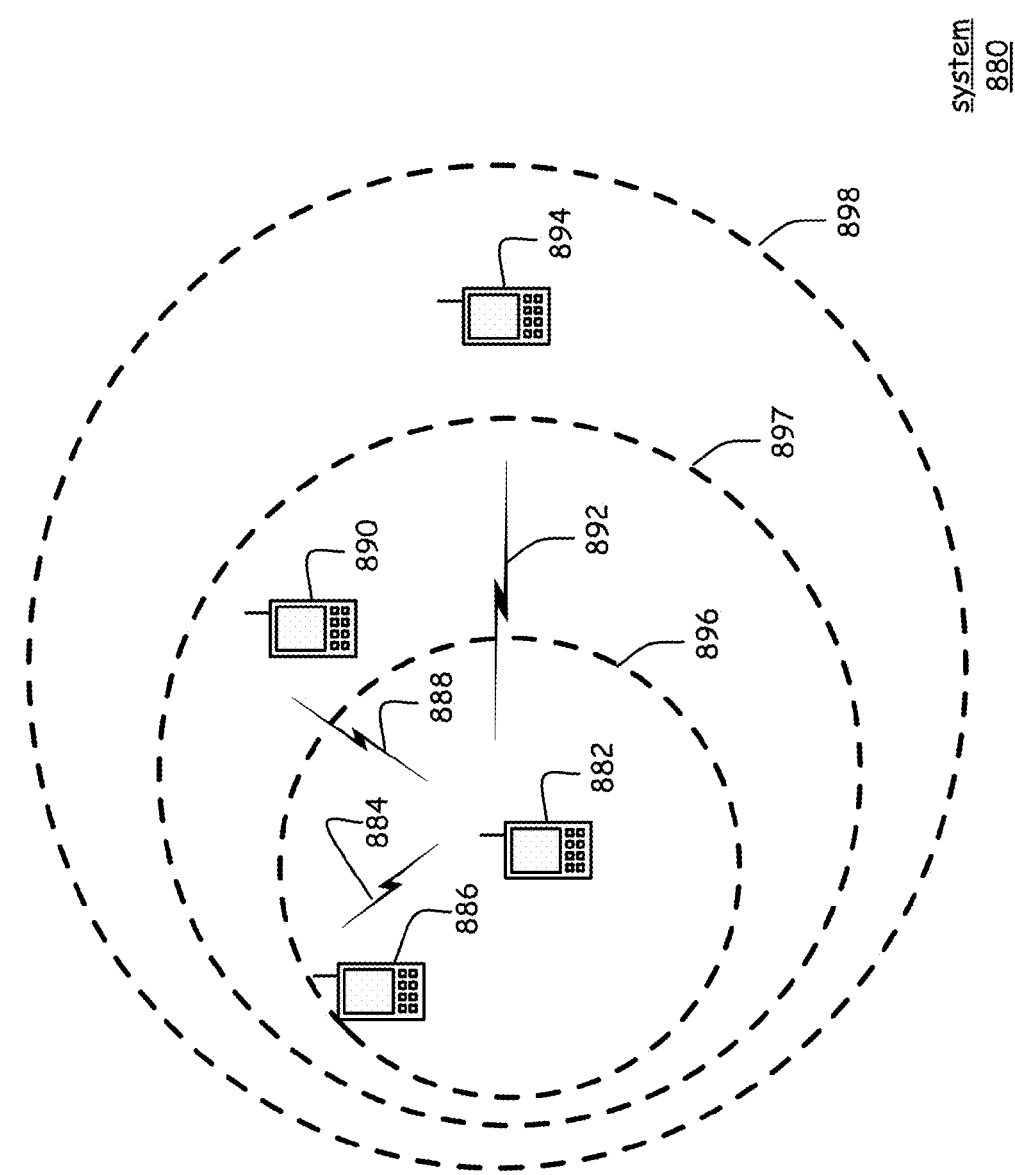
FIG. 30 is a network diagram illustrating a system with a plurality of network masters and a device that operates to select one of the network masters for registration according to one embodiment of the invention.

FIG. 30 is a network diagram illustrating a system with a plurality of network masters and a device that operates to select one of the network masters for registration according to one embodiment of the invention. A system or network shown at 880 includes a transceiver 882 that is not registered with a network master. Transceiver 862 receives a beacon 884 from transceiver 886, a beacon 888 from transceiver 890, and a beacon 892 from transceiver 894. Each of the transceivers 886, 890 and 894 may be similar in structure to transceiver 882 but operating as network masters or they may be devices, such as access points, that exclusively act as network masters and support communications within specified coverage areas. Here, a coverage area or cell 896 corresponds to transceiver 886, cell 897 corresponds to transceiver 890, and cell 898 corresponds to transceiver 894.

As described previously, the beacons 894, 898 and 892 are required to be received within a specified period for transceiver 882 to select its network master or, alternatively, may be received at random times wherein transceiver 862 selects the transceiver to register with according to internal logic. In one embodiment, the internal logic is simple, it pairs to the transceiver that is closest to it.

Figure 31:
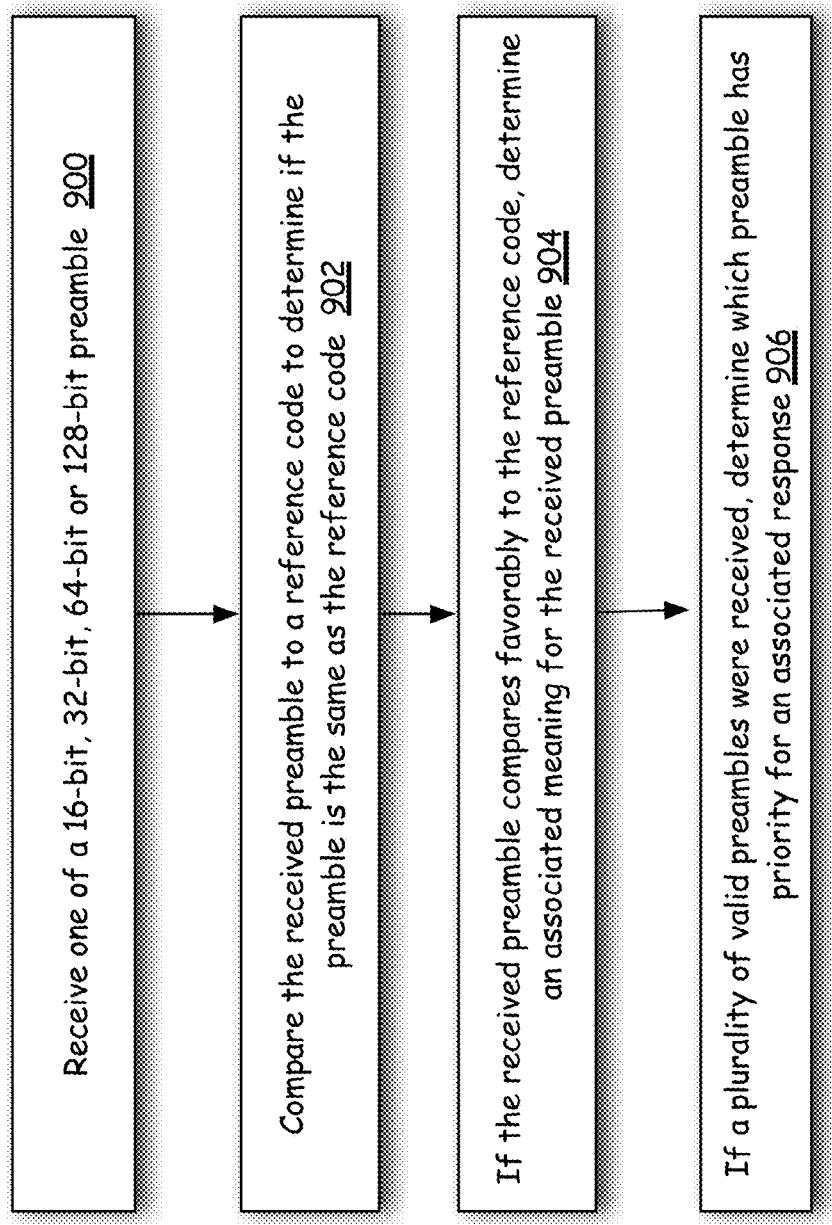
FIG. 31 is a flow chart illustrating a method according to one embodiment of the invention.

FIG. 31 is a flow chart illustrating a method according to one embodiment of the invention. The method commences with a transceiver receiving one of a 16-bit, 32-bit, 64-bit or 128-bit preamble (900). The next step is to compare the received preamble to a reference code to determine if the received preamble is the same as the reference code (902). This step may happen a plurality of times in different correlators at the same time or at different times. If the received preamble compares favorably to the reference code in one of the correlators, the method includes determining an associated meaning for the received preamble (904). This determining step may include nothing more than determining an associated response based on the favorable comparison between the received preamble and the reference code.

One final aspect and step to this embodiment of the invention is the step of determining, if a plurality of valid preambles are received, which received preamble has a priority for a subsequent response or, alternatively, which one should have an associated response and which one(s) should be ignored (906).

One aspect of FIG. 31 is that the method may be used for beacon type preambles but it may also be used for other types of preambles. For example, a plurality of beacons may be received for any one of the following types of beacons:

hierarchy beacons for synchronization or registration;
control and management functionality;
communication grouping functionality;
sounding;
emergency communications;
data payload communications; and
call set up communications.

Alternatively, if, for example, an emergency beacon, a data payload beacon and a control and management beacon are all received, a transceiver might prioritize beacon responses in the order of emergency beacons, control and management functionality beacons and data payload beacons.

Figure 32:
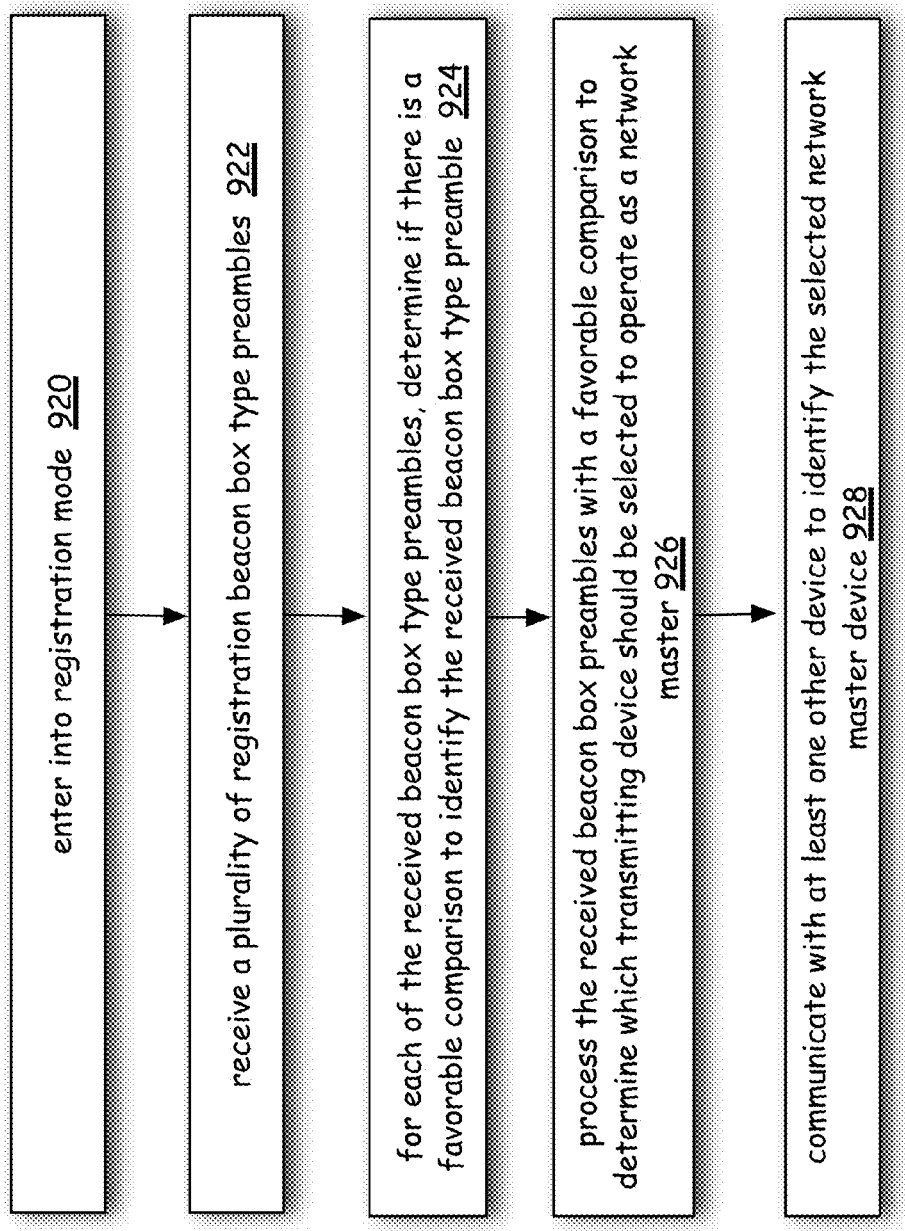
FIG. 32 is a flow chart illustrating a method according to one embodiment of the invention.

FIG. 32 is a flow chart illustrating a method according to one embodiment of the invention. The method commences with entering into a registration mode prior to searching for the network master registration beacons (920) and receiving a plurality of registration beacon box type preamble beacons (922). Thereafter, the method includes for each of the received beacon box type preambles, determine if there is a favorable comparison to identify the received beacon box type preamble (924) and processing the received beacon box preambles with a favorable comparison to determine which transmitting device should be selected to operate as a network master (926). Finally, the method concludes with communicating with at least one other device to identify the selected network master device (928). For example, this step could include communicating with the selected network master to establish registration with it.

Figure 33:
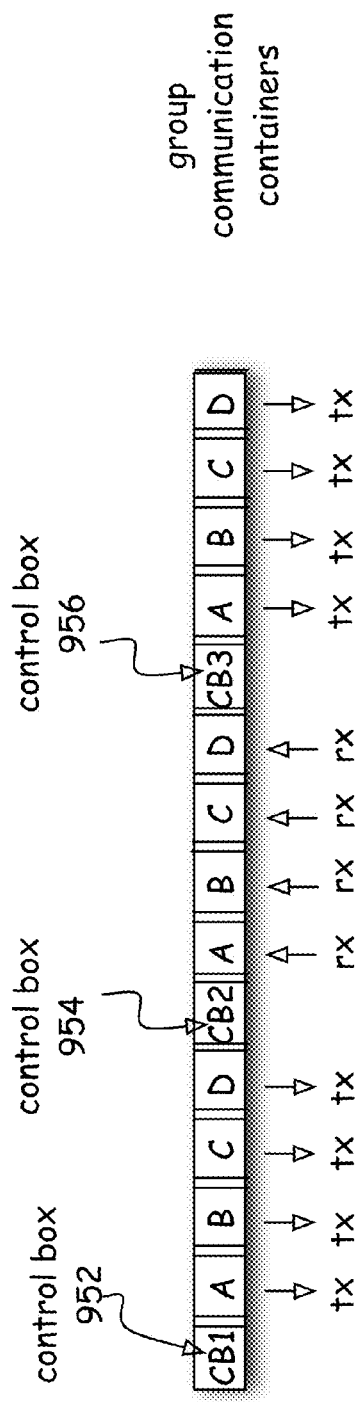
FIG. 33 is a signal flow diagram that illustrates communications according to one embodiment of the invention.

FIG. 33 is a signal flow diagram that illustrates communications according to one embodiment of the invention. In the signal flow diagram, a signal flow is shown at 950. A network master transmits a plurality of control boxes 952-956 (also labeled as CB1, CB2, CB3). Signal flow 950 consists of a plurality of "containers" as previously described in relation to other figures such as FIG. 8. Each container includes one of the control boxes 952-956 that have communication control related signaling. After each control box, a payload shown as A, B, C and D follows. It should be noted that the payloads A-D are all in the same direction (either outgoing or ingoing). Thus, for CB1 and CB3, all of the payloads are outgoing. For CB2, all of the payloads are ingoing. One benefit of synchronizing payloads in this manner is that near devices transmit and receive during the same payloads. Accordingly, one device is not trying to receive a distant and weak signal while a nearby transceiver is transmitting and effectively drowning the signal being received.

Figure 34:
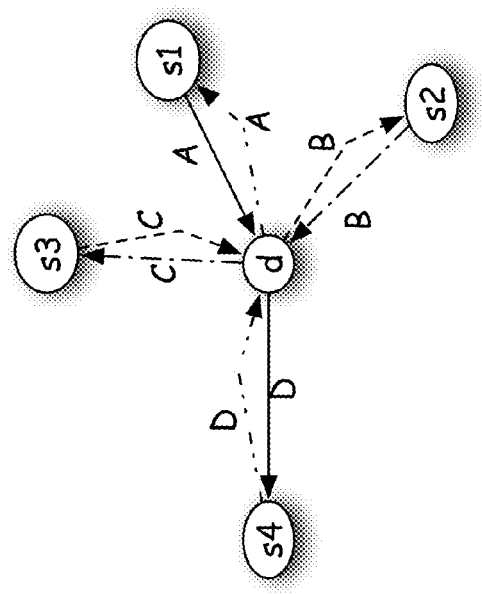
FIG. 34 is a network diagram that further illustrates the communications in a synchronized manner according to one embodiment of the invention.

FIG. 34 is a network diagram that further illustrates the communications in a synchronized manner according to one embodiment of the invention. For a device "d", outgoing transmission payloads of A, B, C and D to devices s1, s2, s3 and s4, respectively, occur during a common outgoing container and each of the ingoing payloads A, B, C and D from devices s1, s2, s3 and s4, respectively, are received during the same container. It should be noted that the payloads A, B, C and D are not particularly assigned to any device. One aspect of the invention is that the network master makes such assignments when authorizing the devices s1-s4 to communicate in the control box signaling CB1-CB3.

Figure 35:
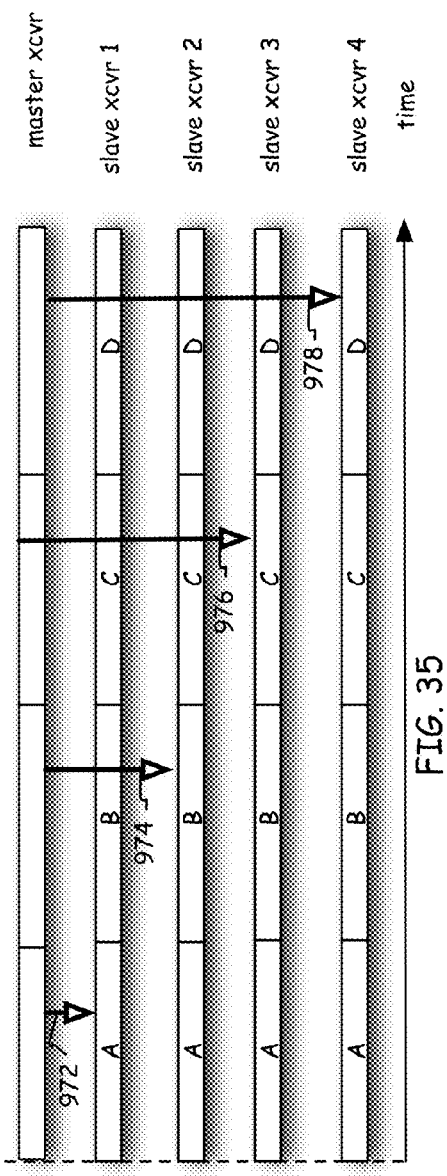
FIGS. 35 and 36 are signal flow diagrams that illustrate operation for group communications according to one embodiment of the invention.
Figure 36:
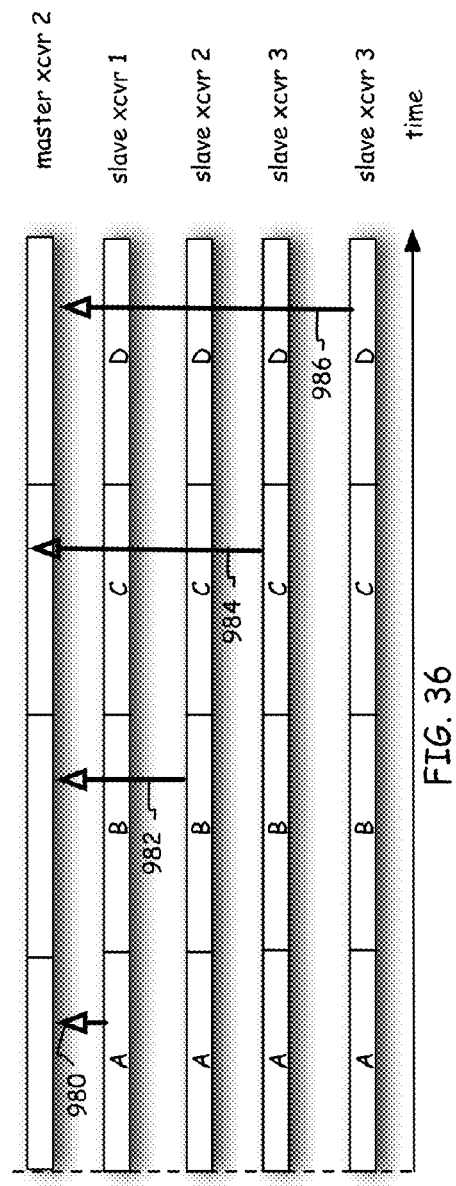

FIGS. 35 and 36 are signal flow diagrams that illustrate operation for group communications according to one embodiment of the invention. Referring to FIG. 35, it may be seen that a master transceiver (e.g., a network or cell master) transmits to each of save transceivers 1-4 during one container period of time. Each transmission, however, is during a different payload. For example, the master transceiver transmits signal 972 to slave transceiver 1 during payload A, signal 974 to slave transceiver 2 during payload B, signal 976 to slave transceiver 3 during payload C, and signal 978 to slave transceiver 4 during payload D. Similarly, as shown in FIG. 36, the master transceiver receives from each of the slave transceivers during a common container but during different payload periods. Thus, the master transceiver receives signal 980 from slave transceiver 1 during payload A, receives signal 982 from slave transceiver 2 during payload B, receives signal 984 from slave transceiver 3 during payload C, and receives signal 986 from slave transceiver 4 during payload D.

One aspect to note in the signal flows of FIG. 35 and of FIG. 36 is that the five transceivers, namely the master transceiver and the four slave transceivers 1-4 are all time synchronized and are configured and operable to identify the same windows for the containers and payloads. Another points is that the control box illustrated in other figures is the period during which the master transceiver generates control signals to the slave transceivers so that they know whether they are to transmit during a given container and payload period.

Figure 37:
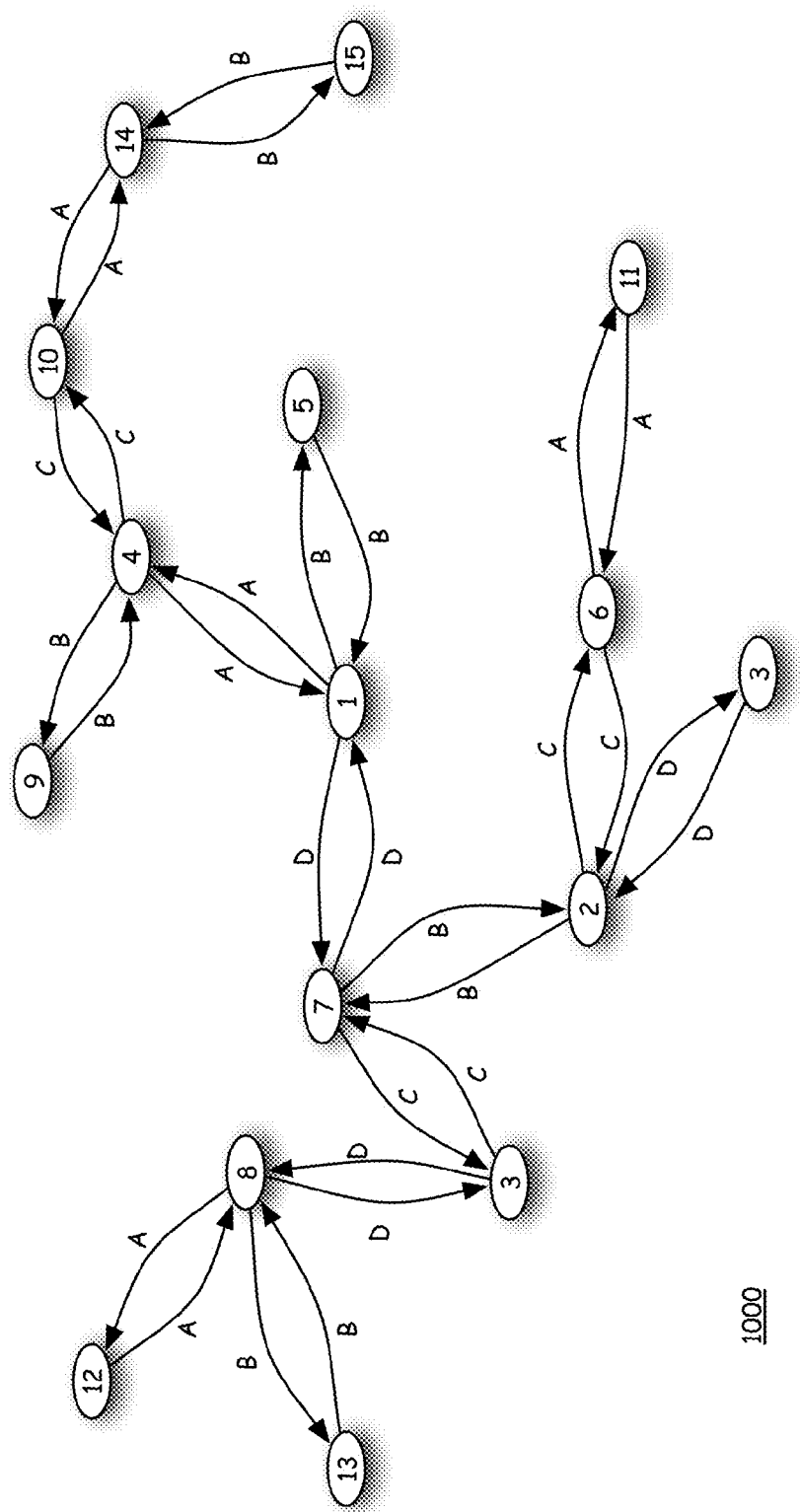
FIG. 37 is a network diagram of a network that supports group communications according to one embodiment of the invention.

FIG. 37 is a network diagram of a network that supports group communications according to one embodiment of the invention. In the described embodiment, a group communications network 1000 may have up to 16 members. The network 1000 as shown has 16 members. One aspect of the group communications is that each of the 16 devices produces at least one of its voice content or a received voice content to a neighboring device. All transmissions by a given devices are during a common container or period. Thus, referring to device 4, for example, device 4 transmits during a transmit container during period A to device 1, during period B to device 9 and during period C to device 10. Periods A-D are, in one embodiment, payload boxes as described in relation to FIG. 8 among other places. Device 4 also receives communications during a common container. Thus, device 4 receives from device 1 during period A, from device 9 during period B, and from device 10 during period C. Thus, transmission periods (or payloads) are within a common transmission container or period and reception periods (or payloads) are within a common reception container or period. This concept is as was explained in relation to FIGS. 35-36 for group communications. The same pattern exemplified here for these devices 1, 4, 9 and 10 applies to all 16 devices of FIG. 37. It should also be noted that the references to A, B, C and D are for transmission periods or payloads but they may also represent frequencies. In an embodiment where different frequencies are used (different channels), the transmissions may be during the same time or in different periods as described above.

Figure 38:
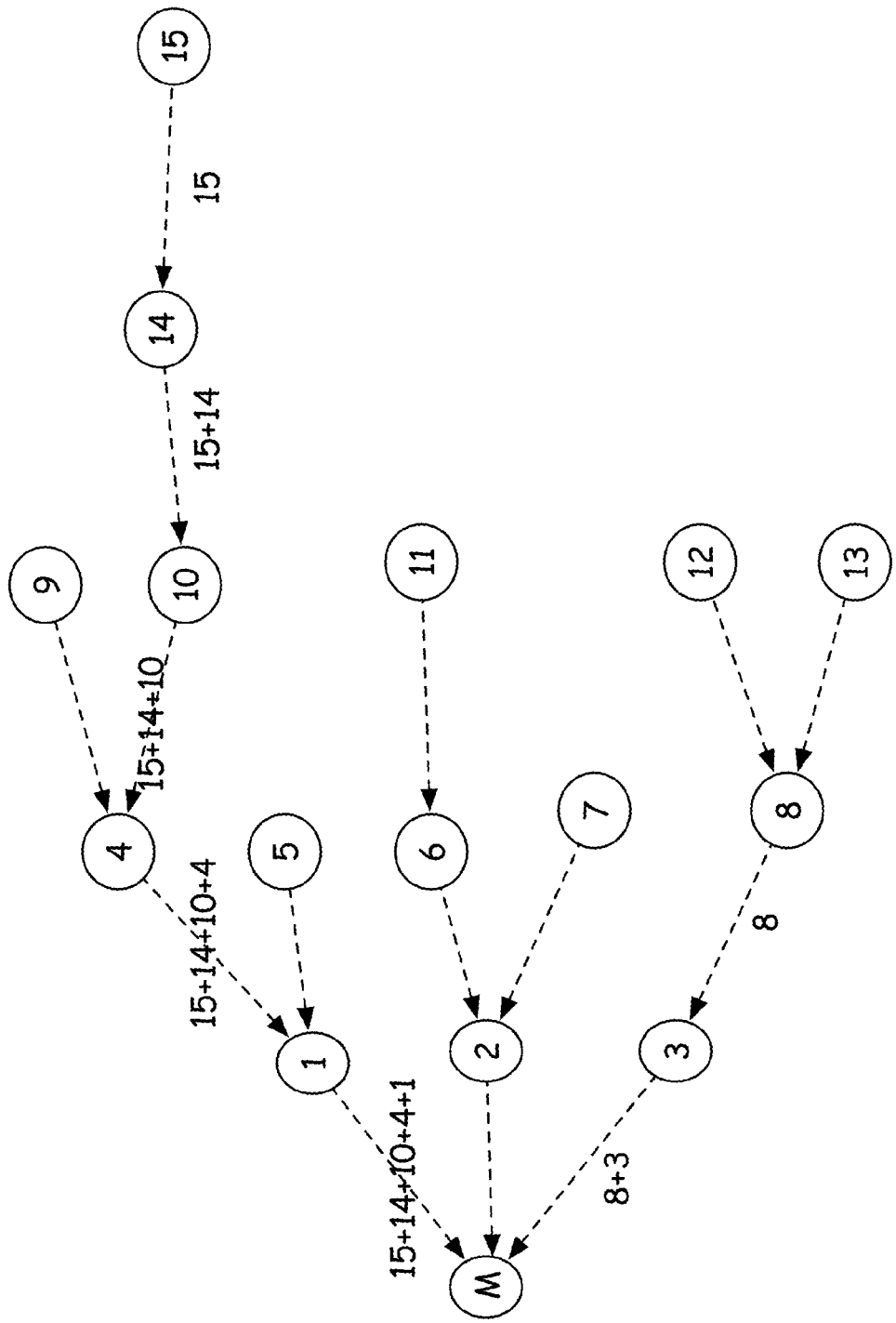
FIGS. 38 and 39 are functional network diagrams that illustrate operation of group communications according to one embodiment of the invention.
Figure 39:
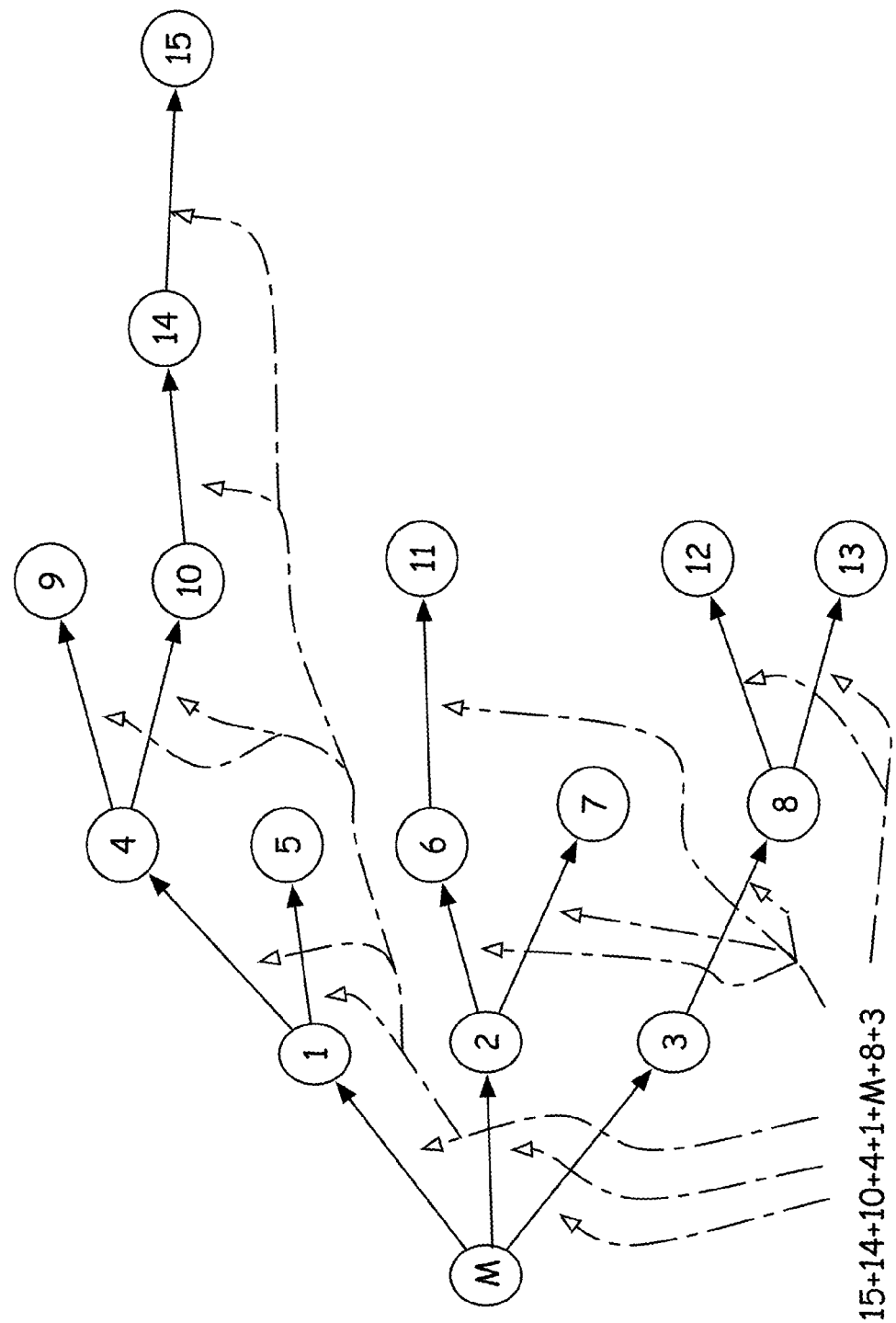

FIGS. 38 and 39 are functional network diagrams that illustrate operation of group communications according to one embodiment of the invention. Referring now to FIG. 38, 16 devices are shown. A network master is labeled as M and network slave devices are labeled 1-15. One aspect that is illustrated here in FIG. 38 is that the digital representations of the various users voices are added and passed down the line. Accordingly, when played back, every user can hear what any other user said. To clarify, user 15 transmits a digital voice representation of his input shown as 15 to user 14. User 14 adds his own voice input and transmits a combined voice input shown as 15+14. User 10 receives the transmission from user 14 adds its own voice input and transmits a combined voice input shown as 15+14+10 to user 4. User 4 adds his voice input and transmits a combined voice input shown as 15+14+10+4 to user 1. Similarly, user 1 adds his voice input and transmits a combined voice input to the network master shown as 15+14+10+4+1.

Along a different path, user 8 transmits his voice input to user 3 shown as 8. User 3 adds his voice input and transmits a combined voice input to the master user shown as 8+3. So far, what has been shown is how the various voice inputs are combined to create a combined voice input. Nothing in FIG. 38 shows the actual playback of the voice inputs. The remaining users to not generate any voice to be added to the combined voice inputs.

Referring now to FIG. 39, once the master M receives the combined voice input as shown in FIG. 38, master 39 transmits the combined voice inputs that includes his own voice input (if any) to all of the slave devices that are immediately coupled to the master node in a master-slave relationship. That is, as maybe seen, the network master transmits a combined voice signal to users 1-3 shown here a 15+14+10+4+1+M+8+3. Each node that receives this combined outgoing voice input then propagates the combined outgoing voice input to each of the devices to which it is connected.

In one embodiment, a sub-master-slave relationship exists between any one of the devices and downstream (in relationship to the master M) devices. To clarify, users 1-3 are slaves to the network master M but are masters to the devices down the line. User one is a master to users 4 and 5. User 2 is a master to users 6 and 7, user 3 is a master to user 8. User 10 is a master to user 14 that is a master to user 15. User 6 is a master to user 11. User 8 is a master to users 12 and 13. With this arrangement, the combined outgoing voice input is produced to every device via the various registered/pair master-slave relationships.

Figure 40:
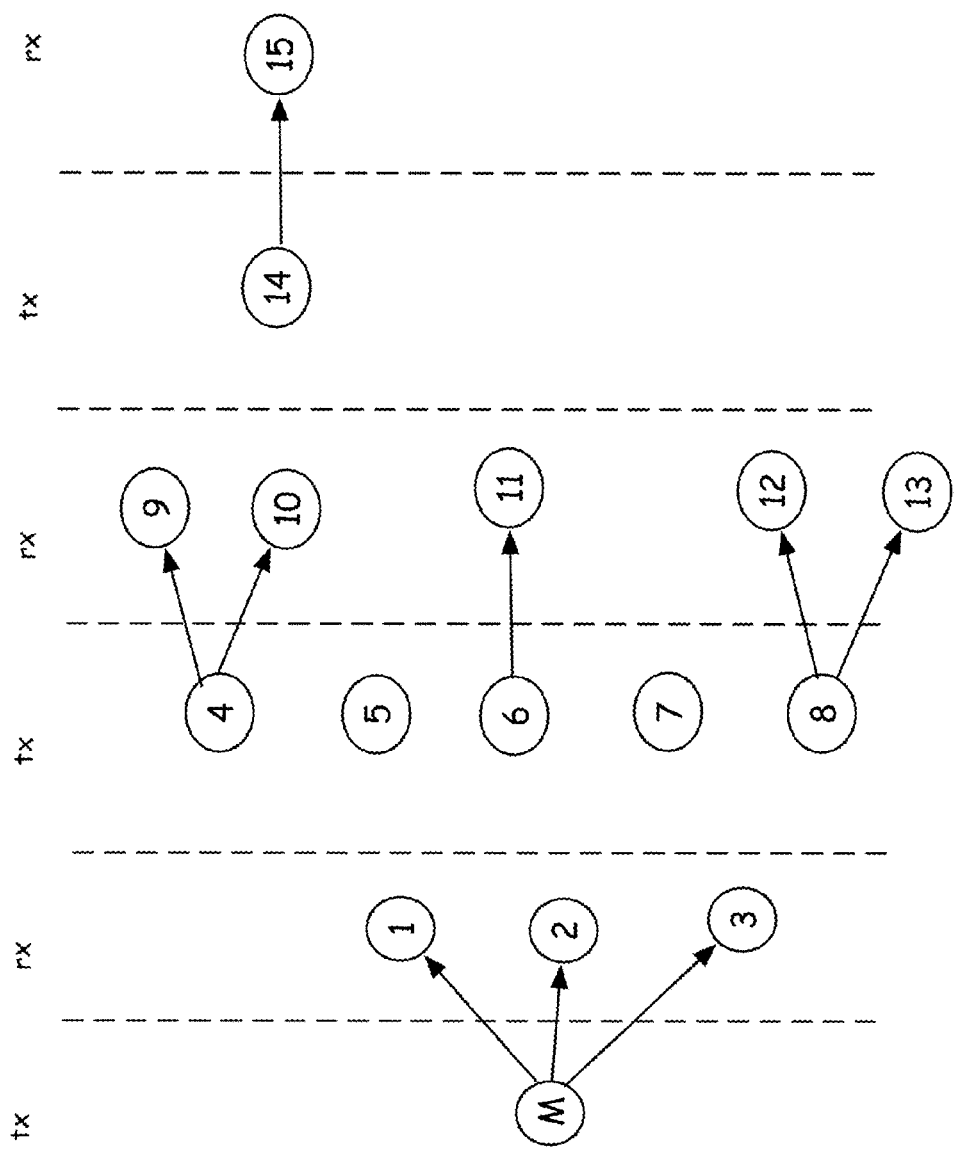
FIGS. 40 and 41 are functional block diagram that illustrates the relational timing for transmitting and receiving for group communications according to one embodiment of the invention.
Figure 41:
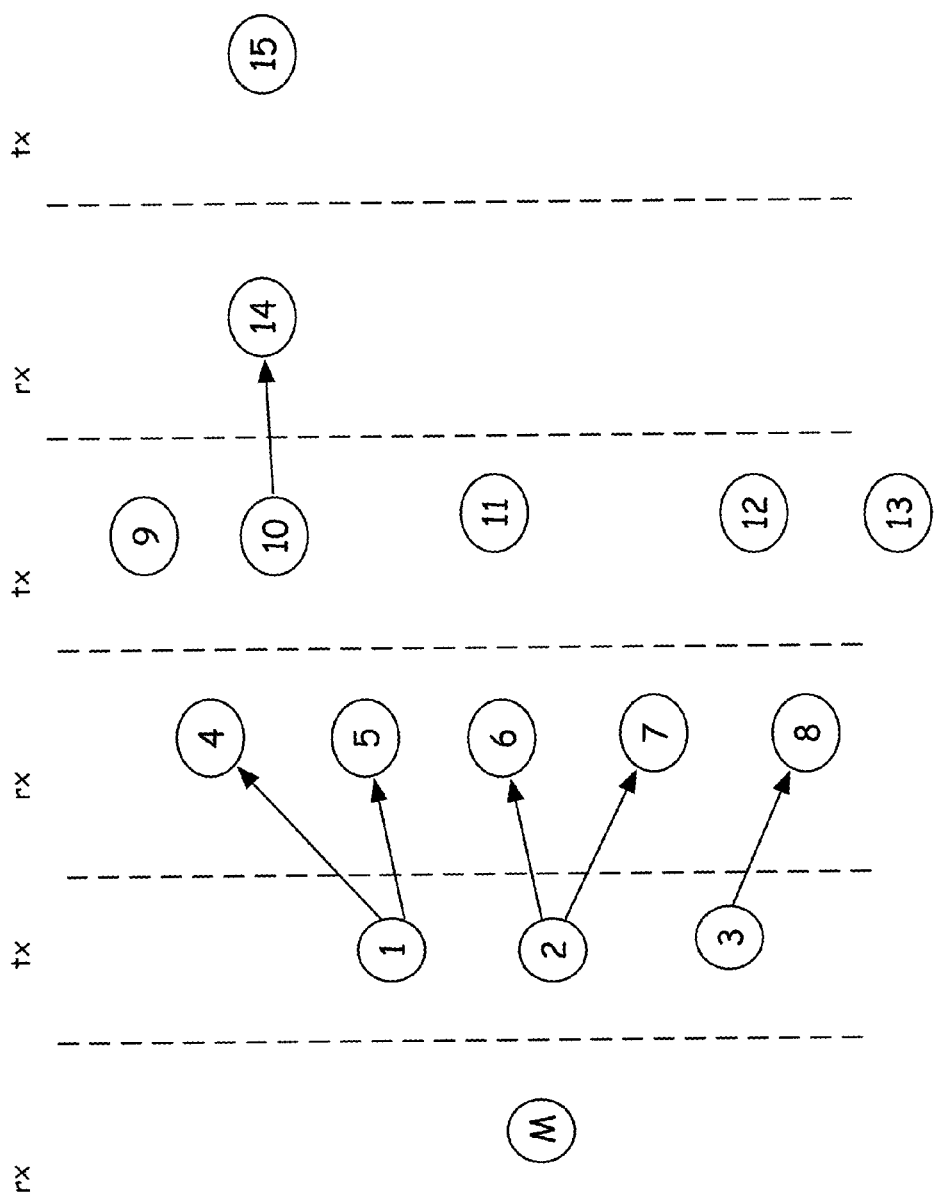

FIGS. 40 and 41 are functional block diagram that illustrates the relational timing for transmitting and receiving for group communications according to one embodiment of the invention. Referring now to FIG. 40, it may be seen that the user devices are grouped by transmit (TX) and receive (RX) periods similar to what was discussed in relation to container operation in FIGS. 33 and 34. Here, the master device as well as users 4, 5, 6, 7, 8 and 14 are all within a transmit window while users 1, 2, 3, 9, 10, 11, 12, 13 and 15 are within a receive window. Referring to FIG. 41, the master device as well as users 4, 5, 6, 7, 8 and 14 are all within a receive window while users 1, 2, 3, 9, 10, 11, 12, 13 and 15 are within a transmit window.

Figure 42:
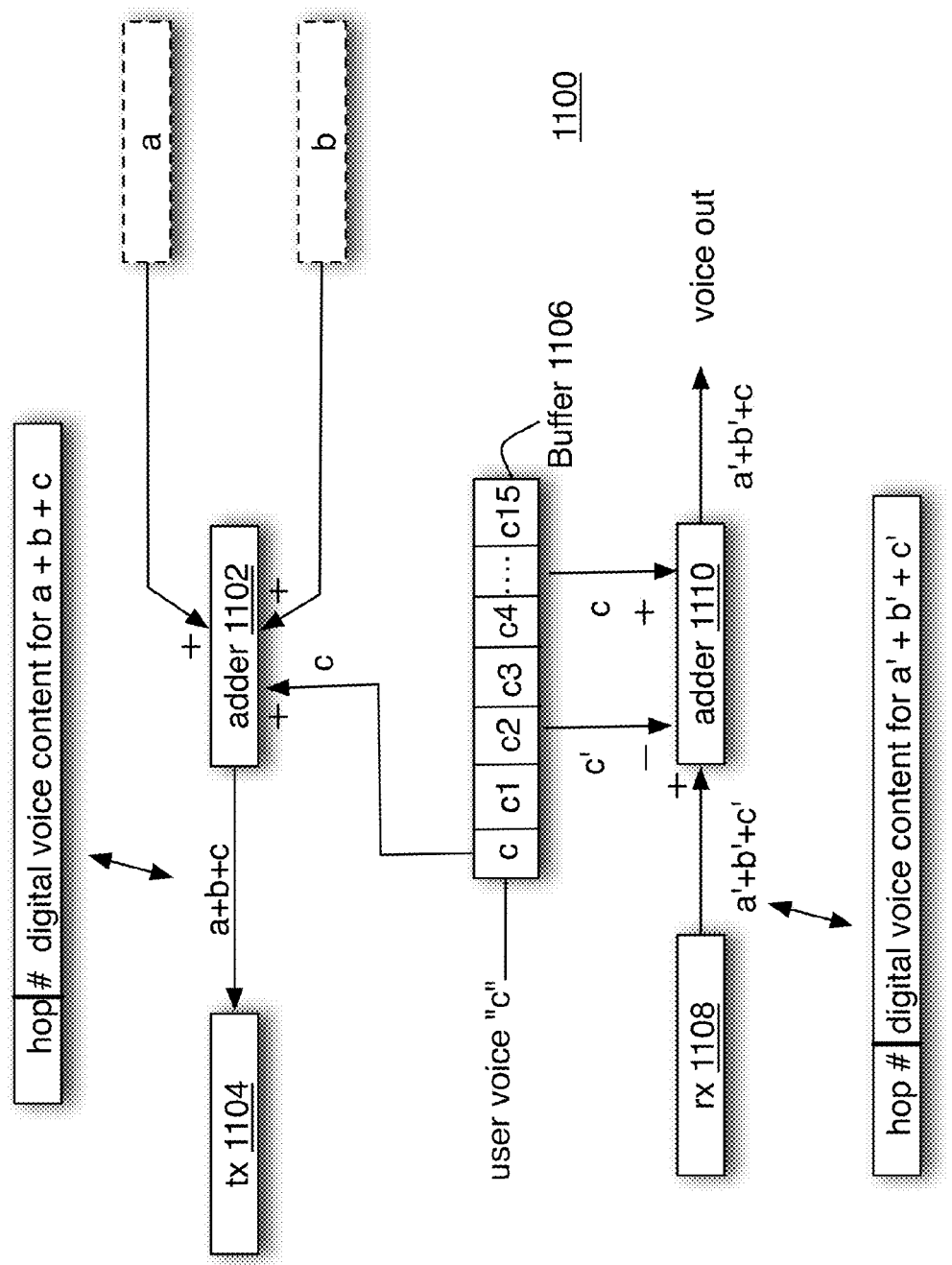
FIGS. 42 and 43 are functional block diagrams of transceiver circuitry configured for group communications according to two embodiments of the invention.

FIG. 42 is a functional block diagram of transceiver circuitry configured for group communications according to an embodiment of the invention. Referring now to FIG. 42, a transceiver 1100 circuitry includes an adder 1102 that is coupled to receive voice inputs from other transceiver devices. As shown here, adder 1102 receives voice inputs a and b from one or two different external transceivers. Voice inputs a and b may be received separately from different sources or as a combined voice input. As shown here, they are being received from separate sources. Additionally, adder 1102 receives a user's voice (user of transceiver 1100) shown as user voice "c" which is the user's voice of transceiver 1100.

Figure 43:
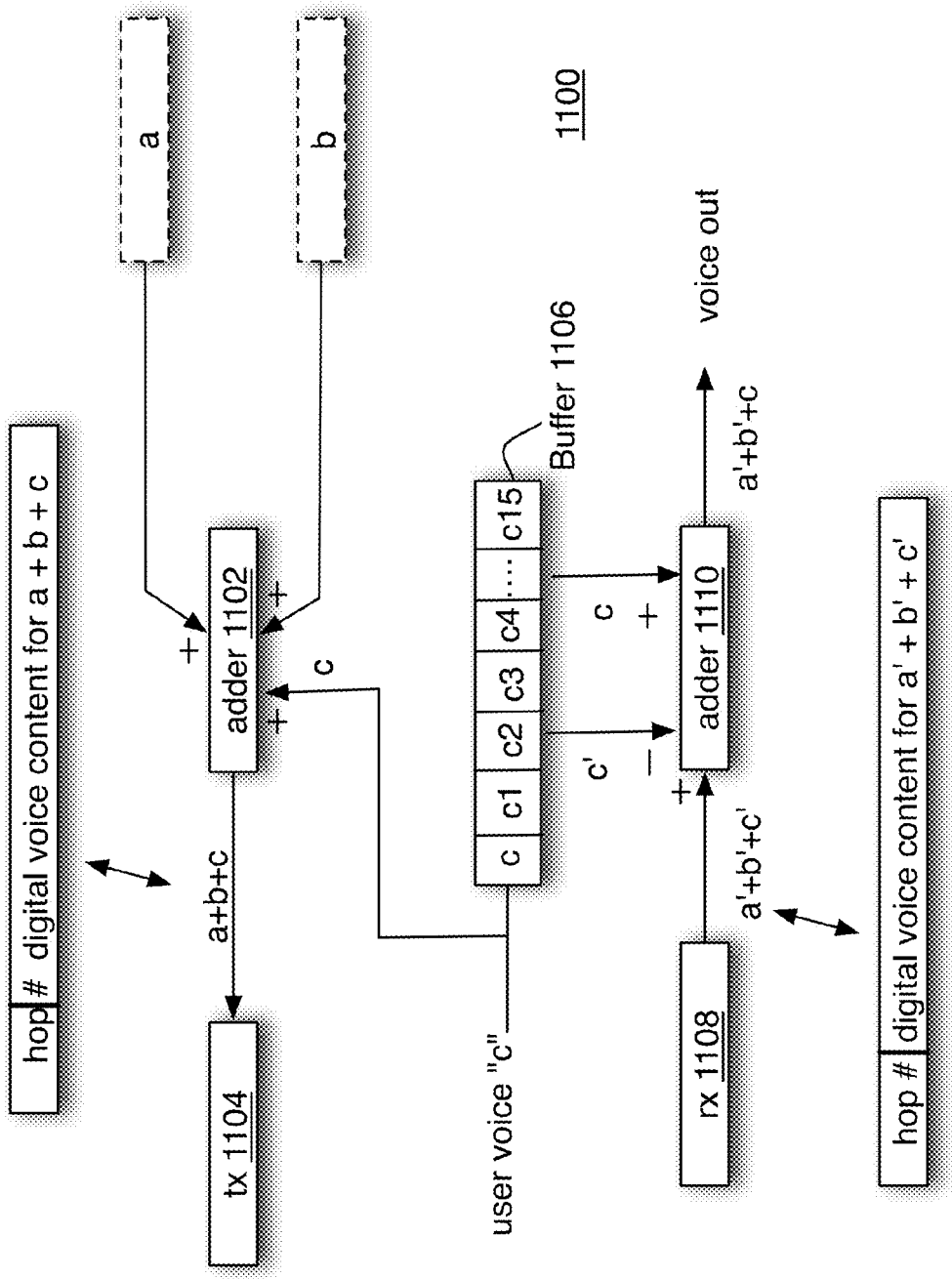

Adder 1102 combines the voice inputs into a combined signal that has "a", "b", and "c" components. The combined voice signal is produced to transceiver circuitry 1104. The combined voice signal includes a header that further includes a hop number. Transceiver circuitry 1104 then generates an outgoing RF signal that includes the header with the hop number and the combined digital voice content signal. As described in relation to prior figures, voice content is combined to a single combined voice signal by every transceiver that receives a combined voice signal with any voice inputs it has, if any, prior to transmission to a next device. The user voice "c" that was produced to adder 1102 may be produced directly from a buffer 1106 as shown in FIG. 42 or directly from a microphone as shown in FIG. 43.

Buffer 1106 is configured to include up to 16 voice inputs of the user. Each voice input is stored in a separate portion of buffer 1106, i.e., a different register. As may be seen, buffer 1106 includes user voice inputs c, c1, c2, c3, c4 ... c15. For the purposes of the description of the embodiment of FIG. 42, "c" represents the most recent voice input that was produced to adder 1102 and combined with the other voice inputs "a" and "b" while the other inputs in buffer 1106 were user voice inputs by the user of transceiver 1100 that were received prior to "c" in the sequential order suggested by FIG. 42 wherein c15 is the oldest voice input.

Receiver circuitry 1108 is configured to receive a combined voice signal that has been originally produced by the network master. For simplicity, the combined voice signal includes a'+b'+c'. The reason that the combined voice signal is shown to have a'+b'+c' is that these combined voice components are from a prior time and are not the most current voice components. With respect to voice component "c" for example, c' is used to represent any one of c1, c2 ... c15.

One aspect of the embodiment of the present invention is that the transmissions though upstream to the network master and back downstream to the individual transceivers occurs so quickly that if a current voice input is played through the speaker of transceiver 1100, it would largely sound like an echo (e.g., c'). Accordingly, transceiver 1100 is configured to subtract the prior voice input of the user's voice from what is received by receiver circuitry 1108 to eliminate the effect of an echo. More specifically, transceiver 1100 is configured to, by evaluating a received hop number for the combined signal produced by receiver circuitry 1108, determine which of the voice inputs c1-c15 are the same as what is being received and shown as c' and to produce the determined voice input to adder 1110 for subtraction from the combined voice input produced by receiver circuitry 1108.

Additionally, transceiver circuitry 1100 is configured to produce the most current voice input "c" to adder 1100 for addition to the combined signal. Accordingly, the output of pattern 1100 is equal to a'+b'+c. Because each device increments the hop number as a combined voice signal is forwarded to the next device as the combined signal is transmitted towards the network master, and because each device decrements the hop number of a combined signal that was transmitted by the network master for distribution to all devices, transceiver 1100 is able to determine which of the stored voice input of buffer 1106 should be produced as c' for subtraction within adder 1110. As may be seen in FIG. 42, the current voice input of the user's voice is produced from buffer 1106 to adder 1102. FIG. 43 illustrates an alternative approach in which the user voice input c is produced directly to adder 1102 from the user's microphone (not shown).

Figure 44:
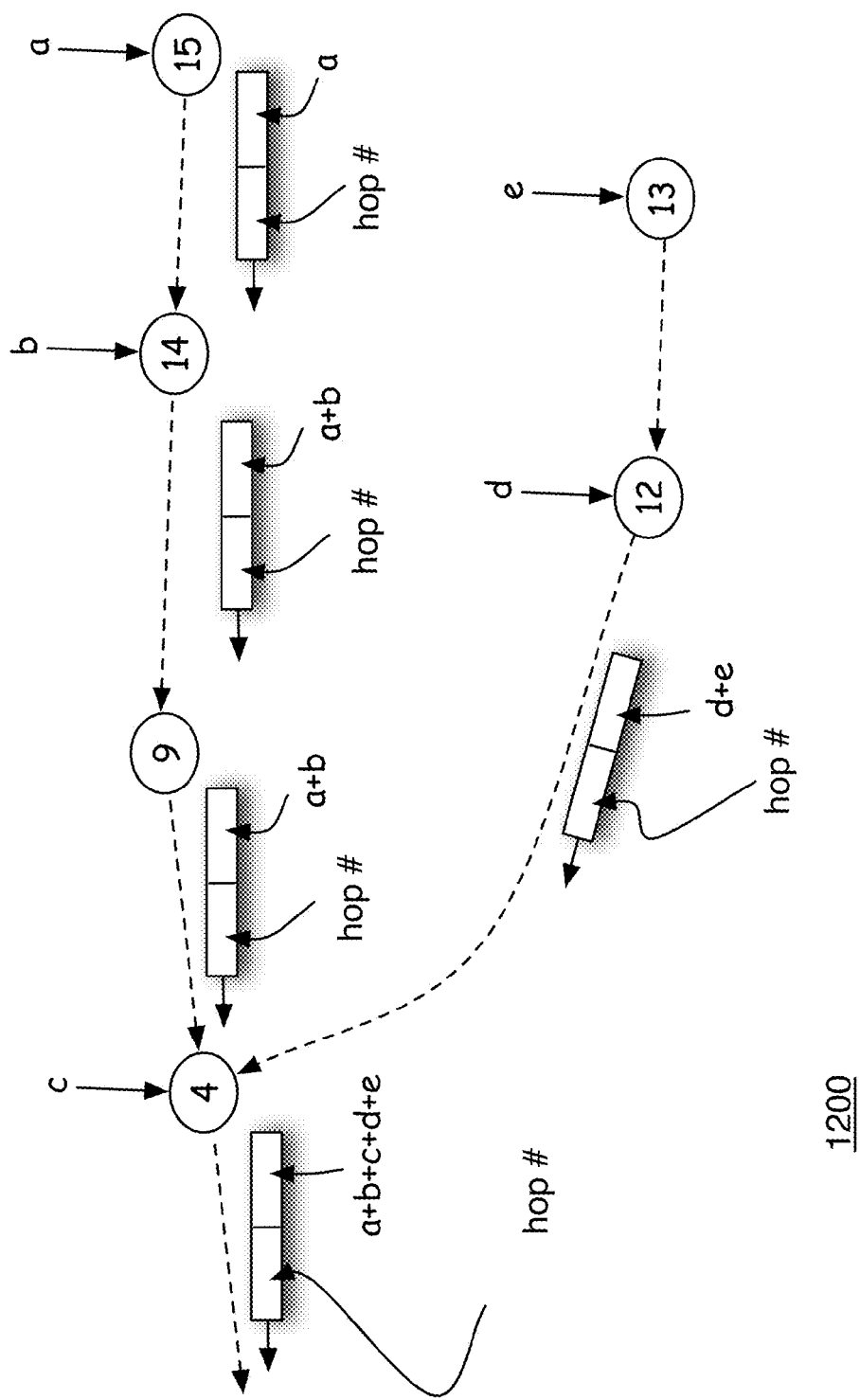
FIG. 44 is a functional block diagram of a network according to one embodiment of the invention.

FIG. 44 is a functional block diagram of a network according to one embodiment of the invention. As may be seen, a network 1200 includes a transceiver 15 receives a user voice input a from the user of transceiver 15 and produces a digital signal that includes a header and a payload that includes the content of voice input a. Transceiver 15 produces the signal to transceiver 14. The header includes a hop number. For this example, the hop number is 1.

Transceiver 14 receives the signal transmitted by transceiver 15 as well as a voice input b. Accordingly, transceiver 14 produces a signal with a header that includes a hop number, here the number 2, and a payload that includes a combined voice signal, namely the content of inputs a and b. Transceiver 14 produces the signal to transceiver 9. Transceiver 9 receives a signal but does not have any additional voice inputs to combine with the received voice inputs. Accordingly, transceiver 9 generates a signal to transceiver 4 that includes a hop number, here, hop number 3, and the payload that includes the combined voice signal with the content of inputs a and b.

Transceiver 4 receives these signal from transceiver nine as well as a signal from transceiver 12 that includes a payload that has combined voice inputs d and e as well as a header with a hop number. There are many different alternative approaches to what transceiver for does with respect to the hop number for the signal that it produces. First, the signal includes a payload that has the combined voice inputs of a+b+c+d+e. Voice input c is a voice input by the user of transceiver 4.

In one embodiment, the hop number in the header of the signal produced by transceiver 4 is the greater of the sum of 1+the hop numbers of the received signals from transceivers nine and 12. In an alternative embodiment, the hop number produced in the signal by transceiver for is equal to 1+the sum of the hop numbers in the two received signals from transceivers 9 and 12.

FIG. 45 is a functional illustration of a signal for supporting group communications according to one embodiment of the invention. As may be seen, a signal 1300 includes a header portion and a payload portion. The header portion carries aggregated hop information in a first header portion and also carries a data type indication in a second header portion. In one specific embodiment, a signal header includes five header portions. A third header portion (header portion 3) carries an indication of the data type and a fifth header portion (header portion 5) carries the aggregated hop number. A payload portion of the signal carries the payload that, for the purposes of the embodiments of the present invention, is a combined voice signal as described previously. Of the plurality of header portions, portions 1, 2 and 4 are identified as "don't care". This means that they can be used for other purposes or reserved.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a message but may adjust its current level, voltage level, and/or power level.

As may further be used herein, inferred coupling (i.e., where one element is coupled to another element by inference) includes direct and indirect coupling between two items in the same manner as "coupled to." As may even further be used herein, the term "operable to" indicates that an item includes one or more of power connections, input(s), output(s), etc., to perform one or more its corresponding functions and may further include inferred coupling to one or more other items. As may still further be used herein, the term "associated with," includes direct and/or indirect coupling of separate items and/or one item being embedded within another item. As may be used herein, the term "compares favorably," indicates that a comparison between two or more items, messages, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The invention claimed is:

1. An apparatus for supporting group communications, comprising:
    transceiver circuitry configured to receive ingoing radio frequency signals (RF) and to transmit outgoing RF signals;
    processing circuitry configured to receive a digital representation of the ingoing RF signals that contain a digital voice signal of a first user and to add a digital representation of a second user's voice audio to the received digital voice signal to create an outgoing digital signal a combined digital voice signal of the first and second users;
    a buffer for storing the second user's voice audio; and
    wherein the processing circuitry produces the outgoing digital signal to the transceiver circuitry for transmission as the outgoing RF signals.

2. The apparatus of claim 1 further comprising an adder for adding the second user's voice audio to the digital representation of the ingoing RF signals.

3. The apparatus of claim 2 wherein the processing circuitry is configured to add a hop indication to a header for the combination of the second user's voice audio and the digital representation of the ingoing RF signals.

4. The apparatus of claim 3 wherein the processing circuitry is configured to receive a digital representation of a combined audio signal.

5. The apparatus of claim 4 further comprising an adder for subtracting the second user's voice audio from the digital representation of the combined audio signal.

6. The apparatus of claim 5 wherein the second user's voice audio is subtracted by on received hop information that was received with the combined audio signal.

7. An apparatus for supporting group communications, comprising:
    transceiver circuitry configured to receive ingoing radio frequency signals (RF) and to transmit outgoing RF signals;
    processing circuitry configured to receive the ingoing RF signals containing a digital representation of a first user's voice signals and to add a digital representation of a second user's voice audio to the digital representation of the first user's voice signals to create an outgoing combined digital voice signal;
    wherein the processing circuitry is configured to add a hop indication to a header for the combination of the second user's voice audio and the digital representation of the ingoing RF signals;
    a buffer for storing the user's voice audio; and
    wherein the processing circuitry produces the outgoing combined signal to the transceiver circuitry for transmission as the outgoing RF signals.

8. The apparatus of claim 7 further comprising an adder for adding the second user's voice audio to the digital representation of the ingoing RF signals.

9. The apparatus of claim 8 further comprising an adder for subtracting the second user's voice audio from the digital representation of the combined audio signal.

10. The apparatus of claim 9 wherein the second user's voice audio is subtracted by received hop information that was received with the combined audio signal.

11. An apparatus for supporting group communications, comprising:
    transceiver circuitry configured to receive ingoing radio frequency signals (RF) during specified receive windows of time and to transmit outgoing RF signals during specified transmit windows of time;
    processing circuitry configured to receive the ingoing RF signals containing a digital representation of a first user's voice signals and to add a digital representation of a second user's voice audio to the digital representation voice signals to create an outgoing combined digital voice signal;
    wherein the processing circuitry is configured to add a hop indication to a header for the combination of the second user's voice audio and the digital representation of the ingoing RF signals;
    a buffer for storing the user's voice audio; and
    wherein the processing circuitry produces the outgoing combined signal to the transceiver circuitry for transmission as the outgoing RF signals only during a specified transmission window.

12. The apparatus of claim 11 further comprising an adder for adding the user's voice audio to the digital representation of the ingoing RF signals.

13. The apparatus of claim 11 further comprising an adder for subtracting the user's voice audio from the digital representation of the combined audio signal.

14. The apparatus of claim 11 wherein the second user's voice audio is subtracted by received hop information that was received with the combined audio signal.

15. The apparatus of claim 11 wherein the windows of time are based on how many nodes are intervening nodes between the apparatus and a master node.

16. The apparatus of claim 11 wherein the apparatus is configured to:
   receive a combined voice input;
   determine what voice input should be produced for subtraction based on hop information;
   produce the determined voice input for subtraction and a current voice input for addition to the combined voice input; and
   playback the combined voice input through a speaker.

* * * * *